United States Patent [19]

Ishikawa et al.

[11] Patent Number: 5,669,031
[45] Date of Patent: Sep. 16, 1997

[54] APPARATUS FOR PROCESSING PHOTOGRAPHIC SENSITIVE MATERIAL

[75] Inventors: Takatoshi Ishikawa; Fumio Mogi, both of Kanagawa, Japan

[73] Assignee: Fuji Photo Film Co., Ltd., Kanagawa, Japan

[21] Appl. No.: 661,596

[22] Filed: Jun. 11, 1996

[30] Foreign Application Priority Data

Jun. 13, 1995 [JP] Japan .................... 7-146632
Jun. 13, 1995 [JP] Japan .................... 7-146637

[51] Int. Cl.$^6$ .................................. G03D 3/06
[52] U.S. Cl. ............... 396/569; 396/578; 396/626; 355/27
[58] Field of Search ................. 396/567, 568, 396/569, 570, 564, 578, 626; 355/27, 68, 83, 100

[56] References Cited

U.S. PATENT DOCUMENTS

| | | | |
|---|---|---|---|
| 4,104,670 | 8/1978 | Charnley et al. | 396/569 |
| 4,881,095 | 11/1989 | Shidara | 396/569 |
| 5,235,369 | 8/1993 | Nakamura et al. | 396/569 |
| 5,452,040 | 9/1995 | Nishida et al. | 396/569 |
| 5,477,300 | 12/1995 | Fujimoto et al. | 396/568 |
| 5,521,055 | 5/1996 | Rider | 396/564 |

FOREIGN PATENT DOCUMENTS

| | | | |
|---|---|---|---|
| 610811 A1 | 8/1994 | European Pat. Off. | G03D 13/00 |
| 4-260037 | 9/1992 | Japan | G03D 3/00 |
| 6-230543 | 8/1994 | Japan | G03D 3/00 |
| 6-236018 | 8/1994 | Japan | G03D 3/06 |
| 6-509660 | 10/1994 | Japan | G03C 5/31 |
| 6-509661 | 10/1994 | Japan | G03C 5/31 |
| WO 93/03415 | 2/1993 | WIPO | G03C 5/31 |
| WO 93/03416 | 2/1993 | WIPO | G03C 5/31 |

*Primary Examiner*—A. A. Mathews
*Attorney, Agent, or Firm*—Sughrue, Mion, Zinn, Macpeak & Seas

[57] ABSTRACT

An apparatus for processing a photographic sensitive material capable of accurately controlling photographic characteristics and processing solutions. If exposures of images recorded on a negative film have been integrated, for a predetermined number of frames a mean exposure is calculated and a result of comparison thereof with a reference exposure is supplied to the film processor. The result of the comparison is used to control the processing performance of the film processor. A density meter measures the densities of an exposed portion and a non-exposed portion of a color paper processed in a processor portion. As physical quantities affecting the photographic characteristics, the throughput of color paper per unit period, temperature, pH, specific gravity and electric conductivity of processing solutions, quantity of replenishment of replenisher to be replenished to the processing solutions and quantity of water to be added to the processing solutions are detected. If the detected density is out of a predetermined ranger the cause of the measured density being out of the predetermined range is estimated in accordance with the detected physical quantities. In accordance with the estimated causer the quantity of the replenisher to be replenished to processing baths is changed in accordance with the estimated cause so as to make the density of the exposed portion and the non-exposed portion to be included in a predetermined range.

14 Claims, 44 Drawing Sheets

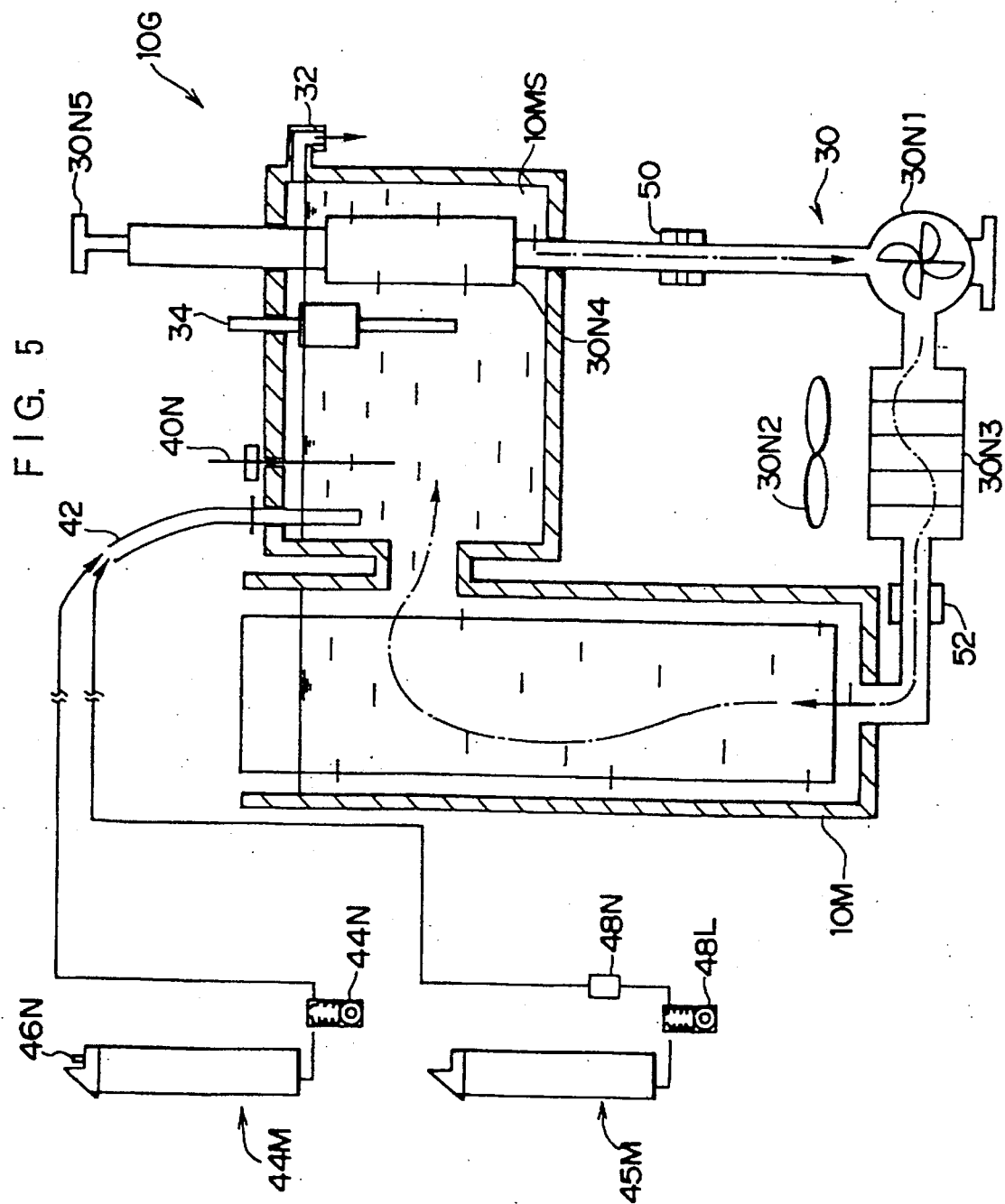

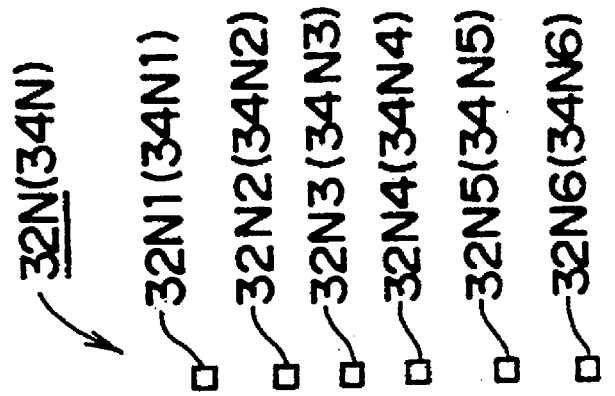
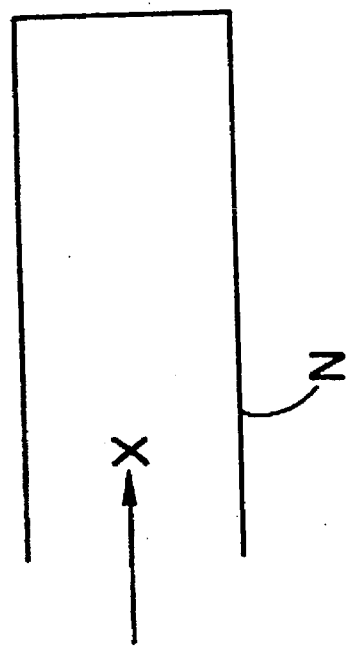
FIG. 6A
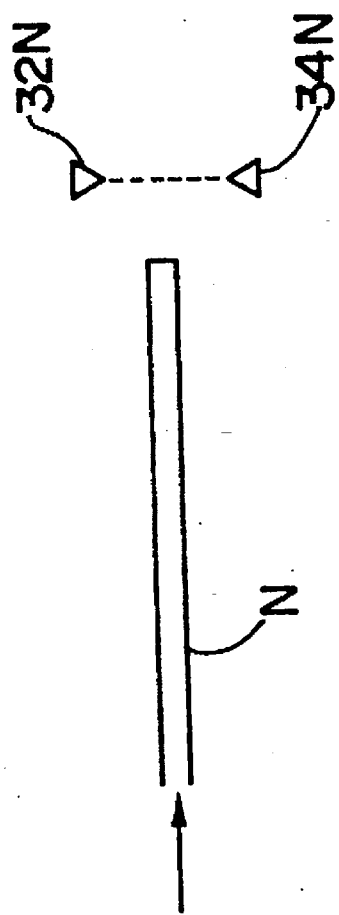
FIG. 6B

F I G. 6 C
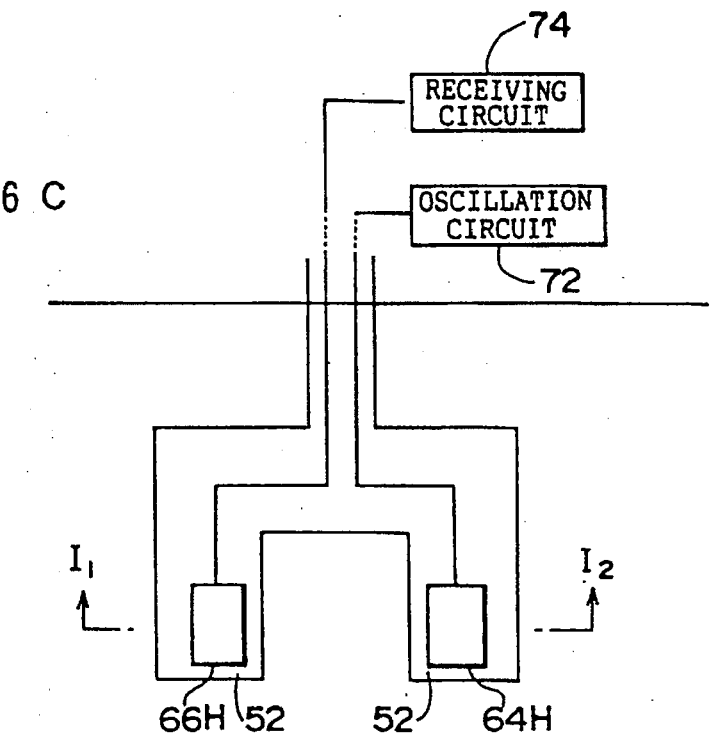
F I G. 6 D
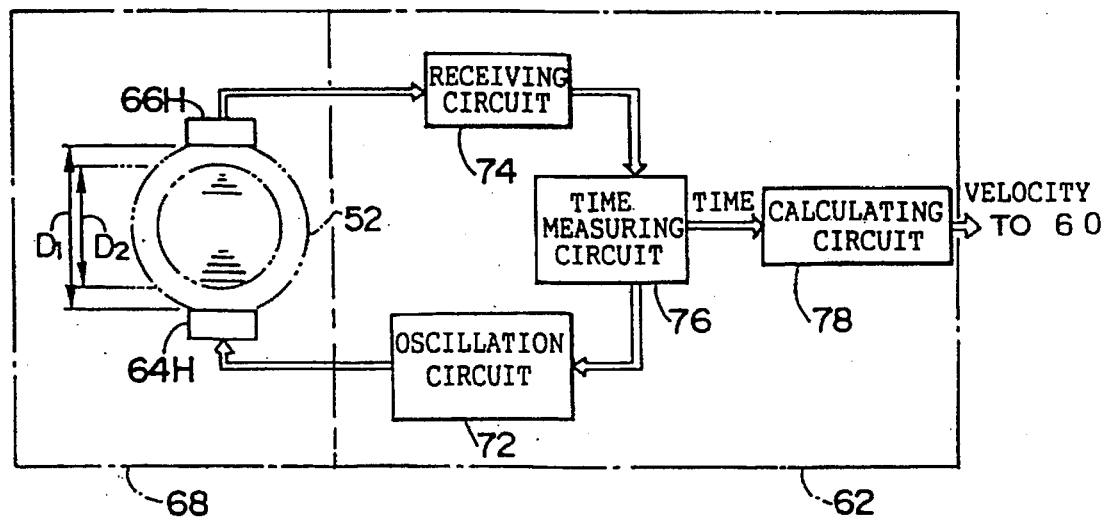

FIG. 23

| WHETHER OR NOT INPUT HAS BEEN PERFORMED | DETECTION SIGNAL B | DETECTION SIGNAL C | QUANTITY OF RESIDUAL SILVER X [$\mu g/cm^2$] |
|---|---|---|---|
| | EXISTS | EXISTS | $x \leq 5$ |
| | EXISTS | NOT EXISTS | $5 < x \leq 10$ |
| | NOT EXISTS | NOT EXISTS | $10 < x$ |

FIG. 24

| | EMITTING DIODE 12A | EMITTING DIODE 12B | EMITTING DIODE 12C |
|---|---|---|---|
| PEAK WAVELENGTH (μm) | 0.80 | 0.95 | 1.00 |

(PEAK WAVELENGTH OF SPECTRUM SENSITIVITY CHARACTERISTIC 0.85 (μm))

F I G. 31

|  | EMITTING DIODE 12A | EMITTING DIODE 12B | EMITTING DIODE 12C |
|---|---|---|---|
| QUANTITY OF EMITTED LIGHT | W1 | W2 | W3 |

(W1 > W2 > W3)

APPARATUS FOR PROCESSING PHOTOGRAPHIC SENSITIVE MATERIAL

BACKGROUND OF THE INVENTION

1. Field of the Invention

The present invention relates to an apparatus for processing a photographic sensitive material such that a photographic sensitive material for taking pictures is processed by a processing liquid.

2. Description of the Related Art

Hitherto, the state of a processing liquid for use in an apparatus for processing a photographic sensitive material has generally been managed by a control strip process. The control strip process is a process having the steps of subjecting, to a development process, a photographic sensitive material (a control strip) exposed to light under standard exposure conditions consisting of a predetermined light intensity, a predetermined exposure period and a predetermined light quality; measuring the density of the developed control strip with a density meter; and checking the state of the processing liquid in accordance with the result of measurement. The foregoing operation is a troublesome operation for a user, and the necessity of using the density meter results in an economical burden being imposed excessively. Thus, improvements have been required.

In view of the foregoing, there has been disclosed a film developing apparatus (refer to Japanese Patent Application Laid-Open (JP-A) No. 6-230543), comprising a reference exposing portion for exposing a photosensitive material under the foregoing reference exposing conditions in order to obtain control strips and a density meter for measuring the density of the control strips exposed in the reference exposing portion and developed in a developing portion, wherein states of processing solutions are calculated in accordance with a result of measurement performed by the density meter to display the calculated states of the processing solutions on a display portion thereof. A photography printing and developing apparatus (refer to Japanese Patent Application Laid-Open (JP-A) No. 6-236018) has been suggested in which an exposing portion exposes the photosensitive material with light under the foregoing reference exposing conditions, the density of the photosensitive material subjected to the reference exposure and developed in the developing portion is measured with a density meter, and states of processing solutions are calculated in accordance with a result of the measurement so as to display the calculated states of the processing solutions on a display portion.

However, the foregoing film developing apparatus and the photography printing and developing apparatus are able to simply detect defects of the photographic characteristics. Since the cause of the defect cannot be detected, there is a risk that an erroneous process control is performed.

SUMMARY OF THE INVENTION

In view of the foregoing, an object of the present invention is to provide an apparatus for processing a photographic sensitive material capable of precisely controlling the qualities of photographic characteristics and processing solutions.

According to a first aspect of the present invention, there is provided an apparatus for processing a photographic sensitive material comprising: film processing unit for processing a photographic sensitive material for taking pictures with processing solutions; a print processing unit having exposing means for exposing images recorded on the photographic sensitive material for taking pictures processed by the film processing unit to a photosensitive material for forming prints; calculating means which integrates exposure of the print performed by the exposing means so as to calculate mean exposure amount; and comparison means for comparing a result of calculation performed by the calculation means with a predetermined reference exposure amount for prints.

According to a second aspect of the present invention, there is provided an apparatus for processing a photographic sensitive material according to the first aspect, wherein the film processing unit has detection means for detecting physical quantities of the processing solutions affecting photographic characteristics of the photographic sensitive material for taking pictures.

According to a third aspect of the present invention, there is provided an apparatus for processing a photographic sensitive material according to the first or second aspect, wherein the calculating means selects a specific photographic sensitive material for taking pictures when the calculating means integrates the exposure amount.

According to a fourth aspect of the present invention, there is provided an apparatus for processing a photographic sensitive material according to the first to third aspects, wherein the calculating means selects images printed on the photographic sensitive material for forming prints with predetermined size when the calculating means integrates the exposure amount.

According to a fifth aspect of the present invention, there is provided an apparatus for processing a photographic sensitive material according to first to fourth aspects, wherein the film processing unit and the print processing unit are integrally provided.

According to a sixth aspect of the present invention, there is provided an apparatus for processing a photographic sensitive material comprising: density measuring means for measuring specific density of a photographic sensitive material processed when the photographic sensitive material passes through the processing solutions; and physical-quantity detecting means for detecting a plurality of different physical quantities which affect the photographic characteristics of the processed photographic sensitive material.

According to a seventh aspect of the present invention, there is provided an apparatus for processing a photographic sensitive material according to the sixth aspect, wherein the physical-quantity detecting means detects a state of the processing solution as one of the physical quantities.

According to an eighth aspect of the present invention, there is provided an apparatus for processing a photographic sensitive material according to the sixth aspect, wherein the physical-quantity detecting means detects at least a throughput of the photographic sensitive material per unit period and quantity of replenishment of replenisher to be replenished to the processing solution as the physical quantities.

According to a ninth aspect of the present invention, there is provided an apparatus for processing a photographic sensitive material according to the sixth to eighth aspects further comprising: maintaining means for maintaining an appropriate state of the processing solution in accordance with control conditions determined in accordance with the magnitude of the physical quantities and used to maintain the appropriate state of the processing solution; and determining means for determining whether or not the specific density measured by the density measuring means is out of a predetermined range including a predetermined density.

According to a tenth aspect of the present invention, there is provided an apparatus for processing a photographic sensitive material according to the ninth aspect further comprising cause estimating means for, in accordance with a plurality of physical quantities detected by the physical-quantity detection means, estimating a cause of the specific density measured by the density measuring means being out of the predetermined range in a case of a result of determination performed by the determining means being affirmative.

According to an eleventh aspect of the present invention, there is provided an apparatus for processing a photographic sensitive material according to the tenth aspect further comprising changing means for changing the control conditions in accordance with the cause estimated by the cause estimating means so that the value of the specific density is included in the predetermined range.

According to a twelfth aspect of the present invention, there is provided an apparatus for processing a photographic sensitive material according to sixth to eleventh aspects, wherein the density measuring means measures density of a non-exposed portion of the processed photopraphic sensitive material.

In the present invention, images, which have been recorded on photographic sensitive materials for taking pictures (for example, negative films which hereinafter abbreviated as "films") processed in a film processing apparatus, are printed on photosensitive materials (for example, photographic printing paper) for printing photographic images, by a print processing apparatus. At this time, the light exposures realized by an exposure means are integrated by an calculating means to obtain a mean light exposure for each frame. By subjecting the mean light exposure to a comparison with a reference light exposure, the state where the photographic sensitive material for taking pictures has been processed in the film processing apparatus can be determined.

In general, the light exposure for use in the printing operation (print light exposure F) is an integrated quantity of light transmitted through the image of the film. The print light exposure for respective colors, R, G and B can be expressed as the function of the density of an image as expressed by Equation (1):

$$\log (Fi) = Ki + ai \cdot Di \quad (1)$$

where

K: constant determined by a photosensitive material and a printer
a: coefficient
D: mean density of images on a film
i: any one of R, G and B That is, the logarithmic value of the light exposure for printing has a proportional relationship to the mean density of frames of the film. Thus, obtaining of the mean light exposure for printing is to obtain the mean value of mean densities of frames of the film.

Since the mean value of exposures on the prints and the mean value of the mean densities of the frames of the film are mean values of a multiplicity of image frames, they are generally standardized so that they coincide with a predetermined value, that is, a reference exposure or a reference density. If a defect has taken place in the film processor, the exposure of the images of the processed film on the prints and the mean density of the frames are changed. Therefore, by reading the difference from the reference exposure or the reference density, a determination can be performed whether or not the state of processing in the film processor is appropriate.

The second aspect of the present invention has the structure such that the physical states of the processing solutions in the film processor are detected by the detection means. Thus, whether or not the film is being processed appropriately in the film processor is determined. Thus, whether or not the processing solutions are in appropriate states can be estimated in accordance with the results of comparison performed by the comparison means.

The quantity of exposure when images are printed on an photographic printing paper is determined by measuring the density of a predetermined portion of the film, the highest density and the lowest density. As the highest density, the density of image portions or a highest density of a pictorial image may be employed. As the lowest density, the density (base density) of a non-exposed portion of the film or a lowest density of a pictorial image may be employed.

In the third aspect of the present invention, specific films are selected to calculate mean exposure.

In the fourth aspect of the present invention, the exposures of images printed to have specific size are integrated to calculate mean exposure.

When the exposure is calculated as described above, it is preferable that a predetermined reference be employed. For example, only films having predetermined characteristics may be selected or images to be printed to have predetermined size may be selected. As a result, an appropriate mean exposure for reference exposure can be calculated. That is, if the characteristics of the film or the print sizes are different, the exposures are made to be different. Therefore, it is preferable that only exposure for a print of images under predetermined conditions be calculated. The foregoing process is performed such that, for example, films having images photographed in a disposal camera are excluded or only films having specific DX code are selected. Moreover, panorama size is excluded but only images to be printed on general size (standard size) print having, for example, E-size or L-size are selected.

The mean exposure is a value (a mean value) per one image frame of the integrated value of exposures of a plurality of image frames. The exposure may be the light quantity which is received by the photographic printing paper or the light quantity when the photographic printing paper is irradiated with light emitted from a light source through the film. By previously setting one or more exposure values or ranges of image densities with respect to an ideal exposure with which the processing solution can be maintained to be ideal, whether or not the foregoing mean value corresponds to any of the set plural ranges is determined. The number of image frames for obtaining the foregoing mean value is 100 or more, preferably about 500 to about 5000 frames.

The reference exposure may be an exposure when an image of a control strip is exposed to a photographic printing paper, the control strip initially being non-developed photographic sensitive material, having a predetermined reproducing characteristic and including one or plural predetermined points exposed under predetermined exposing conditions (predetermined light intensity and predetermined exposing period, etc.), the control strip being then processed by a film processor including processing solutions controlled appropriately. If each processing solution in the film processing apparatus according to the present invention is controlled appropriately to enable the photographic sensitive material for taking pictures to be finished to have predetermined photographic characteristics, the film processing apparatus may be provided with means for exposing one or more predetermined points of the non-developed photographic sensitive material for taking pictures to make the control strip if necessary.

As the reference exposure, it is preferable to use an exposure with which the standard exposure frame (a normal frame) of a so-called Bull's eye is printed. The Bull's eye is obtained by photographing a gray disc-like subject under predetermined exposing conditions, such as standard, under and over exposure. The reason for this is that the image of the Bull's-eye is not affected by the state of processing performed in the film processor.

The physical quantities to be detected by the physical-quantity detection means and affecting the photographic characteristics of the film are throughput of the films, the quantity of residual silver left in the film and states of the processing solutions, etc. The states of the processing solutions are temperature of each processing solution, hydrogen ion exponent pH (or hydrogen ion concentration) of each processing solution, the specific gravity of each processing solution, the electric conductivity (specific conductance) of each processing solution, the replenishment accuracy of each processing solution and quantity for compensating evaporation of each processing solution.

All or one or more physical quantities may be employed. It is preferable that the throughput of the films and the replenishment accuracy of the replenisher which are physical quantities having the most important relationship with the state of processing in the film processing apparatus be at least employed.

The throughput of films may be measured at every unit time (period), for example, every day, every week or every month. In a short period, for example, one or two days, the throughput is not changed considerably. If a somewhat long time has passed, change in the throughput takes place. Therefore, it is preferable that the throughput be measured at predetermined intervals, for example, one week to one month. That is, it is preferable that a throughput in one week to that in one month or that in one week (a mean value) obtained by integrating those in a plurality of days to a throughput in one month (a mean value) is used.

By previously setting one or more throughput ranges with reference to a predetermined ideal throughput (an ideal throughput) with which the states of the processing solutions can be maintained at an ideal state (a state in which the film can appropriately be processed), whether or not the throughput of films per unit period corresponds to the one or any one of plural ranges. In general, it is preferable that the allowable throughput be determined to ½ to two times the instructed standard throughput.

The quantity of residual silver can be measured by the steps of irradiating the highest density portion of a pictorial image of a film or an exposed portion of the film with infrared rays at, for example, an outlet portion of the film processor, detecting infrared rays, which have penetrated the film, or those reflected by the film; and measuring the detected quantity of infrared rays. The quantity of residual silver may be detected at predetermined intervals, for example, an interval of one week or every day. It is preferable that the quantity be stored as time sequential data for one or more previous week or preferably one or more previous month.

A plurality of ranges, consisting of a range in which the processing performance of each of the processing solution is excellent (within a standard range), a range in which the same is somewhat satisfactory (a range near a standard limit) and a range in which the same is defective (out of the standard limit) are set. Then, whether the quantity of residual silver correspond to any of the foregoing ranges is determined. For example, the standard range may be set to be a range below 5 $\mu g/cm^2$ the near-standard-limit range may be set to be a range larger than 5 $\mu g/cm^2$ and 10 $\mu g/cm^2$ or less and the out of the standard limit may be set to be a range larger than 10 $\mu g/cm^2$.

The temperature of each processing solution may be that of the developer, bleaching solution, fixing solution, bleaching and fixing solution, rinsing solution (washing water) and stabilizer. By previously setting one or a plurality of temperature ranges with respect to ideal temperature (ideal temperature level) with which the state of the processing solution can be maintained at an ideal state, whether the temperature of each processing solution correspond to one or any one of plural ranges is determined.

As the pH, the specific gravity and the electric conductivity of each processing solution, the measured values of pH, the specific gravity and the electric conductivity of the developer, bleaching solution, fixing solution, bleaching and fixing solution, rinsing solution and stabilizer may be employed. In particular it is preferable that pH and the specific gravity of the bleaching solution, the fixing solution and bleaching and fixing solution be employed because of excellent measurement accuracy. As for the electric conductivity, it is preferable that the electric conductivity of the rinsing solution and the stabilizer be employed. The pH, specific gravity and the electric conductivity of each processing solution may be detected at predetermined time intervals, for example, an interval of one week or every day. It is preferable that they are stored as time sequential data for one or more previous week, preferably one or more month.

By previously setting one or more pH, specific gravity and electric conductivity ranges with respect to the standard pH, specific gravity and electric conductivity with which the processing solution can be maintained at an ideal state, whether or not the detected pH, specific gravity and electric conductivity correspond to the one or any one of plural ranges is determined.

The replenishment accuracy of each processing solution may be that of the developer, bleaching solution, fixing solution, bleaching and fixing solution, rinsing solution and stabilizer. The replenishment accuracy can be obtained from a theoretical quantity of replenishment determined in accordance with the throughput of the photographic sensitive material and the actual quantity of replenishment. For example, in a case where the unit quantity of replenishment of the replenisher with respect to unit throughput of films is set and the replenisher is replenished at predetermined replenishment timing, the replenishment accuracy can be obtained as the ratio of the difference between an ideal quantity of replenishment and actual quantity of replenishment (which can be calculated in accordance with the level in a replenishing tank for reserving the replenisher) with respect to the ideal quantity of replenishment (a value obtained by multiplying with unit quantity of replenishment, a value obtained by dividing an integrated value of quantity of replenishment by a unit throughput) calculated in accordance with the integrated value of the throughput until the replenishment timing. Note that the foregoing difference may be used in place of the replenishment accuracy. The ratio of the actual quantity of replenishment with respect to the ideal quantity of replenishment may be employed.

Thus, whether the replenishment accuracy corresponds to any of the plural and predetermined ranges consisting of a first range (for example, a range within ±5%) which is a predetermined normal value, a second range (for example, a range larger than ±5% and nor more than ±10%) which is a region near a limit, or a third range (for example, a range larger than ±10%) which is an abnormal region, is determined.

The replenishment accuracy for each processing solution may be recorded at every unit period, for example, every week, preferably every day. It is preferable that the replenishment accuracy be recorded as time sequential data for one or more previous week, preferably one or more month.

The quantity of compensating evaporation of each processing solution may be the quantity of water supplied for correcting the quantity of evaporation of each of the processing solutions, that is, developer, bleaching solution, fixing solution, bleaching and fixing solution, rinsing solution and stabilizer. The quantity of water to be supplied is calculated in accordance with the quantity of evaporation of the processing solution obtained in accordance with the environment temperature, environment humidity, state of the operation of the film processor, and the like. Since the foregoing quantity of water is supplied to the processing solution, the environment temperature, the environment humidity and the state of the operation of the film processor may be stored simultaneously. It is preferable that the quantity for compensating evaporation be recorded every day. It may be recorded as time sequential data for one previous week or longer or preferably for one month or longer.

It is preferable that the film processor according to the present invention be provided with maintaining means, determining means, cause estimating means and changing means. The maintaining means maintains the appropriate state of the processing solution under controlling conditions determined in accordance with the foregoing physical quantities and capable of maintaining the appropriate state of the processing solution. The foregoing controlling conditions are the quantity of replenishment to be replenished at the replenishment timing and the set temperature level for controlling the temperature of the processing solution to a standard level.

The determining means determines whether or not the specific photographic density measured by the photographic density measuring means is out of a predetermined range including a predetermined density. As a result, whether or not the processing performance of the processing solution is out of the allowable range can be determined. If the measured specific density is included in the predetermined range, the present state of the processing solution is included in the allowable range. Therefore, the controlling conditions are not changed.

The cause estimating means estimates the cause which the result of comparison performed by the comparison means is out of the predetermined range, in accordance with the physical quantities detected by the physical-quantity detecting means, if the mean exposure is out of a predetermined range as a result of the comparison performed by the comparison means.

The changing means changes the controlling conditions for controlling the maintaining means in accordance with the cause estimated by the cause estimating means.

The apparatus for processing a photographic sensitive material according to the fifth aspect of the present invention has the film processing unit and a print processing unit in a casing thereof. Since the film processing unit and the print processing unit are disposed in one casing, information in a larger quantity can be obtained. In accordance with the physical quantities detected by the physical-quantity detection means, the cause of the mean exposure being out of the predetermined range can accurately be estimated.

If the exposure when images recorded on the film are printed on the photographic printing paper is out of the predetermined range, the cause is estimated in accordance with the detected physical quantities and the various controlling conditions of the film processing unit are changed in accordance with the estimated cause so that change to appropriate controlling conditions for maintaining the processing solution at an appropriate state can be performed. As a result, the processing performance of the processing solution can be controlled in an allowable range. Thus, the photographic characteristics and the quality of the processing solution can be controlled accurately.

The specific density to be measured by the density measuring means according to the sixth aspect of the present invention may be the density of a predetermined position of the processed photographic sensitive material, the highest density or the lowest density.

As the density of the predetermined position, the density of an exposed portion of a control strip which has been subjected to the processing by a processing solution can be used. The control strip is a non-developed photographic sensitive material, having a predetermined reproducing characteristic and including one or plural predetermined points exposed under predetermined exposing conditions (predetermined light intensity and predetermined exposing period, etc.). The apparatus for processing a photographic sensitive material according to the present invention may be provided with exposing means for exposing predetermined one or plural point of the non-developed photographic sensitive material under the foregoing predetermined exposing conditions to perform exposure by the exposing means if necessary to make the control strip.

The highest density may be the density of the extremely exposed portion (for example, the leading portion of a negative film) of the photographic sensitive material and the highest density of a pictorial image, etc.

The lowest density may be the density of a non-exposed portion of the processed photographic sensitive material. It may be the density of a non-exposed portion (for example, a portion between image frames) of the processed photographic sensitive material processed with the processing solution and having a pictorial image exposed thereto or the density of a processed photographic sensitive material processed with the processing solution and having image frames which have not been exposed. A lowest density of a pictorial image may be employed as the lowest density.

The different physical quantities to be detected by the physical-quantity detection means and affecting the photographic characteristics of the processed photographic sensitive material are throughput of the photographic sensitive material, the quantity of residual silver left in the process photographic sensitive material, the states of the processing solutions and a mean value of exposing period. The states of each processing solution are temperature of each processing solution, hydrogen ion exponent pH (or hydrogen ion concentration) of each processing solution, the specific gravity of each processing solution, the electric conductivity (specific conductance) of each processing solution, the replenishment accuracy of each processing solution and quantity for compensating evaporation of each processing solution.

All or one or more physical quantities may be employed. It is preferable that the throughput of the photographic sensitive materials and the replenishment accuracy of the replenisher which are physical quantities having the most important relationship with the state of processing in the apparatus for processing a photographic sensitive material be employed.

The throughput of the photographic sensitive material may be measured at every unit time (period), for example, every day, every week or every month. In a short period, for example, one or two days, the throughput is not changed considerably. If a somewhat long time has passed, change in the throughput takes place. Therefore, it is preferable that the throughput be measured at predetermined intervals, for example, one week to one month. That is, it is preferable that a throughput in one week to that in one month or that in one week (a mean value) obtained by integrating those in a plurality of days to a throughput in one month (a mean value).

By previously setting one or more throughput ranges with reference to a predetermined ideal throughput (an ideal throughput) with which the states of the processing solutions can be maintained at an ideal state (a state in which the photographic sensitive material can appropriately be processed), whether or not the throughput of the photographic sensitive material per unit period corresponds to the one or any one of plural ranges is determined. In general, it is preferable that the allowable throughput be determined to ½ to two times the instructed standard throughput.

The quantity of residual silver can be measured by the steps of irradiating the highest density portion of a pictorial image of a processed photographic sensitive material or an extremely exposed portion of the photographic sensitive material with infrared rays at, for example, an outlet portion of the processing portion, detecting infrared rays, which have penetrated the processed photographic sensitive material, or those reflected by the processed photographic sensitive material; and measuring the detected quantity of infrared rays. The quantity of residual silver may be detected at predetermined intervals, for example, an interval of one week or every day. It is preferable that the quantity be stored as time sequential data for one or more previous week or preferably one or more previous month.

A plurality of ranges, consisting of a range in which the processing performance of each of the processing solution is excellent (within a standard range), a range in which the same is somewhat satisfactory (a range near a standard limit) and a range in which the same is defective (out of the standard limit) are set. Then, whether the quantity of residual silver correspond to any of the foregoing ranges is determined. For example, the standard range may be set to be a range below 5 $\mu g/cm^2$, the near-standard-limit range may be set to be a range larger than 5 $\mu g/cm^2$ and 10 $\mu g/cm^2$ or less and the out of the standard limit may be set to be a range larger than 10 $\mu g/cm^2$.

The temperature of each processing solution may be that of the developer, bleaching solution, fixing solution, bleaching and fixing solution, rinsing solution (washing water) and stabilizer. By previously setting one or a plurality of temperature ranges with respect to ideal temperature (ideal temperature level) with which the state of the processing solution can be maintained at an ideal state, whether the temperature of each processing solution correspond to one or any one of plural ranges is determined.

As the pH, the specific gravity and the electric conductivity of each processing solution, the measured values of pH, the specific gravity and the electric conductivity of the developer, bleaching solution, fixing solution, bleaching and fixing solution, rinsing solution and stabilizer may be employed. In particular, it is preferable that pH and the specific gravity of the bleaching solution, the fixing solution and bleaching and fixing solution be employed because of excellent measurement accuracy. As for the electric conductivity, it is preferable that the electric conductivity of the rinsing solution and the stabilizer be employed. The pH, specific gravity and the electric conductivity of each processing solution may be detected at predetermined time intervals, for example, an interval of one week or every day. It is preferable that they are stored as time sequential data for one or more previous week, preferably one or more month.

By previously setting one or more pH, specific gravity and electric conductivity ranges with respect to the standard pH, specific gravity and electric conductivity with which the processing solution can be maintained at an ideal state, whether or not the detected pH, specific gravity and electric conductivity correspond to the one or any one of plural ranges is determined.

The replenishment accuracy of each processing solution may be that of the developer, bleaching solution, fixing solution, bleaching and fixing solution, rinsing solution and stabilizer. The replenishment accuracy can be obtained from a theoretical quantity of replenishment determined in accordance with the throughput of the photographic sensitive material and the actual quantity of replenishment. For example, in a case where the unit quantity of replenishment of the replenisher with respect to unit throughput of the photographic sensitive material is set and the replenisher is replenished at predetermined replenishment timing, the replenishment accuracy can be obtained as the ratio of the difference between an ideal quantity of replenishment and actual quantity of replenishment (which can be calculated in accordance with the level in a replenishing tank for reserving the replenisher) with respect to the ideal quantity of replenishment (a value obtained by multiplying with unit quantity of replenishment, a value obtained by dividing an integrated value of quantity of replenishment by a unit throughput) calculated in accordance with the integrated value of the throughput to the replenishment timing. Note that the foregoing difference may be used in place of the replenishment accuracy. The ratio of the actual quantity of replenishment with respect to the ideal quantity of replenishment may be employed.

Thus, whether the replenishment accuracy corresponds to any of the plural and predetermined ranges consisting of a first range (for example, a range within ±5%) which is a predetermined normal value, a second range (for example, a range larger than ±5% and nor more than ±10%) which is a region near a limit, or a third range (for example, a range larger than ±10%) which is a defective region, is determined.

The replenishment accuracy for each processing solution may be recorded at every unit period, for example, every week, preferably every day. It is preferable that the replenishment accuracy be recorded as time sequential data for one or more previous week, preferably one or more month.

The quantity of compensating evaporation of each processing solution may be the quantity of water supplied for correcting the quantity of evaporation of each of the processing solutions, that is, developer, bleaching solution, fixing solution, bleaching and fixing solution, rinsing solution and stabilizer. The quantity of water to be supplied is calculated in accordance with the quantity of evaporation of the processing solution obtained in accordance with the environment temperature, environment humidity, state of the operation of the apparatus for processing a photographic sensitive material, and the like. Since the foregoing quantity of water is supplied to the processing solution, the environment temperature, the environment humidity and the state of the operation of the apparatus for processing a photographic sensitive material may be stored simultaneously. It is preferable that the quantity for compensating evaporation be recorded every day. It may be recorded as time sequential data for one previous week or longer or preferably for one month or longer.

The mean value of the exposing period (or exposure) may be the light quantity (the exposure) received by the photographic sensitive material when printing is performed or the image density of the photographic sensitive material. That is, a value (a mean value) per image frame of an integrated exposure or image densities over a plurality of image frames may be employed. By setting one or plural exposure ranges or image density ranges with respect to an ideal exposure or ideal image density with which the processing solution can be maintained at an ideal state, whether the foregoing mean value corresponds to one or any one of plural ranges is determined. Note that the number of the plural image frames is 100 or more, preferably 500 to 5000. The image density of the photographic sensitive material is obtained from the mean density of the image surface. The mean density of the image surface is exemplified by a LATD (Large Area Transmittance Density) and a mean density of the image surface. It is preferable that the exposure of the photographic sensitive material at the time of printing and images of the photographic sensitive material be of a type corresponding to a predetermined specific print size. It is preferable that the predetermined specific print size is general size (for example, E-size or L-size).

The maintaining means according to the ninth aspect of the present invention maintains the processing solution at an appropriate state in accordance with the controlling conditions determined in accordance with the foregoing physical quantities and capable of maintaining the processing solution at an appropriate state. The controlling conditions are the quantity of replenishment to be replenished at the replenishing timing and set temperature for controlling the temperature of the processing solution to a standard state.

The determining means determines whether or not the specific photographic density measured by the photographic density measuring means is out of a predetermined range including a predetermined density. As a result, whether or not the processing performance of the processing solution is out of the allowable range can be determined. If the measured specific density is included in the predetermined range, the present state of the processing solution is included in the allowable range. Therefore, the controlling conditions are not changed.

The cause estimating means according to the tenth aspect of the present invention estimates the cause of the specific density measured by the density measuring means being out of the predetermined range in accordance with the physical quantities detected by the physical-quantity detection means if a determination has been performed by the determining means that the specific density has been out of the predetermined range.

The changing means changes the controlling conditions to make the specific density to be included in the predetermined range in accordance with the cause estimated by the cause estimating means.

The apparatus for processing a photographic sensitive material may be, for example, a photographic film processing apparatus for processing photographic films, a photographic printing paper processing apparatus for processing photographic printing paper or a photographic processing apparatus including a photographic film processing portion for processing the photographic films and the photographic printing paper processing portion for processing the photographic printing paper which are included in one casing. If the photographic processing apparatus includes the photographic film processing portion and the photographic printing paper processing portion in one casing thereof, information in a large quantity can be obtained. The cause of the specific density measured by the density measuring means being out of the predetermined range can accurately be estimated in accordance with the physical quantities detected by the physical-quantity detection means.

As described above, if the specific density measured by the density measuring means is out of a predetermined range including a predetermined density, the cause of the specific density measured by the density measuring means being out of the predetermined range is estimated in accordance with the detected physical quantities. In accordance with the estimated cause, the controlling conditions are changed to make the specific density to be included in the predetermined range so that the controlling conditions are changed to those appropriate to maintain the appropriate state of the processing solution. As a result, the processing performance of the processing solution can be controlled to be included in the allowable range. Therefore, the photographic characteristic and the processing solution can accurately be controlled.

The processing solution is exemplified by color developer, white and black developer, bleaching solution, adjusting solution, reversing solution, fixing solution, bleaching and fixing solution, stabilizer and rinsing solution.

The color developer is preferably alkalic solution, the main component of which is aromatic primary amine color developing base. A preferred color developer base is p-phenylene diamine compound as well as aminophenol compounds. The phenylene diamine compound is typified by 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-βmethanesulfoneamideethylaniline, 3-methyl-4-amino-N-ethyl-N-β-methoxyethylaniline, 3-methyl-4-amino-N-ethyl-N-δ-hydroxybutylaniline, their sulfates, hydrochloride and p-toluenesulfonate. Two or more types of the foregoing compounds may be used simultaneously to meet the requirement.

The color developer generally contains a pH absorber, such as carbonate, borate or phosphate of alkali metal, development controller or anti-blushing agent, such as salt of bromide, salt of iodide, benzimidazole, benzthiazole, or mercapto-compounds. If necessary, preservatives such as hydroxyamine, N-N-di(sulfoethyl) hydroxylamine, diethylhydroxylamine, sulphite, hydrazines, phenylsemicarbazide, triethanolamine and catecholdisulfonate, organic solvent, such as ethyleneglycol and diethyleneglycol, development accelerator, such as benzylalcohol, polyethylene glycol, quaternary ammonium salt and amines, blushing agent, such as chromatogenous coupler, competitive coupler, sodium boron hydride, subdevelopment base, such as 1-phenyl-3-pyrazoline, tackifier, chelates typified by aminopoly carbonic acid aminopoly phosphonic acid, alkyl phosphonic acid and phosphonocarbonic acid, for example, ethylenediaminetetraacetic acid, nitrilotriacetic acid, diethylenetriaminepentaacetic acid, cyclohexadiaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N',N'-tetramethylenephosphonic acid, ethylenediamine-di(o-hydroxyphenylacetic acid) and their salts.

In general, pH of the foregoing color developer is 9 to 12. The quantity of replenishment of the developer is generally 1 l/m$^2$ of the photosensitive material though it depends upon the color photographic sensitive material. By reducing the concentration of bromide ions in the replenisher, it can be reduced to 400 ml or smaller. It is preferable that the quantity be 30 ml/m² to 300 ml/m². In the case where the quantity of replenishment is reduced, it is preferable that the area of contact between air in the processing bath be reduced to prevent evaporation and oxidation of the solution. By using a means for preventing accumulation of bromide ions in the developer, the quantity of replenishment can be reduced.

The photographic emulsion layer after the color development has been performed is generally subjected to a bleaching process. The bleaching process may be performed simultaneously with performing the fixing process (a bleaching and fixing process) or performed individually. In order to quickly complete the process, a processing method may be employed in which bleaching and fixing are performed after the bleaching process has been performed. Any one of the following methods may be employed to meet the requirement; the process is performed in continuous two bleaching and fixing baths, the fixing process is performed before the bleaching and fixing processes are performed, and the bleaching process is performed after the bleaching and fixing processes have been performed. As the bleacher, for example, polyvalent metal compounds, such as iron (III), cobalt (III) chrome (VI) and copper (II), peroxides, quinone, and nitro-compounds may be employed. Typical bleachers are exemplified by prussiate, dichromate, organic complex salt of iron (III) or cobalt (III), for example, aminopolycarboxylic acid, such as ethylenediaminetetraacetic acid, diethylenetriaminepentaacetic acid, ethylenediaminedisuccinic acid, cyclohexanediaminetetraacetic acid, methyliminodiacetic acid, 1-3, diaminopropanetetraacetic acid, glycoletherdiaminetetraacetic acid, carboxyethyliminoziacetic acid, complex salt, such as citric acid, tartaric acid and malic acid; persulfate; bromate;. permanganate; and nitrobenzene. It is preferable that aminopolycarboxylic acid iron (III) complex salt and persulfate exemplified by ethylenediaminetetraacetic acid iron (III) complex salt be employed in view of quickly completing the process and preventing contamination of environment. Aminocarboxilic acid iron (III) complex salt is advantageous in the bleaching solution or bleaching and fixing solution. In general, pH of the bleacher or the bleaching and fixing solution containing the aminopolycarboxylic acid iron (III) complex salt is 4.5 to 8. In order to quickly complete the process, pH may be lowered.

The bleacher, the bleaching and fixing solution and their previous baths may employed bleaching accelerator, if necessary. Advantageous bleaching accelerators have been disclosed as follows: compounds containing mercapto-base or a disulfide bond disclosed in U.S. Pat. No. 3,893,858, West Germany Patent No. 1,290,812, Japanese Patent Application Laid-Open (JP-A) No. 53-95630, Research Disclosure No. 17129 (July, 1978); thiazolidine derivative disclosed in Japanese Patent Application Laid-Open (JP-A) No. 50-140129; thiourea derivative disclosed in U.S. Pat. No. 3,706,561; iodide salt disclosed in Japanese Patent Application Laid-Open (JP-A) No. 58-16235; polyoxyethylene compounds disclosed in West Germany Patent No. 2,748,430; polyamine compounds disclosed in Japanese Patent Application Publication (JP-B) No. 45-8836; and bromide ions. Among the foregoing materials, it is preferable that the compounds containing the mercapto-base or the disulfide bond be employed in view of excellent accelerating effect. In particular, the compounds disclosed in U.S. Pat. No. 3,893,858, West Germany Patent No. 1,290,812 or Japanese Patent Application Laid-Open (JP-A) No. 53-95630 are preferable to be employed. Also it is preferable that a compound disclosed in U.S. Pat. No. 4,552,834 be employed. The foregoing bleaching accelerator may be added to the photographic sensitive material. When a color photosensitive material for taking pictures is bleached and fixed, the foregoing bleaching accelerator is effective.

As the fixer, thiosulfate, thiocyanate, thioether compounds and thiourea and a large-quantity of iodide salts. In general, thiosulfate is employed. In particular, ammonium thiosulfate can be used most widely. As the preservatives for the bleaching and fixing solution, it is preferable that sulphite, bisulfite, benzenesulfinic acid salt, or carbonyl bisulfite additive be employed.

After the desilverization process has been performed, washing with water and/or a stabilizing process is generally performed. The quantity of water for use in the washing process may be set widely depending upon the various conditions including the characteristic of the sensitive material (employed material, for example, coupler), purpose, temperature of water for use in washing, the number of water-washing tanks (number of steps), method of supplying the counter flow and downflow, and other conditions. The relationship between the number of water-washing tanks and the quantity of water in the multi-counterflow method may be obtained by a method disclosed in Journal of the Society of Motion Picture and Television Engineers, vol. 64, pp. 248 to 253 (May, 1955).

According to the multi-counterflow method disclosed above, the quantity of water required to perform washing can considerably be reduced. However, bacteria propagate, thus raising a problem in that the reproduced suspended matter adheres to the sensitive material. To solve the foregoing problem, the color sensitive material process according to the present invention is able to employ a method disclosed in Japanese Patent Application Laid-Open (JP-A) No. 62-288838 for reducing calcium ions and magnesium ions. Moreover, fungicide, such as chlorine fungicide, such as isothiazolone compounds and thiabendazole, chlorinated sodium isocyanurate, and benzotriazole disclosed in "CHEMISTRY OF STERILIZATION AND MILDEWPROOF" by Hiroshi Horiguchi, "MICROORGANISM FUNGISTATIC STERIZING MILDEWPROOF TECHNIQUES" edited by Sanitation Association and "STERILIZATION AND MILDEWPROOF HANDBOOK" edited by Japan Sterilization and Mildewproof Association.

pH of washing water for use in the process of the photosensitive material according to the present invention is 4 to 9. It is preferable that pH be 5 to 8. Although the temperature of water for use in washing and period of washing may be set variously to be adaptable to the characteristic of the photosensitive material and purpose, they are selected from the following range: 15° C. to 45° C. for 20 seconds to 10 minutes, preferably 25° C. to 40° C. for 30 seconds to 5 minutes. All of known methods disclosed in Japanese Patent Application Laid-Open (JP-A) No. 57-8543, Japanese Patent Application Laid-Open (JP-A) No. 58-14834 and Japanese Patent Laid-Open No. 60-220345 may be employed in the foregoing stabilizing process.

Also a chelate material and mildewproof agent may be added to the stabilizing bath.

The overflow solution produced in the foregoing washing and/replenisher of the stabilizing solution may be reclamated in the desilverization process or the like.

The photographic sensitive material for use in the present invention will now be described.

Although the present invention may be adapted to any photosensitive materials, it is preferable that the present invention be adapted to a color negative film and color paper.

It is preferable to employ the silver halide emulsion, other materials (for example, additives), the photograph structure layers (the layer configuration) and processing method and additives for the process according to the present invention disclosed in the following disclosures and Europe Patent No. EP, 355,660A2 (Japanese Patent Application No. 1-107011).

TABLE 1

| Photograph Component Etc. | JP-A No. 62-215272 | JP-A No. 2-33144 | EP 355,660A2 |
|---|---|---|---|
| Silver Halide Emulsion | line 6 in the upper right column at page 10 to line 5 in the lower left column at page 12; and line 4 from the bottom of lower right column at page 12 to line 17 in the upper left column at page 13 | line 16 in upper right column at page 28 to line 11 in the lower right column at page 29 and line 2 to 5 at | line 53 at page 45 to line 3 at page 47; and line 20 to 22 at page 47 |
| Silver Halide Bath Material | line 6 to 14 int he lower left column at page 12; and line 3 from the bottom of the upper left column at page 13 to final line in the lower left column at page 18 | | |
| Chemical Sensitizing Agent | line 3 in the lower left column at page 12 to line 5 from the bottom of lower right column; and line 1 in the lower right column at page 18 to line 9 from the bottom of upper right column at page 22 | line 12 to 13 in the lower right column at page 29 | line 4 to 9 at page 47 |
| Spectrum Sensitizing Agent (Spectrum Sensitizing Method) | line 8 from bottom of upper right column at page 22 to final line at page 39 | line 1 to line 23 in the upper left column at page 30 | line 10 to 15 at page 47 |
| Emulsion Stablizer | line 1 in the upper left column at page 39 to final line in the upper right column at page 72 | line 14 in the upper left column to line 1 in the upper right column at page 30 | line 16 to 19 at page 47 |
| Development Accelerator | line 1 in the lower left column at page 72 to line 3 in the upper right column at page 91 | | |

| Photograph Component Etc. | JP-A No. 62-215272 | JP-A No. 2-33144 | EP 355,660A2 |
|---|---|---|---|
| Color Coupler (cyan, magenta, yellow couplers) | line 4 in the upper right column at page 91 to line 1 in the upper left column at page 121 | line 14 in the upper right column at page 3 to final line in the upper left column at page 18; and line 6 in the upper right column at page 30 to line 11 in the lower right coulmn at | line 15 to 27 at page 4: line 30 at page 5 to to final line at page 28; line 29 to 31 at page 45; and line 23 at page 47 to line 50 at page 63 |
| Coloring Intensifier | line 7 in the lower left column at page 121 to line 1 in the upper right column at page 121 | | |
| Ultraviolet Absorber | line 2 in the upper right column at page 125 to final line in the lower left column at page 127 | line 14 in the lower right column at page 37 to line 11 in the upper left column at page 38 | line 22 to 31 at page 65 |
| Decoloring Preventative Agent (Image Stablizing | line 1 in the lower right column at page 127 to final line in the lower left column at page 137 | line 12 in the upper right column at page 26 to line 19 in the upper left column at page 37 | line 30 at page 4 to line 23 at page 5; line 1 at page 29 to line 25 at page 45; and line 2 to 21 at page 65 |
| High-Boiling Point and/or Low-Boiling Point Organic | line 9 in the lower left column at page 137 to final line in the lower right column at page 144 | line 14 in the lower right column at page 35 to line 4 from the bottom of upper left column at page 36 | line 1 to 51 at page 64 |
| Method of Dispersing Additive for Photography | line 1 in the lower left column at page 144 to line 7 in the upper right column at page 146 | line 10 in the lower right column at page 27 to final line in the upper left column at page 28; and line 12 in the lower right column at page 35 to line 7 in the upper right colun at page 36 | line 51 at page 63 to line 56 at page 64 |

TABLE 3

| Photograph Component Etc. | JP-A No. 62-215272 | JP-A No. 2-33144 | EP 355.660A2 |
|---|---|---|---|
| Hardener | line 8 in the upper left column at page 146 to line 4 in the lower left column at page 155 | — | — |
| Precursor of Developer Base | line 5 in the lower left column at page 155 to line 2 in the lower right column at page 155 | — | — |
| Compound for Discharging Development Inhibitor | line 3 to 9 in the lower right column at page 155 | — | — |
| Supporter | line 19 in the lower right column at page 155 to line 14 in the upper left column at page 156 | line 18 in the upper right column at page 38 to line 3 in the upper left column at page 39 | line 29 at page 66 to line 13 at page 67 |
| Structure of Sensitive Layer | line 15 in the upper left column at page 156 to line 14 in the lower column at page 156 | line 1 to 15 in the upper right column at page 28 | line 41 to 52 at page 45 |
| Dye | line 15 in the lower right column at page 156 to final line of lower right column at page 184 | line 12 in the upper left column to line 7 in the upper right column at page 38 | line 18 to 22 at page 66 |
| Color Mixture Preventative Agent | line 1 in the upper left column at page 185 to lien 3 in the lower right column at page 188 | line 8 to 11 in the upper right column at page 36 | line 57 at page 64 to line 1 at page 64 |
| Gradation Adjuster | line 4 to 8 in the lower right column at page 188 | | |

TABLE 4

| Photograph Component Etc. | JP-A No. 62-215272 | JP-A No. 2-33144 | EP 355.660A2 |
|---|---|---|---|
| Stain Preventative | line 9 in the lower right column at page 188 to line 10 in the lower right column at page 193 | final line in the upper left column at page 37 to line 13 in the lower right column | line 32 at page 65 to line 17 at page 66 |
| Surface Active Agent | line 1 in the lower left column at page 201 to final line in the upper right column at page 210 | line 1 in the upper right column at page 18 to final line in the lower right column at page 24; and line 10 from the bottom of lower left column to line 9 in the lower right column at page 27 | — |
| Compound Containing Fluorine (as charge preventing agent, coating enhancing agent, lubricant and adhesion preventive agent | line 1 in the lower left column at page 210 to line 5 in the lower left column at page 222 | line 1 in the upper left column at page 25 to line 9 in the upper right column at page 27 | — |
| Binder (hydrophilic colloid) | line 6 in the lower left column at page 222 to final line in the upper left column at page 225 | line 8 to 18 in the upper right column at page 38 | line 23 to 28 at page 66 |
| Thickening Agent | line 1 in the upper right column at page 225 to line 2 in the upper right column at page 227 | — | — |
| Charge Preventive Agent | line 3 in the upper right column at page 227 to line 1 in the upper left column at page 230 | | |

TABLE 5

| Photograph Component Etc. | JP-A No. 62-215272 | JP-A No. 2-33144 | EP 355.660A2 |
|---|---|---|---|
| Polymer latex | line 2 in the upper left colum at page 230 to final line at page 239 | — | — |
| Matting Material | line 1 in the upper left column to final line in the upper right column at page 240 | — | — |
| Photograph Processing Method (Process and aditive) | line 7 in the upper right column at page 3 to line 5 in the upper right column at page 10 | line 4 in the upper right column at page 39 to final line in the upper left column at page 42 | line 14 at page 67 to line 28 at page 69 |

Note)
Cited portion from Japanes Patent Application Laid-Open (JP-A) No. 62-215272 includes contents amended due to amendment dated on March 16, 1987.

Among the foregoing couplers, it is preferable that the yellow coupler be so called short-wave type coupler disclosed in Japanese Patent Application Laid-Open (JP-A) No. 63-231451, Japanese Patent Application Laid-Open (JP-A) No. 63-123047, Japanese Patent Application Laid-Open (JP-A) No. 63-241547, Japanese Patent Application Laid-Open (JP-A) No. 1-173-499, Japanese Patent Application Laid-Open (JP-A) No. 1-213648 and japanese Patent Application Laid-Open No. 1-250944.

The silver halide emulsion for use in the present invention may be emulsion having halogen composition, such as iodine silver bromide, iodine silver chloride, iodine bromide chloride, chlorine silver bromide, silver bromide and silver chloride. In particular, in the case of a color negative film, it is preferable that a layer containing iodine silver bromide be formed. It is preferable that emulsion containing iodine by about 0.1 mol % to 10 mol % be used. In the case of color paper, it is preferable that an emulsion layer containing silver halide particles consisting of silver chloride by 90 mol % or more be formed at least one layer. More preferably, emulsion be composed of silver chloride by 95 mol % to 99.9 mol % or more, more preferably 98 mol % to 99.9 mol % or more. It is preferable that the overall layer be formed by chorine silver bromide emulsion composed of silver chloride by 98 mol % to 99.9 mol % or more. Although the quantity of silver to be applied is not limited particularly, it is preferable that the quantity be about 2 $g/m^2$ to about 10 $g/m^2$ in the case of the color negative film and about 0.2 $g/m^2$ to about 0.9 $g/m^2$ in the case of the color paper.

The photosensitive material for use in the present invention may contain a variety of couplers as shown in Table 2.

As the cyan coupler, it is preferable that diphenylimidazole cyan coupler disclosed in Japanese Patent Application Laid-Open (JP-A) No. 2-33144, 3-hydroxy pyridine cyan coupler disclosed in EPO 333,185A2 (in particular, it is preferable to employ the exemplified coupler in the form of two equivalents by giving chlorine desorption base to a four equivalent coupler of coupler (42) and couplers (6) and (9)). Moreover, a cyclic active methylene cyan coupler disclosed in Japanese Patent Application Laid-Open (JP-A) No. 64-32260 can preferably be employed (in particular, examples of couplers 3, 8 and 34 are preferred couplers).

It is preferable that the photosensitive material according to the present invention have a structure in which dye (in particular, oxonol dye) which has been disclosed in Europe Patent EPO 337,490A2, pp. 27 to 76 and which can be decolored due to process is added to the hydrophilic collide layer in such a manner that the optical reflection density of the photosensitive material at 680 nm is 0.70 or more in order to improve the image sharpness. It is preferable that titanium oxide, the surface of which has been treated with dihydric to tetravalent alcohol (for example, trimethylolethane), be contained in the water-proof resin layer of the support member by 12 wt % or more (more preferably 14 wt % or more).

It is preferable that a color-image conservation improving compound as disclosed in Europe Patent EPO 277,589A2 be employed together with the coupler in the color photographic sensitive material according to the present invention. In particular, it is preferable to combination-use of pyrazoloazole coupler.

That is, it is preferable that a compound (F) which is chemically bonded with the aromatic amine developer base left after the color development process, which is chemically inactive and which substantially generate colorless compound and/or a compound (G) which is chemically combine with an oxide of the aromatic amine color developer base left after the color development process, which is chemically inactive and which substantially generates colorless compound be simultaneously or solely employed. Thus generation of stains and other side effects can be prevented which are due to generation of coloring matters as a result of reactions between color developing base or its oxide left in the film during reservation after the process and the coupler.

It is preferable that a mildewproofing agent be added as to the photosensitive material according to the present invention as disclosed in Japanese Patent Application Laid-Open (JP-A) No. 63-271247 to prevent various mildness and bacteria which propagate in the hydrophilic colloid and deteriorate the image.

It is preferable for the present invention that the dry thickness of the silver halide color photographic sensitive material except the support member be 25 µm or less to prevent reduce the quantity of carry over and to improve the silver restoring efficiency. In particular, it is preferable that the dry thickness be about 13 µm to about 23 µm in the case of the color negative film and about 7 µm to about 12 µm in the case of the color paper.

The reduction in the film thickness can be achieved by reducing the quantities of gelatin, silver, oil and coupler. It is most preferable that the thickness be reduced by reducing the quantity of gelatin. The film thickness can be measured by a known method after allowing the sample to stand at 25° C. and 65% RH for two weeks.

It is preferable that the degree of swelling of the photographic layer of the silver halide color photographic sensitive material be 1.5 to 4.0 to prevent stains and improve the image conservation properties. In particular, if the degree of swelling is 1.5 to 3.0, an excellent effect can be obtained. The degree of swelling for use in the description of the present invention is a value obtained by dividing the film thickness of the photographic layer realized after the color photosensitive material has been immersed in distilled water, the temperature of which is 33° C. by the film thickness of the dry photographic layer.

The photographic layer is a hydrophilic colloid layer including at least one photosensitive silver halide emulsion layer and stacked in the relationship having mutual water permeability. A back layer formed opposite to the photographic layer across the support member is not included. The photographic layer is generally composed of a plurality of layers which concern forming of the photographic image. The photographic layer includes, in addition to the silver halide emulsion layer, an intermediate layer, a filter layer, a halation preventive layer and a protective layer.

The degree of swelling may be adjusted by any method. It can be adjusted by changing the quantity and the type of gelatin for use in the photographic film, the quantity and the type of a hardener, the drying conditions and time passage conditions after the photographic layer has been applied. Although it is advantageous to employ gelatin in the photographic layer, a further hydrophilic collide may be employed. For example, gelatin derivative, graft polymer of gelatin and other polymer, protein, such as albumin or casein, cellulose derivative, such as hydroxyethylcellulose, carboxymethylcellulose, cellulose sulfate, sulfate derivative, such as alginic acid soda or starch derivative; and synthetic hydrophilic polymers in a sole form or a copolymer, such as polyvinyl alcohol, polyvinyl alcohol partial acetal, poly-N-vinylpyrolidone, polyacrilic acid, polymethacrylic acid, polyacrylamide, polyvinylimidazle and polyvinylpyrazole.

As the gelatin, gelatin treated with calx or that treated with acid may be employed. Moreover, hydrolyzed gelatin and gelatin decomposed with enzyme may be employed. The gelatin derivative is formed by causing any of the following compounds to react with gelatin: acid halide, acid anhydride, isocyanate, bromoacetate, alkasarton, vinylsulfonic amide, maleinamide compound, polyalkylene oxide, and epoxy compound.

The gelatin graft polymer may be formed by grafting vinyl monomer (homo) or copolymer, such as aclyric acid, methaacrylic acid, derivatives of their esters and amides acrylonitrile, or styrene. It is preferable that a graft polymer with a polymer having somewhat compatibility with gelatin be employed which is exemplified by acrylic acid, methaacrylic acid, acrylamide, methaacrylamide and hydroxyacryl methaacrylate. The foregoing examples have been disclosed in U.S. Pat. No. 2,763,625, U.S. Pat. No. 2,831, 767 and U.S. Pat. No. 2,956,884. Typical synthetic hydrophilic polymeric materials have been disclose in, for example, West Germany Patent Application (OLS) 2,312, 708, U.S. Pat. No. 3,620,751, U.S. Pat. No. 3,879,205 and Japanese Patent Application Publication (JP-B) No. 43-7561.

The hardener is exemplified by chrome salt (chrome alum or chrome acetate), aldehyde (formaldehyde, glyoxal and glytalaldehyde), N-methylol compound (dimethylolurea, methyloldimethylhydantoin), dioxane derivative (2,3-triacryloyl-hexahydro-s-triazine, bis (vinylsulfonyl) methylether, N,N'-methhylene bis [β-(vinylsulfonyl) propionamide]), active halogen compound (2,4-dichlor-6-hydroxy-s-triazine), mucohalogate (mucochloric acid and mucophenoxychloric acid), isooxazole, dialdehyde starch, 2-chrolo-6-hydroxytriazinyl gelatin or their mixture.

A preferred hardener is aldehyde, active vinyl compound and active halogen compound.

The support member for use in the photosensitive material according to the present invention is may be structured such that a layer including white polyester supporter or white pigment is formed on the support member on the side having the silver halide emulsion layer to form display. In order to improve sharpness, it is preferable that an anti-halation layer is applied to the surface of the support member on which the silver halide emulsion layer is applied or the reverse side. In particular, it is preferable that the transmissive density of the support member be set to be 0.35 to 0.8 to enable the display to be recognized with reflected light or transmitted light.

The photosensitive material according to the present invention may be exposed with visible rays or infrared rays. The exposing method may be a low-illuminance exposure or high-luminance exposure. In the latter case, it is preferable to perform laser scanning exposure set to an exposing period $10^{-4}$ or shorter per pixel.

It is preferable that a band stop filter as disclosed in U.S. Pat. No. 4,880,726 be employed when the exposure is performed. As a result, light mixture can be deleted and color reproductive characteristic can considerably be improved.

The present invention may be adapted to various photosensitive material, that is, color negative film, color negative paper, color reversal paper, automatic positive paper, color reversal film, negative film for movie, positive film for movie, roentgen film, lis film for making a plate and black and white negative film. In particular, it is preferable that the present invention be adapted to the color negative film or the color negative paper.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 5 is a schematic view showing the structure of a final stabling bath;

FIGS. 6A and 6B are schematic views showing the structure of photosensors;

FIGS. 6C and 6D are schematic views showing the structure of a specific gravity meter;

FIG. 23 is a table showing maps of quantity of residual silver:

FIG. 24 is a table showing another example of a peak portion of the spectrum distribution of emitted energy;

FIG. 31 is a table showing quantity of emission from each emitting diode;

DESCRIPTION OF THE PREFERRED EMBODIMENTS

Figure 1:
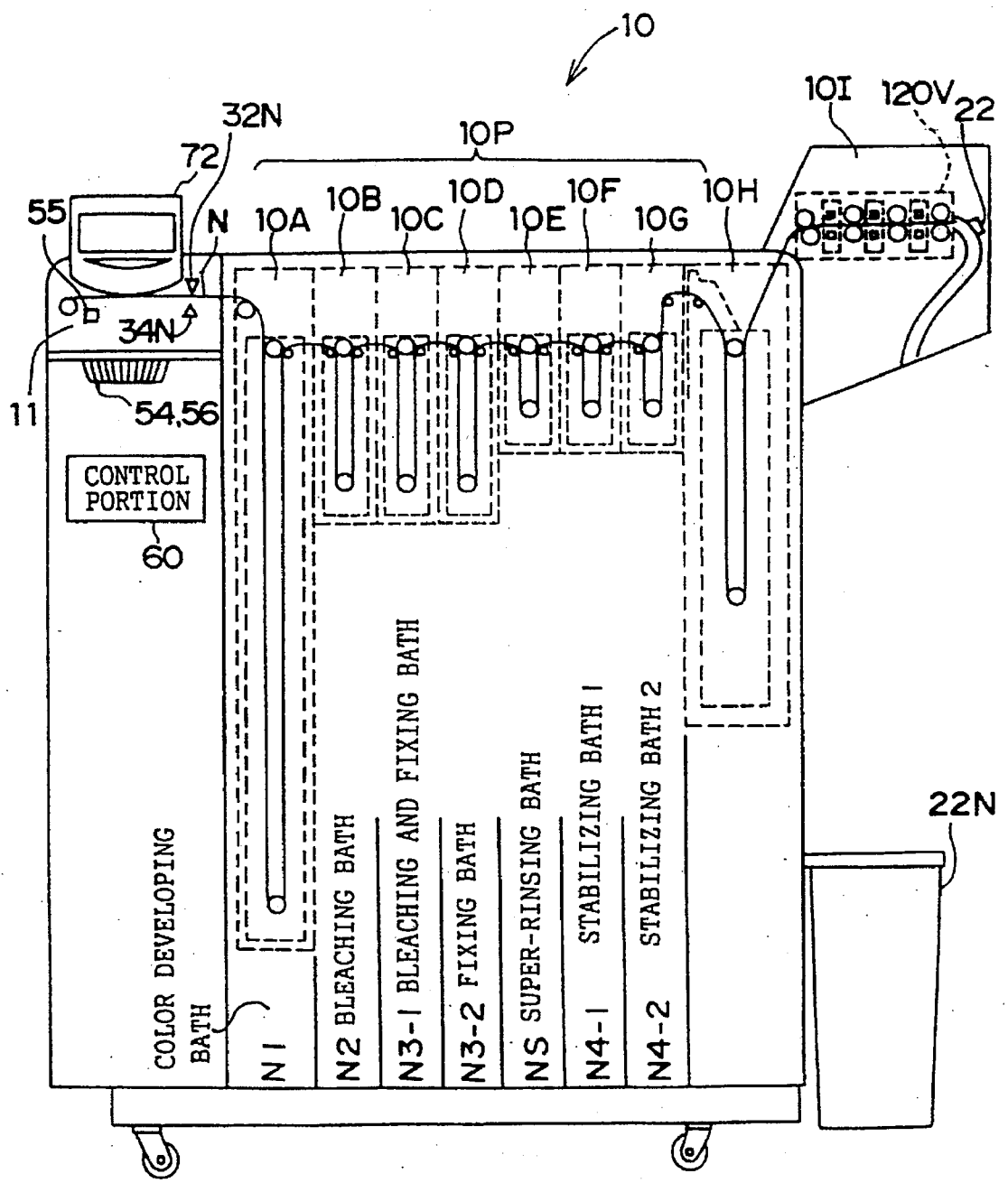
FIG. 1 is a schematic view showing the structure of a film processor according to an embodiment of the present invention.
Figure 2:
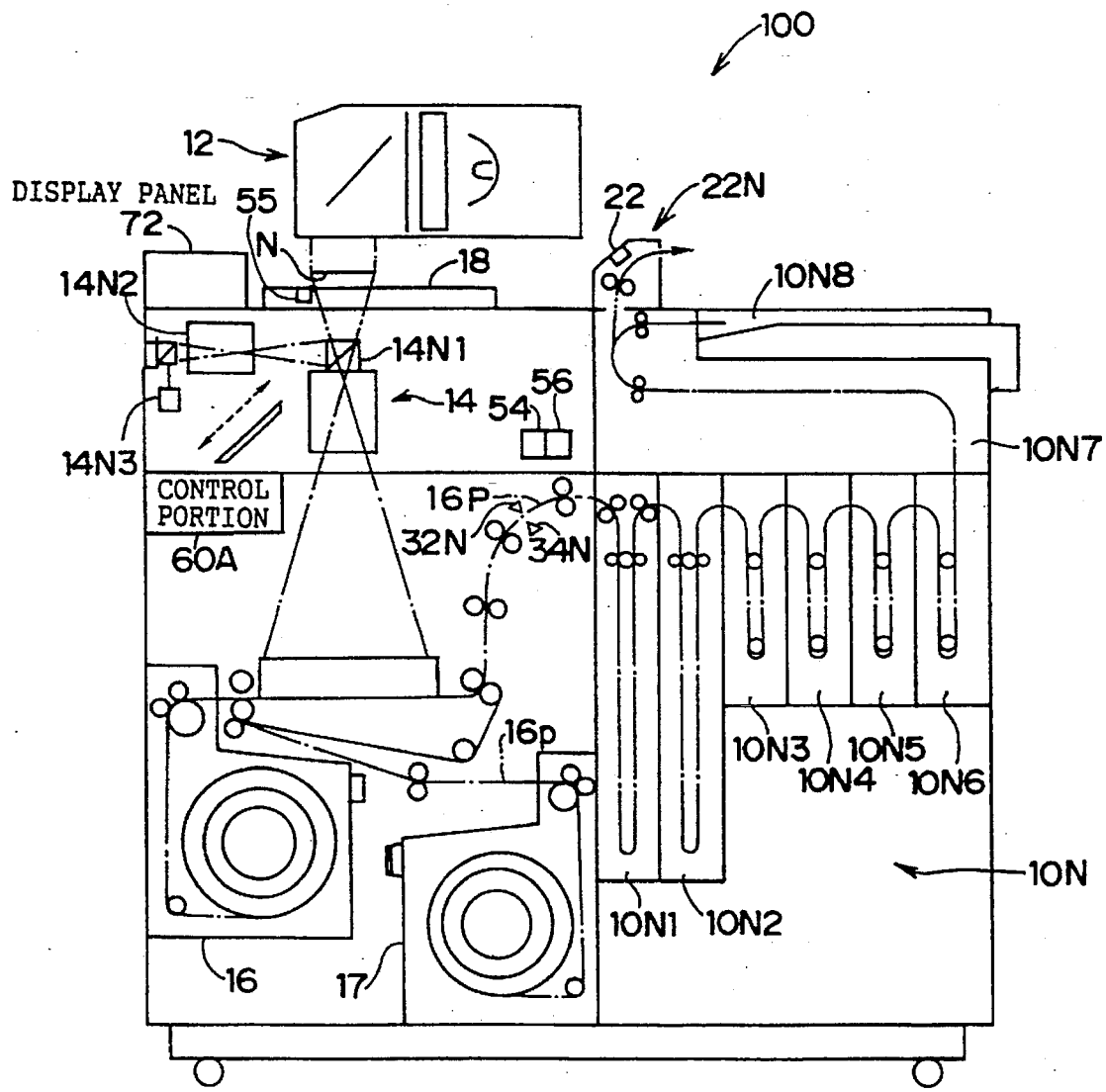
FIG. 2 is a schematic view sowing the structure of a printer processor according to the embodiment.

A first embodiment of the present invention will now be described with reference to the drawings. FIG. 1 shows a film processor 10 applied as the film processing apparatus according to the present invention. FIG. 2 shows a printer processor 100 applied as a print processing apparatus having exposing means. The film processor 10 develops a color negative film N which is an example of a photographic sensitive material for taking pictures on which images have been recorded. The printer processor 100 prints images recorded on the color negative film N developed by the film processor 10 onto photographic printing paper (hereinafter called "color paper P"), which is one of photographic sensitive materials for printing, so that the color paper P, on which the images have been printed, is developed to obtain a color print.

Initially, the film processor 10 will now be described. The film processor 10 comprises a mounting portion 11, on which a photographed negative film N is mounted a processor portion 10P for sequentially immersing the negative film N into a plurality of processing liquids, and drying portion 10H for drying the negative film N subjected to the processing liquid process.

The mounting portion 11 is shielded from light by a cover (not shown). When the cover is opened to expose the inside portion of the mounting portion 11, the negative film N can be mounted. The negative film N is mounted in a state where it is wound around, for example, a patron (a cartridge) and accommodated in the patron. In the film processor 10, after the negative film N has been mounted on the mounting portion 11, the cover is closed to shield the inside portion of the film processor 10 so as to prevent the sensitization of the negative film N. Then, the negative film N is pulled out from the cartridge to convey the negative film N toward the processor portion 10P.

A photosensor having an infrared emitting portion 32N and a detection portion 34N disposed to face each other while being apart from each other for a predetermined distance is disposed upstream from the processor portion 10P. As shown in FIGS. 6A and 6B, the infrared emitting portion 32N has a plurality (six in this embodiment(not limited to six)) of infrared emitting devices (infrared emitting diodes) 32N1 to 32N6 disposed in a direction (a widthwise direction of the negative film N) intersecting the direction in which the negative film N is conveyed (a direction indicated by an arrow X shown in FIGS. 6A and 6B). The detection portion 34N comprises a detection devices (photodiodes) 34N1 to 34N6 for respectively detecting infrared rays emitted from the infrared emitting devices 32N1 to 32N6, the detection devices 34N1 to 34N6 being disposed in a direction intersecting the direction X in which the color paper P is conveyed. Note that the infrared emitting devices 32N1 to 32N6 and the detection devices 34N1 to 34N6 are connected to a control portion 60 (see FIG. 7).

The processor portion 10P has a color developer bath 10A for reserving color developer, a bleach bath 10B for reserving bleaching solution, a bleach-fix bath 10C for reserving bleach-fixing solution, a fixing bath 10D for reserving fixing solution, a super rinse bath 10E for reserving rinsing solution and stable bath liquid baths 10F and 10G for respectively reserving stable bath liquid, which are sequentially disposed in the direction in which the negative film N is conveyed. The negative film N introduced into the processor portion 10P is guided and conveyed by a conveying means (not shown) so as to be sequentially immersed in the foregoing solutions so that the negative film N is developed, followed by being conveyed to a drying portion 10H.

While conveying the negative film N, the drying portion 10H blows dry air generated by a heater and a fan (not shown) to dry the negative film N, and then drying portion 10H conveys the negative film N to the film leader accumulation portion 10I. In the film leader accumulation portion 10I, film leaders (not shown) of the negative film N for guiding the negative films N, in the direction in which the negative film N is conveyed, are hung from a hanger (not shown) and the rear end of the negative film N in the direction in which the negative film N is conveyed is accommodated in an accommodation box 22N so that the negative film N is hung.

The mounting portion 11 of the film processor 10 has a code reading sensor 55 for reading a bar code and a DX code having information about the negative film N encoded and recorded on the cartridge. The film leader accumulation portion 10I has an infrared-ray sensor unit 120V and a density meter 22. The film processor 10 has, at positions, for example, below the mounting portion 11 thereof, an environmental temperature sensor 54 and an environmental humidity sensor 56 for respectively detecting the temperature and humidity of the operation environment. Note that the positions of the environmental temperature sensor 54 and the environmental humidity sensor 56 are not limited if they are not affected by heat from the processor portion 10P and the drying portion 10H.

Figure 3:
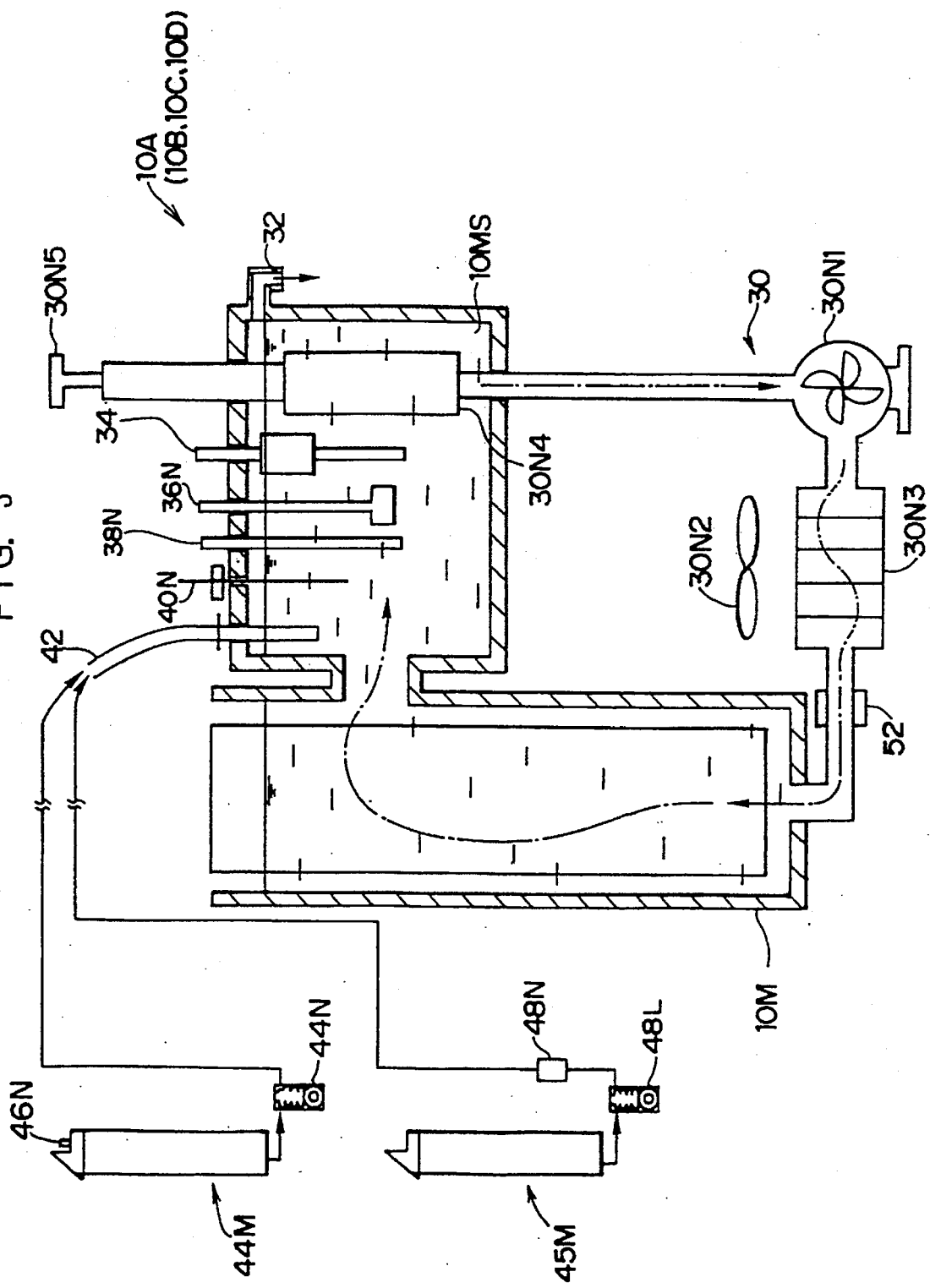
FIG. 3 is a schematic view showing the structure of a color developing bath.
Figure 4:
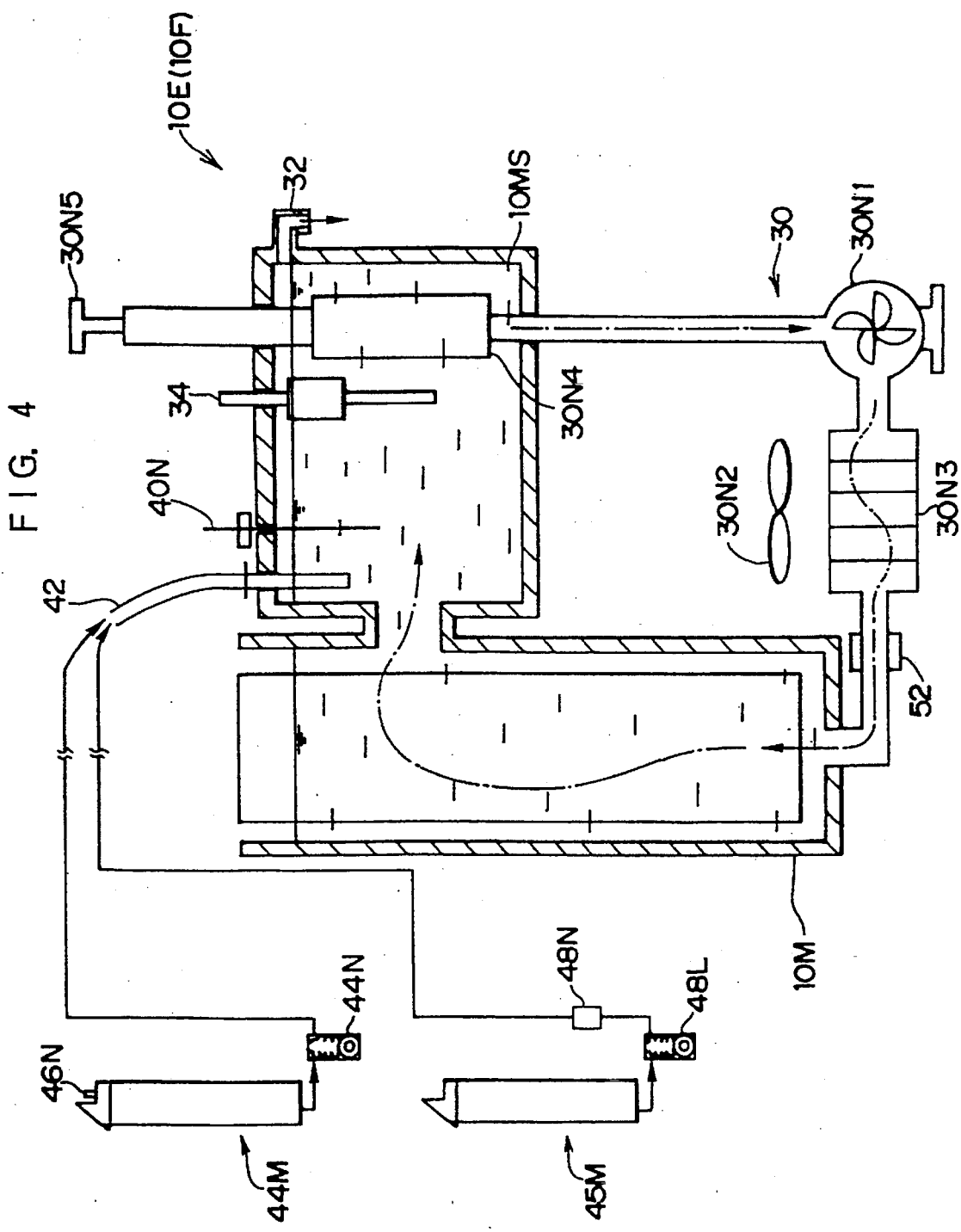
FIG. 4 is a schematic view showing the structure of a superinsing bath.

FIGS. 3 to 5 show the schematic structures of the color developer bath 10A, the super rinse bath 10E and the stable bath liquid bath 10G. Although the processing solutions are different from one another, each of the bleach bath 10B, the bleach-fix bath 10C and fixing bath 10D has substantially the same structure as that of the color developer bath 10A. The stable bath liquid bath 10F has substantially the same structure as that of the super rinse bath 10E. The color developer bath 10A, the super rinse bath 10E and the stable bath liquid bath 10G will now be described and the other baths are omitted from description.

As shown in FIG. 3, the color developer bath 10A has a processing tank 10M, a sub-tank 10MS allowed to communicate with the processing tank 10M, a replenisher tank 44M for supplying replenisher to the processing tank 10M through the sub-tank 10MS, a water supply tank 45M for reserving water for diluting the replenisher.

The sub-tank 10MS has a supply nozzle 42 connected to the replenisher tank 44M and the water supply tank 45M. When supply pumps 44N and 48L are operated, the replenisher and water are supplied from the replenisher tank 44M and the water supply tank 45M.

The replenisher tank 44M has a supersonic level meter 46N for detecting the liquid level of the replenisher in the replenisher tank 44M. Moreover, a flow meter 48N is disposed at an intermediate position of piping for establishing the connection between the water supply tank 45M and the supply nozzle 42. As a result, the quantities of replenisher and water respectively supplied from the replenisher tank 44M and the water supply tank 45M to the sub-tank 10MS can accurately be measured.

The sub-tank 10MS has a temperature sensor 40N for detecting the temperature of the color developer in the sub-tank 10MS, a pH sensor 38N for detecting pH of the color developer, a specific gravity meter 36N for detecting the specific gravity of the color developer and a level detector 34 for detecting the level of the color developer.

Between the bottom portion of the processing tank 10M and the sub-tank 10MS, there is disposed a circulation unit 30. The circulation unit 30 has a circulation pump 30N1, a cooling fan 30N2, a heater 30N3 and a circulation filter 30N4 attached through the circulation flow meter 52 and a filter mounting rod 30N5. Thus, while being stirred uniformly, the color developer in the processing tank 10M is, by the circulation unit 30, maintained at a predetermined temperature (or in a predetermined temperature range) for optimally processing the negative film N. At this time, the temperature sensor 40N detects the temperature of the processing solution to feedback-control the cooling fan 30N2 and the heater 30N3. Moreover, while being uniformly stirred, the replenisher and water are supplied into the sub-tank 10MS through the supply nozzle 42 so that the replenisher is replenished.

Note that an overflow pipe 32 is provided for the sub-tank 10MS so as to cause the surplus processing solution in the processing tank 10M due to replenishment of the replenisher and water to overflow and discharge the same.

FIG. 4 shows the schematic structure of the super rinse bath 10E. The super rinse bath 10E is different from the color developer bath 10A shown in FIG. 3 in that the sensors corresponding to the pH sensor 38N and the specific gravity meter 36N provided for the sub-tank 10MS are excluded.

FIG. 5 shows the schematic structure of the stable bath liquid bath 10G. The stable bath liquid bath 10G is different from the super rinse bath 10E shown in FIG. 4 in that an electricity conductivity meter 50 comprising a coil is disposed between the circulation filter 30N4 and the circulation pump 30N1.

FIGS. 6C and 6D show an example of the specific gravity meter 36N. The specific gravity meter 36N comprises a measuring portion 62 and a detection portion 68. The detection portion 68 has a pair consisting of an oscillator 64H for oscillating supersonic waves and a receiver 66H for receiving supersonic waves oscillated by the oscillator 64H. The oscillator 64H comprises, for example, a piezoelectric device, such as a piezoelectric ceramic device, which is applied with a predetermined voltage level from a oscillation circuit 72 of the measuring portion 62 so as to oscillate predetermined supersonic waves. The receiver 66H transmits a signal corresponding to the received supersonic waves.

The oscillator 64H and the receiver 66H are attached to a support member 52H, on which the processing solution flows, such that the oscillator 64H and the receiver 66H are opposite to each other through the processing solution. The measuring portion 62 has a receiving circuit 74 connected to the receiver 66H, a time measuring circuit 76 to which the oscillation circuit 72 and the receiving circuit 74 are connected and a calculating circuit 78 to which the time measuring circuit 76 are connected. As a result, the specific gravity meter 36N measures the difference in the time between the supersonic waves generated by the oscillator 64H and those received by the receiver 66H so as to transmit a signal corresponding to the propagation velocity of the supersonic waves in the processing solution.

That is, distance D1 between the oscillator 64H and the receiver 66H and inner diameter D2 and the material of the support member 52N enable the velocity of the supersonic waves propagating through the support member 52N to previously be detected. Thus, the calculating circuit 78 transmits, to a control portion 60 to be described later, an output value (for example, in units of mV) corresponding to the propagation velocity of the supersonic waves generated by the oscillator 64H in the processing solution. The control portion 60 is arranged to select a map (see FIGS. 19A–19D) previously stored and corresponding to the quantity of the negative film N to be processed so as to obtain the specific gravity of the processing solution in accordance with the output value from the calculating circuit 78.

Figure 7:
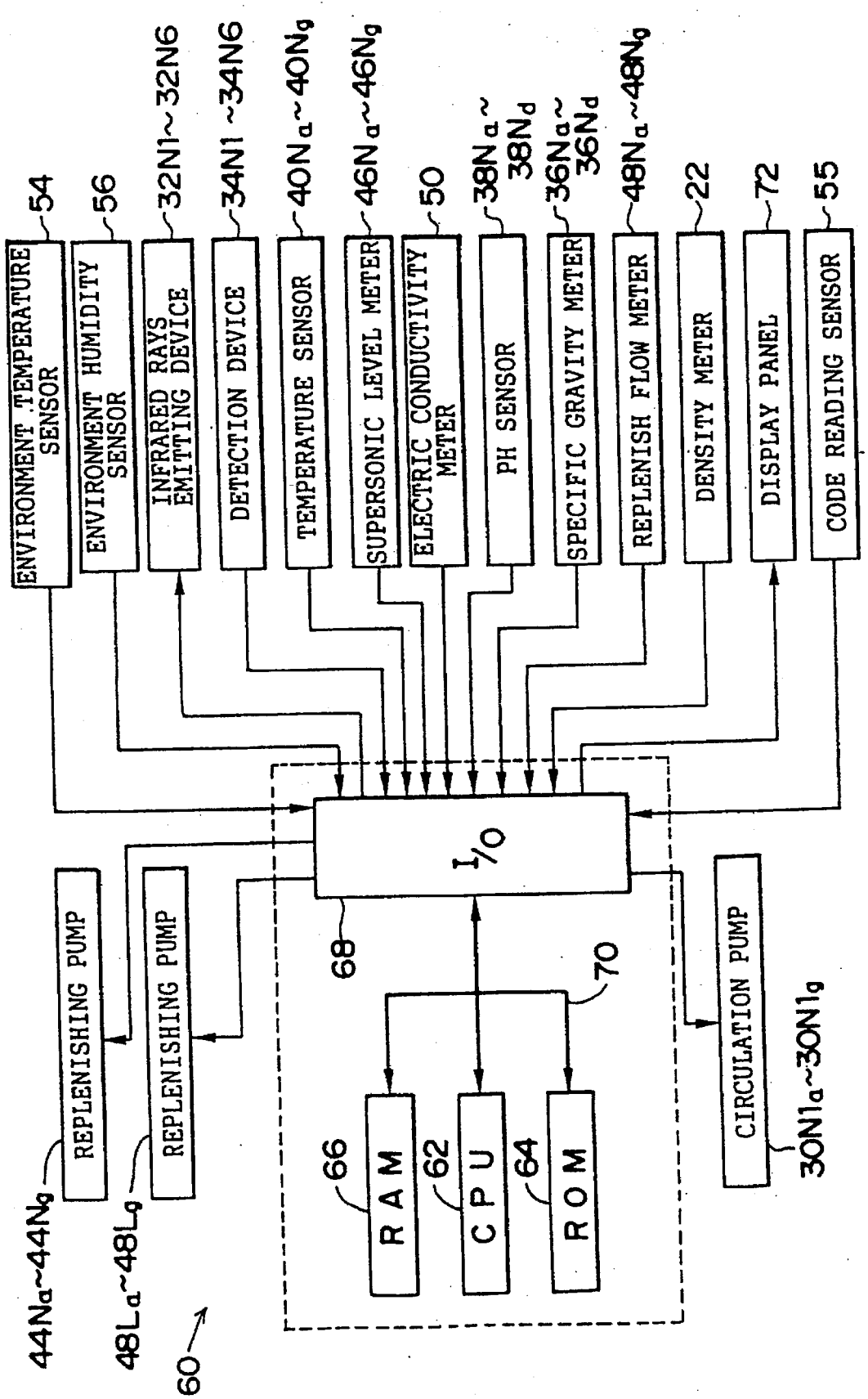
FIG. 7 is a schematic view showing the structure of a control system of the film processor.

As shown in FIG. 7, the control portion 60 has a microcomputer consisting of a CPU 62, a ROM 64, a RAM 66, an input/output port 68 and a bus for mutually connecting the foregoing elements to one another.

Suffixes added to the reference numerals of the elements shown in FIG. 7 indicates that suffix a indicates elements of the color developer bath 10A, and suffixes b, c, d, e, f and g respectively indicates elements of bleach bath 10B, bleach-fix bath 10C, fixing bath 10D, super rinse bath 10E and stable bath liquid baths 10F and 10G. That is, the following elements are connected to the input/output port 68: temperature sensors 40Na to 40Ng, supersonic wave level meters 46Na to 46Ng, an electric conductivity meter 50g, pH sensors 38Na to 38Nd, specific gravity meters 36Na to 36Nd, replenisher flow rate meters 48Na to 48Ng, a density meter 22 and a code reader 55. Moreover, the following elements are connected to the input/output port 68: a display panel (also refer to FIG. 1), replenisher pumps 44Na to 44Ng, water supply pumps 48La to 48Lg and circulation pumps 30N1a to 30N1g. In the control portion 60, the mounting portion 11, a conveyance passage for conveying the negative film N and the drying portion 10H are connected (not shown). Moreover, the infrared-ray sensor unit 120V is connected.

Figure 8:
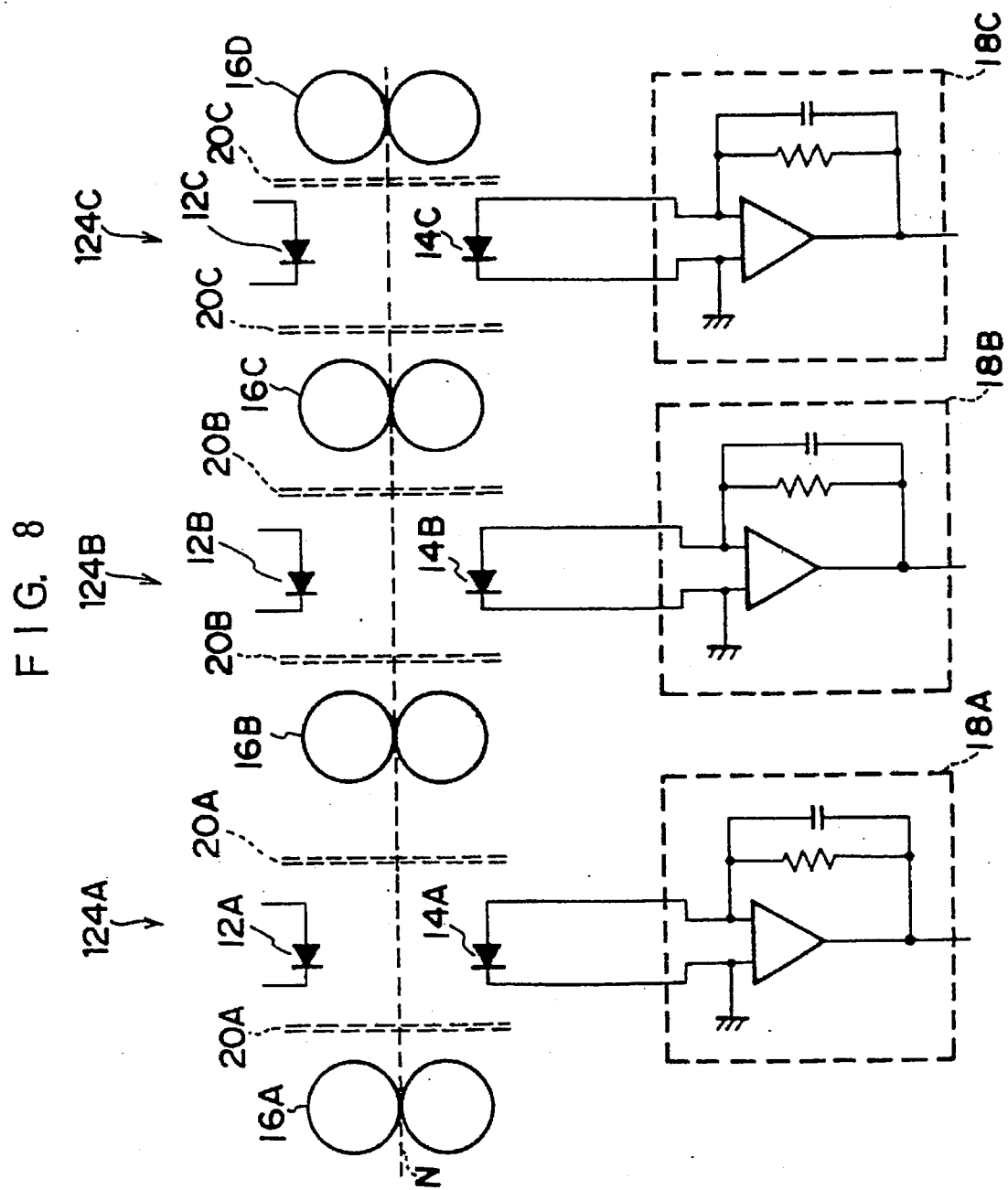
FIG. 8 is a schematic view showing an infrared sensor unit.

The infrared-ray sensor unit 120V will now be described with reference to FIG. 8. The infrared-ray sensor unit 120V has infrared emitting diodes (hereinafter called emitting diodes) 12A, 12B and 12C. The emitting diodes 12A, 12B and 12C may be emitting diodes of liquid phase epitaxial type using gallium arsenide (GaAs). The emitting diodes may be replaced by carbon dioxide ($CO_2$) laser unit or carbon monoxide (CO) laser unit.

Photodiodes 14A, 14B and 14C, which are photovoltaic photoelectric conversion devices, are disposed to oppose the emitting diodes 12A, 12B and 12C. The photovoltaic photoelectric conversion devices may be phototransistors in place of the photodiodes.

A sensor 124A consisting of the emitting diode 12A and the photodiode 14A, a sensor 124B consisting of the emitting diode 12B and the photodiode 14B and a sensor 124C consisting of the emitting diode 12C and the photodiode 14C are shielded from light by corresponding light-shielding boxes 20A, 20B and 20C.

Conveying roller pairs 16A, 16B, 16C and 16D each consisting of two rollers are disposed at a position upstream from the sensor 124A in the direction in which the negative film N is conveyed, between the sensor 124A and the sensor 124B, between the sensor 124B and the sensor 124C and at a position downstream from the sensor 124C in the direction in which the negative film N is conveyed. Thus, the negative film N is allowed to pass between the emitting diode 12A and the photodiode 14A, between the emitting diode 12B and the photodiode 14B, between the emitting diode 12C and the photodiode 14C. Note that the sensors 124A, 124B and 124C are disposed at the same intervals.

Amplifiers 18A, 18B and 18C are connected to the corresponding photodiodes 14A, 14B and 14C. Each of the amplifiers 18A, 18B and 18C comprises a resistor, a capacitor and an operational amplifiers.

Figure 9:
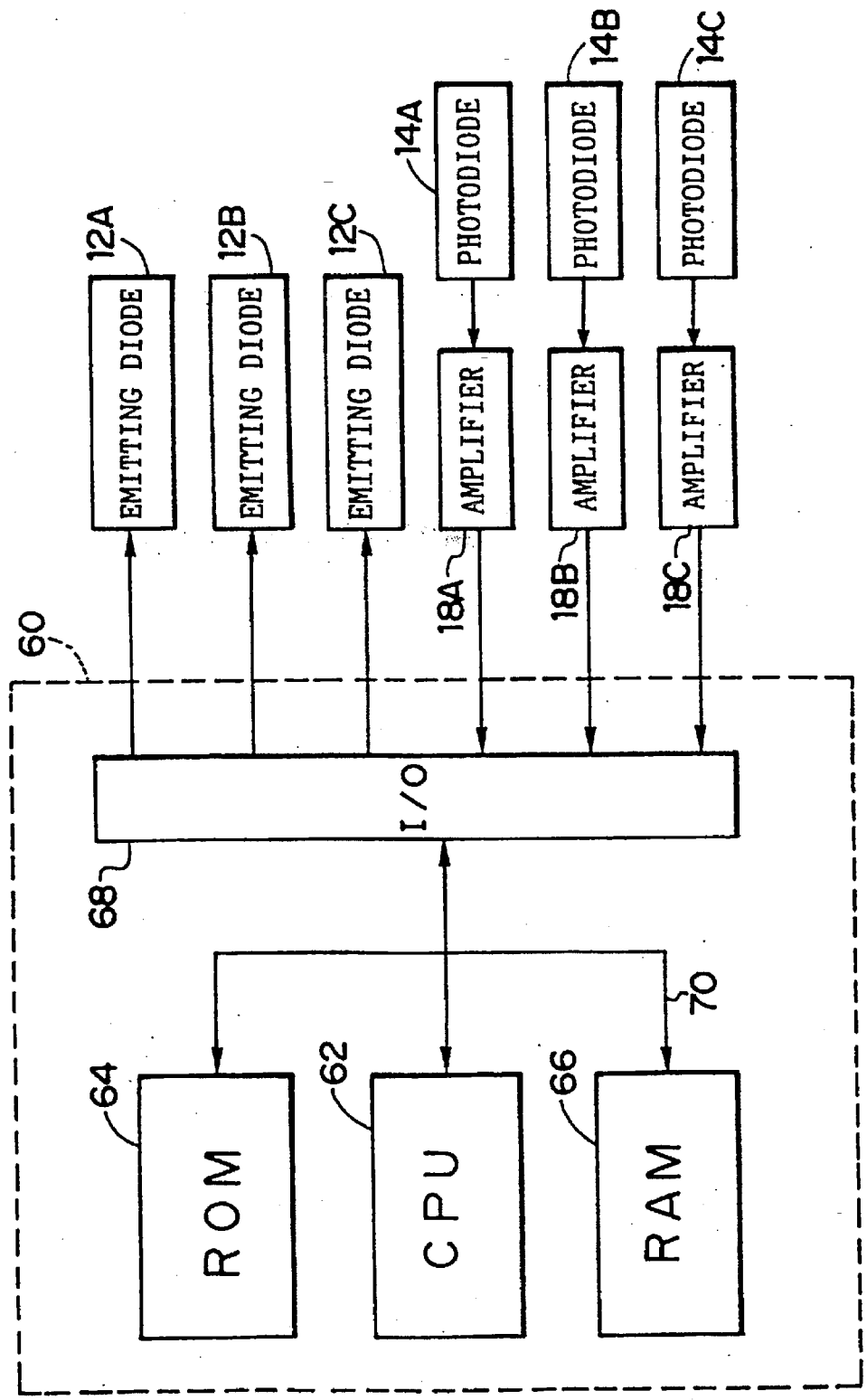
FIG. 9 is a schematic view schematic view showing the connection of the infrared ray unit to the control portion.

The photodiodes 14A, 14B and 14C of the infrared-ray sensor unit 120V are, through the emitting diodes 12A, 12B and 12C and the amplifiers 18A, 18B and 18C, connected to the detection portion 68 of the control portion 60 (see FIG. 9).

Figure 29:
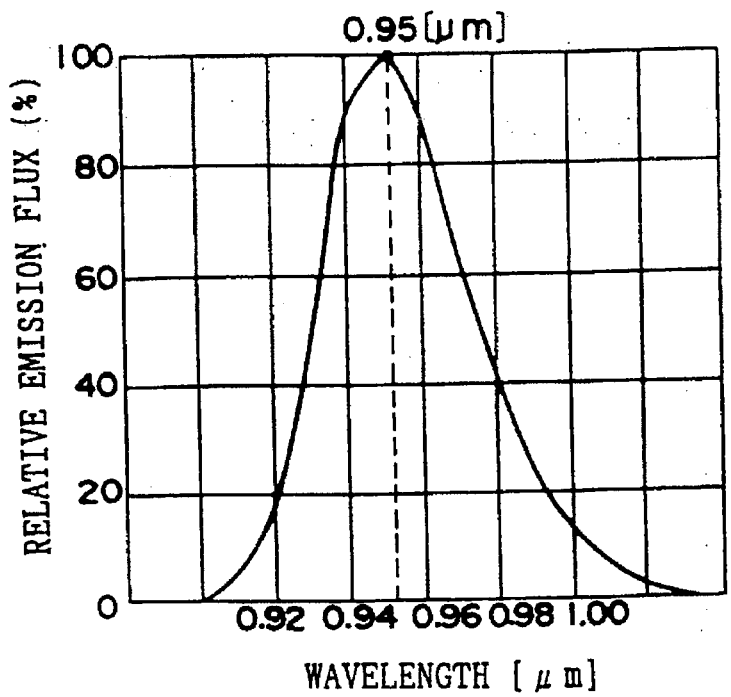
FIG. 29 is a graph showing spectrum distribution of emitting diode.

Infrared rays to be emitted from the emitting diodes 12A, 12B and 12C will now be described. Infrared rays to be emitted from the emitting diodes 12A, 12B and 12C emit energies having the same spectrum distribution and different quantities. That is, the spectrum distribution of energies emitted by each emitting diode has a peak value of 0.95 µm, as shown in FIG. 29. The emitted infrared ray energies (hereinafter called "radiant quantities") are, as shown in FIG. 31, such that the emitting diode 12A emits radiant quantity of W1, the emitting diode 12B emits radiant quantity of W2 (a value smaller than W1) and the emitting diode 12C emits radiant quantity of W3 (a value smaller than W2).

The radiant quantity W1 is a value which transmits through the negative film N even if the quantity of silver (silver halide) left in the negative film N processed with each processing solution is larger than 10 µg/cm². The radiant quantity W2 is a value which transmits through the negative film N if the quantity of silver left in the negative film N processed with each processing solution is not greater than 10 µg/cm². The radiant quantity W3 is a value which transmits through the negative film N if the quantity of silver left in the negative film N processed with each processing solution is not greater than 5 µg/cm².

If the quantity of silver left in the negative film N processed with each processing solution is larger than 10 µg/cm², a determination is performed that the desilverization performance of the processing solution is defective. If the quantity of silver left in the negative film N processed with each processing solution is not larger than 5 µg/cm², a determination is performed that the desilverization performance of the processing solution is excellent. If the quantity of silver left in the negative film N processed with each processing solution is larger than 5 µg/cm² and smaller than 10 µg/cm², a determination is performed that the desilverization performance of the processing solution is somewhat defective.

Figure 30:
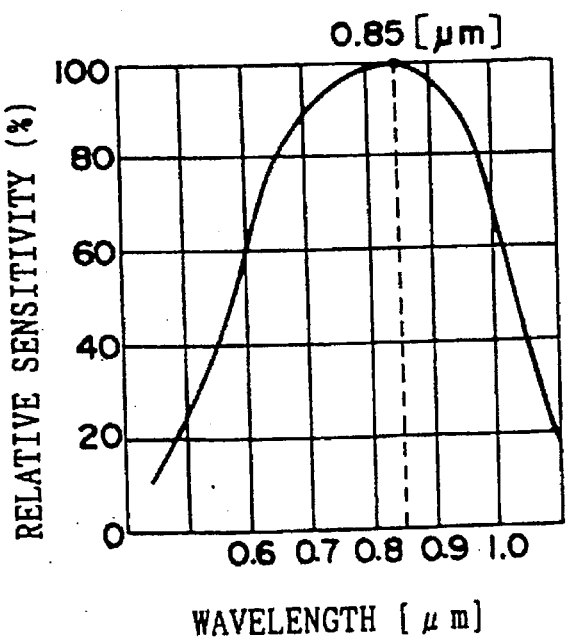
FIG. 30 is a graph showing spectrum sensitivity characteristic of a photodiode.

As shown in FIG. 30, the photodiodes 14A, 14B and 14C have the spectrum sensitivity characteristics, the peak of each of which is 0.85 µm.

Referring to FIG. 2, the printer processor 100 will now be described. Note that a control portion 60A provided for the printer processor 100 is connected to the control portion 60

(see FIG. 1) of the film processor 10 through a communication line (not shown).

The printer processor 100 comprises a light source portion 12 having a light regulating filter, a reflecting mirror and a halogen lamp, a paper magazine portion 16 accommodating color paper 16P which is the photographic sensitive material and a paper magazine portion 17 accommodating color paper 16p having size different from the color paper 16P.

Light emitted from the light source portion 12 is used to irradiate an exposing portion 14 through the negative film N loaded into a negative-film carrier 18. The color paper 16P drawn (in another case color paper 16p is drawn, hereinafter description will be made about the case of the color paper 16P) from a paper magazine portion 16 has an image of the negative film N printed thereto in the exposing portion 14, and then conveyed into a processor portion 10N.

The processor portion 10N consists of a color development processing bath 10N1, a bleach-fix bath 10N2, each of rinsing baths 10N3 to 10N6 and drying portion 10N7.

The color development processing bath 10N1 reserves color developer, the bleach-fix both 10N2 reserves bleach fixing processing solution and the rinsing baths 10N3 to 10N6 reserve water washing processing solution. As a result, the color paper 16P developed in the color development processing bath 10N1 is fixed in the bleach-fix bath 10N2, and then washed with water in the rinsing baths 10N3 to 10N6, and the dried in the drying portion 10N7 so that a color print is made. The color print is placed in a sorter portion 10N8.

The color development processing bath 10N1 and the bleach-fix bath 10N2 have substantially the same structure as that of the color developer bath 10A (see FIG. 3) of the film processor 10, the rinsing baths 10N3 to 10N6 have substantially the same structure as that of the super rinse bath 10E (see FIG. 4) of the film processor 10 and the rinsing bath 10N6 has substantially the same structure as that of the stable bath liquid bath 10G (see FIG. 5) of the film processor 10. Thus, their detailed descriptions are omitted here. The color development processing bath 10N1, the bleach-fix bath 10N2 and the rinsing baths 10N3 to 10N6 are controlled by a control portion 60A.

The printer processor 100 has, in the upper portion thereof (in the upper portion of FIG. 2) a display panel 72, a code reading sensor 55 provided for a negative-film carrier 18 for reading a bar code and a DX code recorded on the negative film N and a scanner 14N3 disposed opposite to the reflecting mirror 14N1 of the exposure portion 14 to detect light transmitted through the image on the negative film N through the lens 14N2 so as to detect the exposure (corresponds to the density of the negative film).

The control portion 60A of the printer processor 100, under predetermined conditions, integrate the exposures when the images of the negative film N are exposed to the color paper 16P in the exposing portion 14 so as to calculate the mean exposure and time-sequentially record the results of the calculations. In order to, for example, set the exposure conditions, the control portion 60A stores an exposure of a normal frame (a standard exposure frame) of a Bull's eye when an image of the Bull's eye negative film is printed onto the color paper 16P, the exposure being stored as a reference exposure which is subjected to a comparison with a result of calculation of the mean exposure. The result of the comparison is supplied to the control portion 60 of the film processor 10.

The scanner 14N3 may be a scanner comprising a MOS-type sensor or a CCD sensor. It is preferable that the employed scanner exhibits high resolving power to perform exposure appropriately to correspond to the image on the negative film N. For example, a VACCS sensor for use in a printer processor for a small-scale laboratory (a so-called minilaboratory) manufactured by Fuji Photo Film Co., Ltd. may be employed.

The printer processor 100 has the density meter 22 for measuring the density of the image on the color paper 16P conveyed into the density measuring portion 22N. The film processor 100 has, at positions which are not affected by heat of the drying portion 10N7 and the exposing portion 14, an environmental temperature sensor 54 and an environmental humidity sensor 56 for respectively detecting the temperature and humidity of the operation environment. Since the printer processor 100 is connected to the film processor 10, it may receive the environment temperature, environment humidity, the DX code and the like from the film processor 10.

At a position upstream from the color development processing bath 10N1 in the direction in which the color paper 16P is conveyed, there is disposed a photosensor in which an infrared-ray radiating portion 32N and a detection portion 34N are disposed opposite to each other. The infrared-ray radiating portion 32N and the detection portion 34N are arranged to be capable of detecting the area of the color paper 16P which has been processed.

The operation of this embodiment will now be described.

When the power source has been turned on, the film processor 10 and the printer processor 100 control the temperature of each of the processing solutions. When the negative film N has been mounted on the mounting portion 11 of the film processor 10, the processor portion 10P develops, fixes and washes with water the negative film N.

Note that the state where the power source has been turned on and the color paper 16P is being processed is called a "drive state". A state where the power source has been turned on and the negative film N or the color paper 16P is not processed is called a "standby state". A state where the power source is turned off and the temperature control is paused on, for example, a day in which the operation is paused or at night. In this embodiment, the description will be performed the standby state and the pause state are realized every day.

Figure 10:
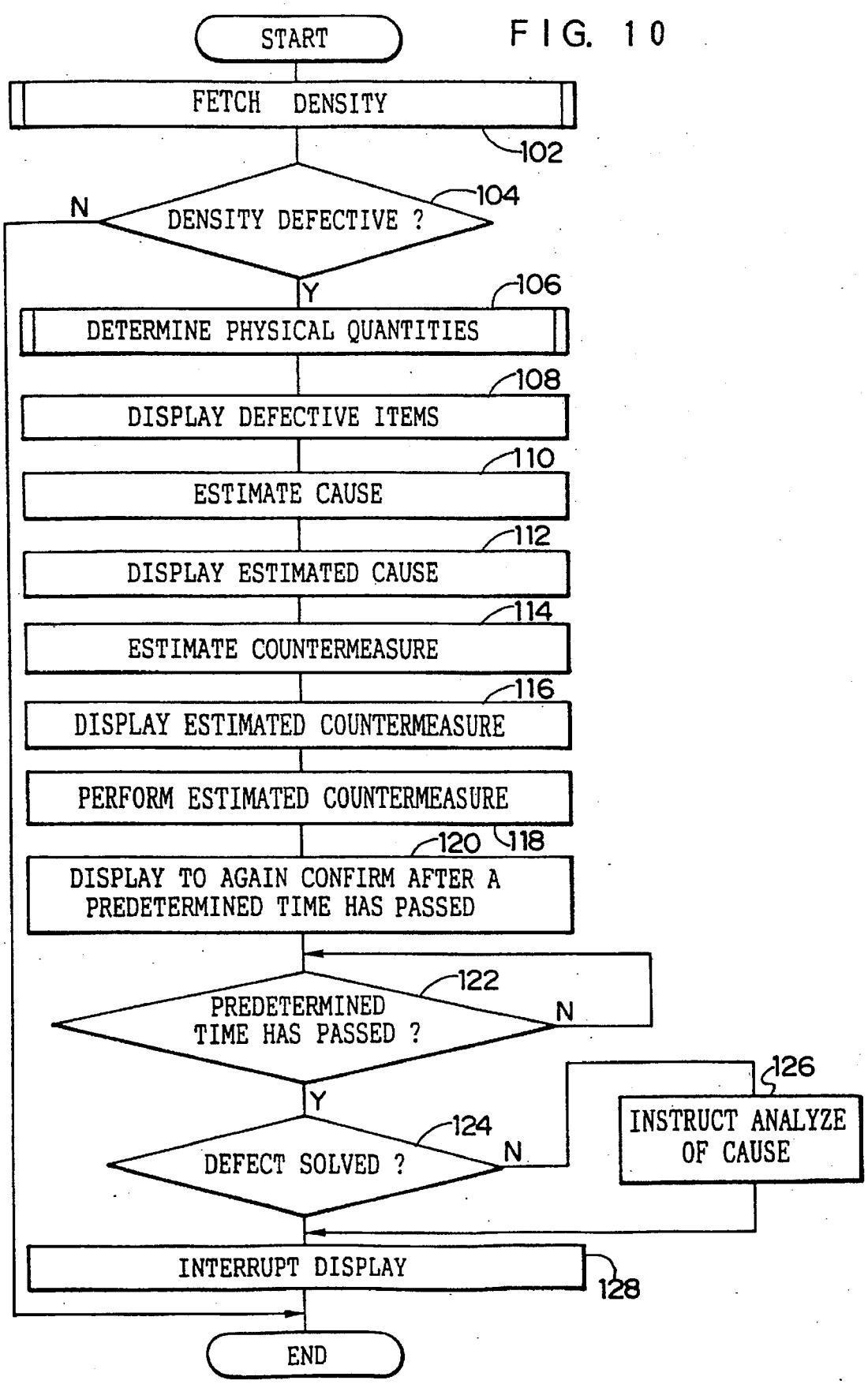
FIG. 10 is a flow chart showing an example of control of the processing performance.

Referring to FIG. 10, a routine for processing control of the processing performance will now be described in which the processing performance of the processing solution is controlled. Although the film processor 10 and the printer processor 100 are somewhat different from each other, the same basic flow can be employed to process the control of the processing performance. Thus, the description will be performed about the operation to be performed in the film processor 10 and that to be performed in the printer processor 100 is omitted here.

In the film processor 10, when conveyance of a control strip exposed under different reference exposure conditions and having unexposed portion (a $D_{min}$ portion), a low density portion (a LD portion) and a high density portion (HD portion) formed thereon starts, the operation starts. The control strip is sequentially conveyed from the color developer bath 10A to the stabilizing bath 10G so as to be subjected to the processing solution processes followed by being dried in the drying portion 10H and allowed to reach the density meter 22. In step 102 the density of the image recorded on the control strip is measured by the density meter 22 so as to fetch the density.

Figure 11:
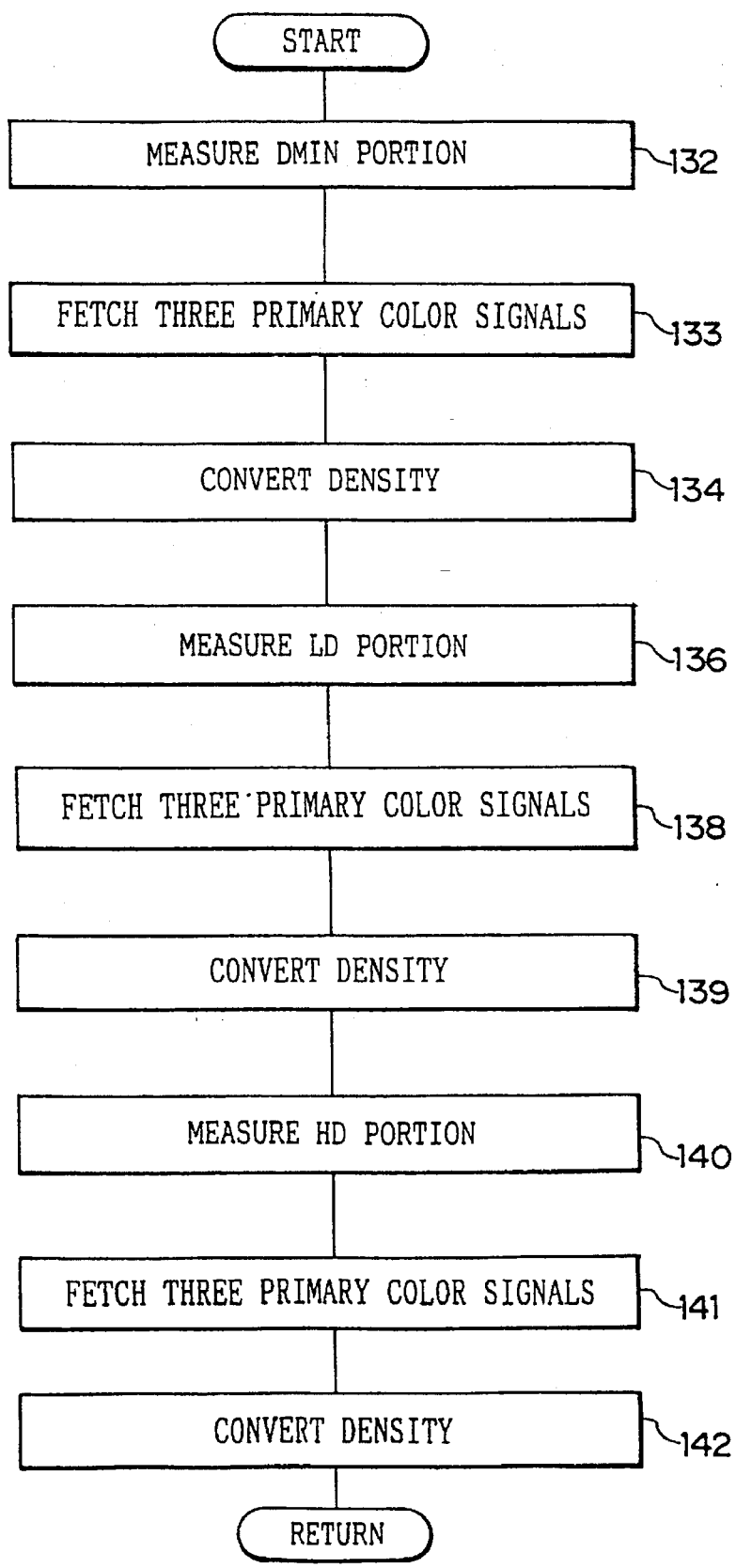
FIG. 11 is a flow chart showing an example of fetching density in step 102 shown in FIG. 10.

As shown in FIG. 11, fetching of the density is performed such that the $D_{min}$ portion is measured in step 132, and then in step 133 signals representing three primary colors, R, G and B measured, are fetched. In step 134 the fetched three primary colors are converted into densities of R, G and B.

Similarly, in steps 136 to 139 the luminous intensity of the LD portion is measured so as to convert the result of measurement into densities of R, G and B. In steps 140 to 142 the luminous intensity of the LD portion is measured so as to convert the result of measurement into densities of R, G and B. Then, the foregoing routine is ended.

As a result of the foregoing process, the densities of the three primary colors, R, G and B in the $D_{min}$ portion, the LD portion and the HD portion of the control strip are fetched.

In step 104 in the flow chart shown in FIG. 10 whether or not the fetched densities of the three primary colors, R, G and B of the exposed portion and the non-exposed portion are defective is determined. The determination is performed such that each of the fetched densities of the three primary colors, R, G and B of the exposed portion and the non-exposed portion is compared with an allowable range including the reference density of the three primary colors, R, G and B and an allowable range including the lowest density of the three primary colors, R, G and B. If the values of the fetched densities of the three primary colors, R, G and B of the exposed portion and the non-exposed portion are out of the allowable ranges, a determination is performed that a defect has taken place. Note that whether or not the densities of only one of the exposed portion and the non-exposed portion are abnormal may be determined.

If a negative determination in step 104 has been performed, the processing solution has appropriate performance. Thus, the process is ended. If an affirmative determination in step 104 is performed, a determination is performed that the processing performance of the processing solution is defective. To estimate the cause of the defect, the throughput, the temperature of the processing solution, the replenishment accuracy, electric conductivity, pH, specific gravity and the quantity of supplied water which are the physical quantities affecting the photographing characteristic of the negative film N, are determined in step 106. The determination process will now be described with reference to FIG. 12.

Figure 12:
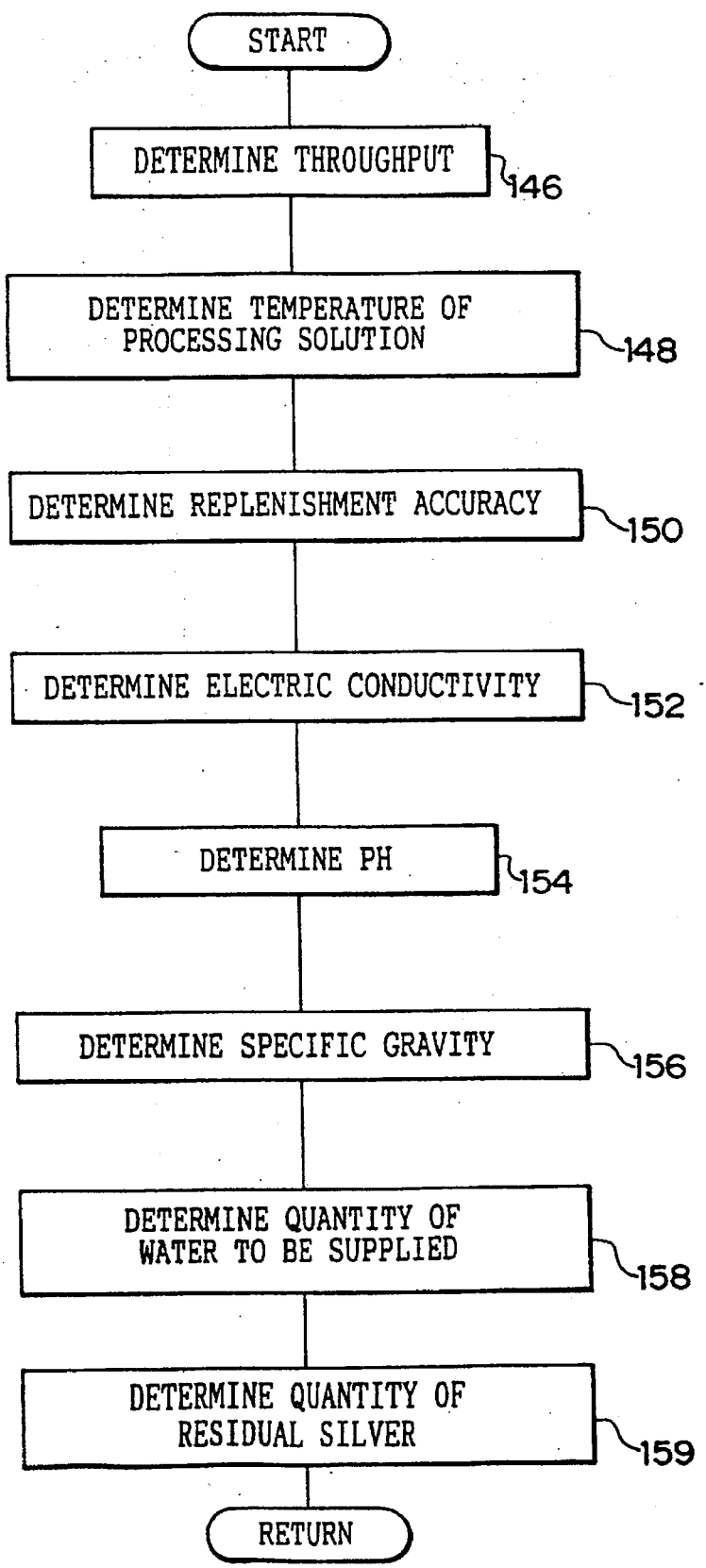
FIG. 12 is a flow chart showing an example of a routine for determining the physical quantity in step 106 shown in FIG. 10.

Referring to the flow chart shown in FIG. 12, in step 146 the throughput is determined. As described later, the throughputs of the negative films N for each week and each month are time sequentially stored in this embodiment. Therefore, the latest throughput of the negative film N for each week and each month is fetched. Whether or not the fetched throughput for each week and each month is within an allowable range (a range of the quantity of the negative films N to be processed to maintain the photographic characteristic of the negative film N within an allowable range) is determined. If either of the throughput for each week or that for each month is out of the allowable range, this fact (a defective item) is stored.

In step 148 the temperature of the processing solution is determined. Since the temperature of each processing solution is time sequentially stored, the temperature of each processing solution stored time sequentially is fetched. Whether or not the fetched temperature of each processing solution is within an allowable range with respect to a set temperature is determined. If any one of the fetched temperatures of the processing solutions is out of the allowable range, this fact (a defective item) is stored.

In step 150 the replenishment accuracy is determined. Since the replenishment accuracy on the basis of the throughput of the negative film N for one week has been stored as described later, the latest replenishment accuracy on the basis of the stored throughput of the negative films N for one week is fetched with reference to the data of date. Whether or not the fetched replenishment accuracy is within an allowable range (a range in which the replenishment accuracy is excellent) is determined.

The allowable range is for example, ± within 5%. If any one of the replenishment accuracies of the processing paths fetched is out of the allowable range, this fact (a defective item) is stored.

Although this embodiment has the arrangement such that if the replenishment accuracy of any one of the processing baths is out of the range of ±5%, this fact (a defective item) is stored, the result of determination may be stored such that whether or not the replenishment accuracy of each of the processing baths is within the range of +5% (a first allowable range) and the same is within a range of ±10% as well as out of ±5% (a second allowable range) is determined.

In step 152 the electric conductivity is determined. Since the electric conductivities of the stabilizer in the stabilizing bath 10G are time sequentially stored as described later, the time sequentially stored electric conductivities of the stabilizer are fetched. Whether or not the fetched electric conductivity is within an allowable range (an allowable range set on the basis of an ideal electric conductivity of the stabilizer in the stabilizing bath to maintain the photographic characteristic of the negative film N within an allowable range) is determined. If the fetched electric conductivity is out of the foregoing allowable range, this fact (a defective item) is stored.

In step 154 pH is determined. Since the pH of each of the color developer, the bleaching solution, the bleaching and fixing solution and the fixing solution (hereinafter called "processing solutions") has been stored time sequentially as described later, the time sequentially stored pH of each processing solution is fetched. Whether or not the fetched pH of each processing solution is within an allowable range (an allowable range set on the basis of an ideal pH of each processing solution to maintain the photographic characteristic of the negative film N within an allowable range) is determined. If any one of the fetched pH values of the processing solutions is out of the foregoing allowable range, this fact (a defective item) is stored.

In step 156 the specific gravity is determined. Since the specific gravity of each processing solution has been stored time sequentially as described later, the time sequentially stored specific gravity of each processing solution is fetched. Whether or not the fetched specific gravity of each processing solution is within an allowable range (an allowable range set on the basis of an ideal specific gravity of each processing solution to maintain the photographic characteristic of the negative film N within an allowable range) is determined. If any one of the fetched specific gravity of the processing solutions is out of the foregoing allowable range, this fact (a defective item) is stored.

In step 158 the quantity of supplied water is determined. Since the actual quantity of supplied water and ideal quantity of water to be supplied for each processing solution have been stored time sequentially as described later, a reference is made to data of date to fetch the stored and latest actual quantity of supplied water and theoretical quantity of water to be supplied. Whether or not the fetched actual quantity of supplied water is within an allowable range (an allowable range set on the basis of a theoretical quantity of water to be supplied to maintain the photographic characteristic of the negative film N within an allowable range) is determined. If any one of the fetched quantities of supplied water is out of the foregoing allowable range, this fact (a defective item) is stored. A water supply accuracy similar to the foregoing replenishment accuracy may be employed.

Figure 13:
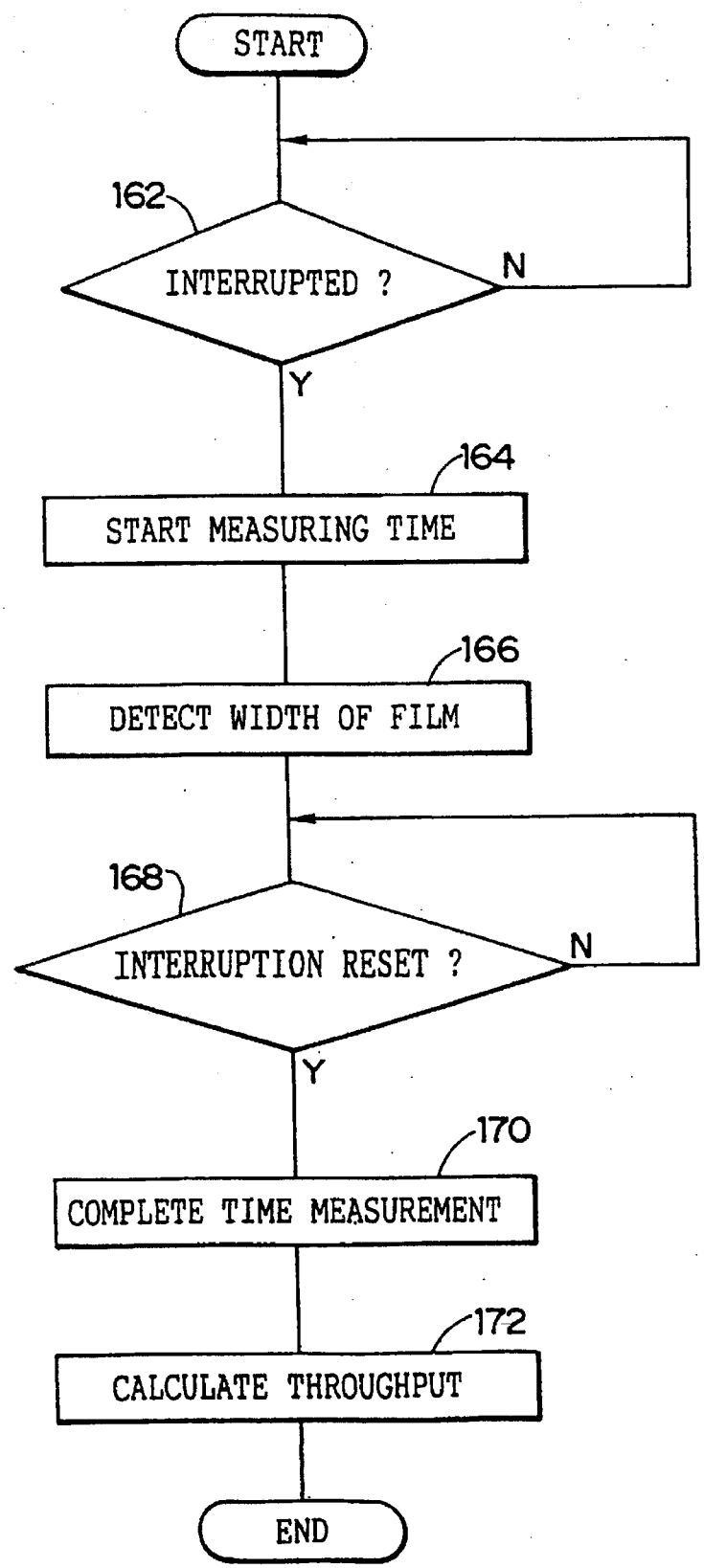
FIG. 13 is a flow chart showing detection of throughput.

A routine for detecting the throughput of the negative films N in step 146 will now be described with reference to FIG. 13.

As described above, the negative film N mounted on the mounting portion 11 is allowed to pass through between the infrared-ray radiating portion 32N and the detection portion 34N when it is conveyed to the processor portion 10P. Since the infrared emitting devices 32N1 to 32N6 always emit infrared rays, the infrared rays are intercepted when the negative film N passes between the infrared-ray radiating portion 32N and the detection portion 34N.

If any of the infrared rays from the infrared emitting devices 32N1 to 32N6 is intercepted, an interception signal is supplied from any one of the detection devices 34N1 to 34N6 to the control portion 60. If the interception signal has been supplied from any one of the detection devices 34N1 to 34N6, an affirmative determination in step 162 is performed. That is, a determination is performed that the leading end of the negative film N has passed through. Thus, in step 164 time measurement starts. In step 166 the width of the negative film N is detected from the number of the detection devices which have transmitted the interception signals. That is, since the infrared emitting devices 32N1 to 32N6 are disposed in the direction intersecting the direction X in which the negative film N is conveyed, passing of the negative film N between the infrared-ray radiating portion 32N and the detection portion 34N causes the detection devices 34N2 to 34N5 corresponding to the width of the negative film N to transmit the interception signals. Thus, the width of the negative film N can be detected from the number of the detection devices which have transmitted the interception signals.

In step 168 whether or not interception of infrared rays by the negative film N has been removed is determined so as to determine whether or not the trailing end of the negative film N has passed. If passage of the trailing end of the negative film N has been detected, the determination in step 168 is affirmed. In step 170 time measurement is ended. Thus, the time taken for the negative film N to pass between the infrared-ray radiating portion 32N and the detection portion 34N can be measured.

In step 172 the throughput of the negative films N is obtained by calculating the overall area of the negative films N processed continuously. That is, since the conveyance velocity of the negative film N has been determined previously, the length of the negative film N can be detected from the conveyance velocity and the measured time. Thus, the detected length and the width of the negative film N detected in step 146 are used to calculate the overall area of the negative film N.

As described above, whenever the negative film N has been processed, the total areas (the throughput) of the processed negative films N are integrated. Thus, each throughput of the negative films N for one day, one week, one month and for a period up to now from a fresh state of the processing solution (a state where the negative film N is not processed) is time sequentially stored with data of date (year, month and day).

Figure 14:
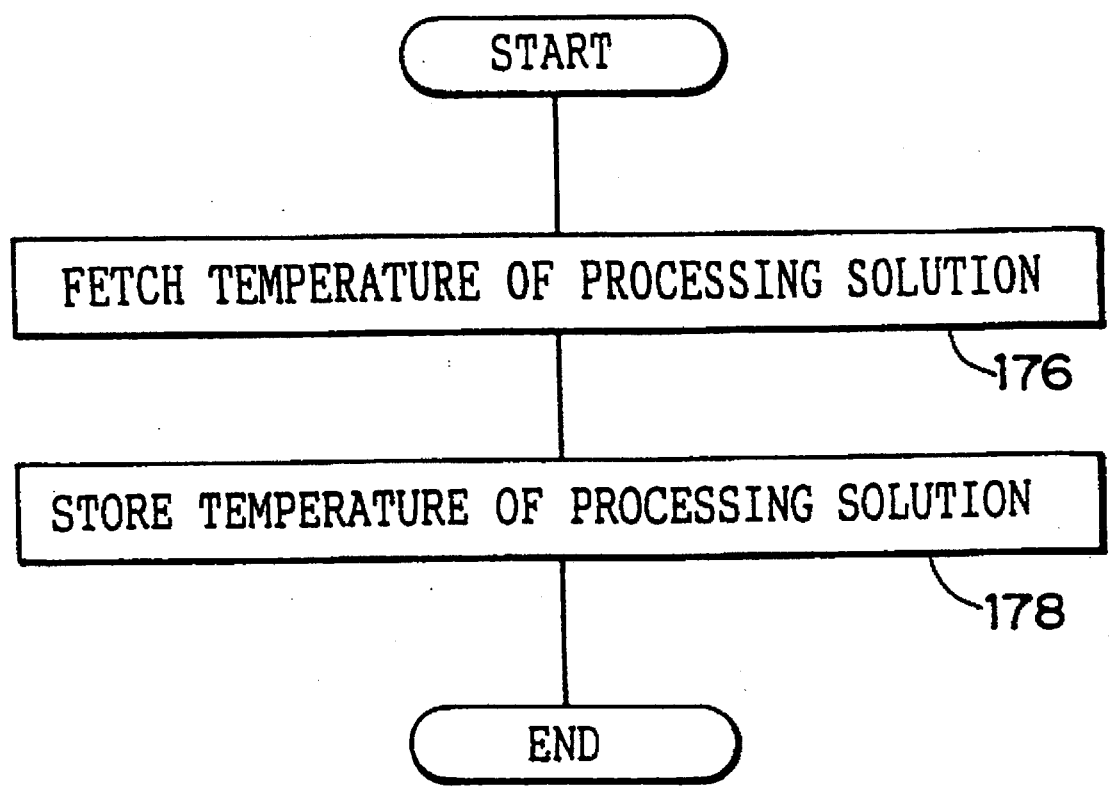
FIG. 14 is a flow chart showing detection of temperature of a processing solution.

A temperature detection routine for detecting the temperature of each processing solution for use in step 148 will now be described with reference to FIG. 14. This routine is performed by a interruption process which is performed when the film processor 10 in the pause state has been brought to the standby state and the temperature of each processing solution has been raised to the set temperature level. In step 176 the temperature of each processing solution is fetched by the temperature sensors 40Na to 40Ng. The fetched temperature levels are stored together with data of date.

Figure 15:
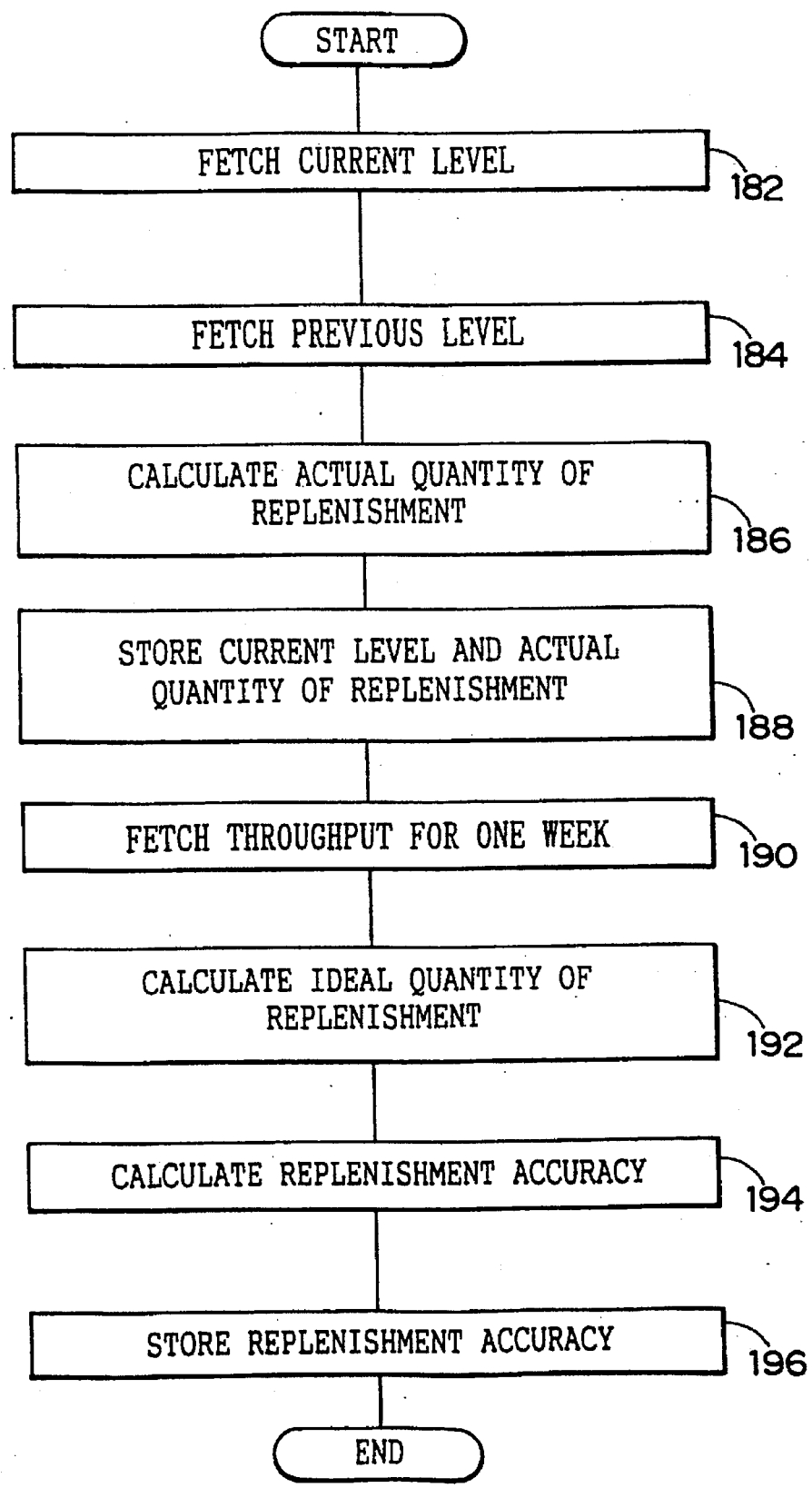
FIG. 15 is a flow chart showing calculation of replenishment accuracy.

A replenishment accuracy detection routine for detecting the replenishment accuracy of each processing bath for use in step 150 will now be described with reference to FIG. 15. This routine is performed every week, for example, when a determination has been performed that the film processor 10 has been brought to the pause state on, for example, Sunday. In step 182 the level of each replenisher (the current level) is fetched from the supersonic-wave level meters 46Na to 46Ng of the respective processing baths. In step 184 the previous level, that is, the level of each replenisher one time before (one week before) this routine is performed is fetched. In step 186 the current level, the previous level and data of the shape of the replenisher reservoir portion (for example, the bottom area) of each replenisher tank 44M are used to calculate the quantity (the actual quantity) of the supplied replenisher.

In step 188 the current level (the level fetched in step 182) and the actual quantity of the calculated replenisher are stored together with data about date.

In step 190 a reference to data about date is made to fetch the throughput of the negative films N for one week from the moment this routine has been previously performed to the moment this routine is performed currently. In step 192 an ideal quantity of replenishment is calculated. That is, this embodiment has an arrangement such that the replenisher is supplied by quantity V (for example 50 ml) whenever the throughput of the negative films N has reached predetermined value S1. Therefore, ideal quantity H of replenishment with respect to the total throughput SO of the negative films N in one week can be obtained from Equation (2).

$$H = \frac{SO}{S1} \times V \qquad (2)$$

In step 194 the replenishment accuracy of each processing bath, that is, an error of the actual quantity of replenishment from the ideal quantity of replenishment is calculated. In step 196 the calculated replenishment accuracy of each processing bath is Stored together with data about date.

Since the process for time sequentially storing the electric conductivity of the stabilizer in the stabilizing bath 10G for use in step 152 is similar to the temperature detection routine, it is omitted from description. The process is performed by an interruption process when the temperature detection routine has been completed. The reason why only the electric conductivity of the stabilizer in the stabilizing bath 10G is detected is that the electric conductivity can be detected accurately as the concentration of the processing solution is low. Note that the electric conductivity of the stabilizing bath 10F may be detected in place of detecting that of the final stabilizing bath 10G.

Since the process for time sequentially storing the pH of each processing solution for use in step 154 is similar to the temperature detection routine, it is omitted from description. The process is performed by an interruption process when the process for detecting the electric conductivity has been completed. The reason why the pH of only the developer and that of the bleaching and fixing solution are detected is that the pH can accurately be detected as the concentration of the processing solution is high. Note that the pH of a processing solution except the developer and the bleaching and fixing solution may be detected.

Figure 16:
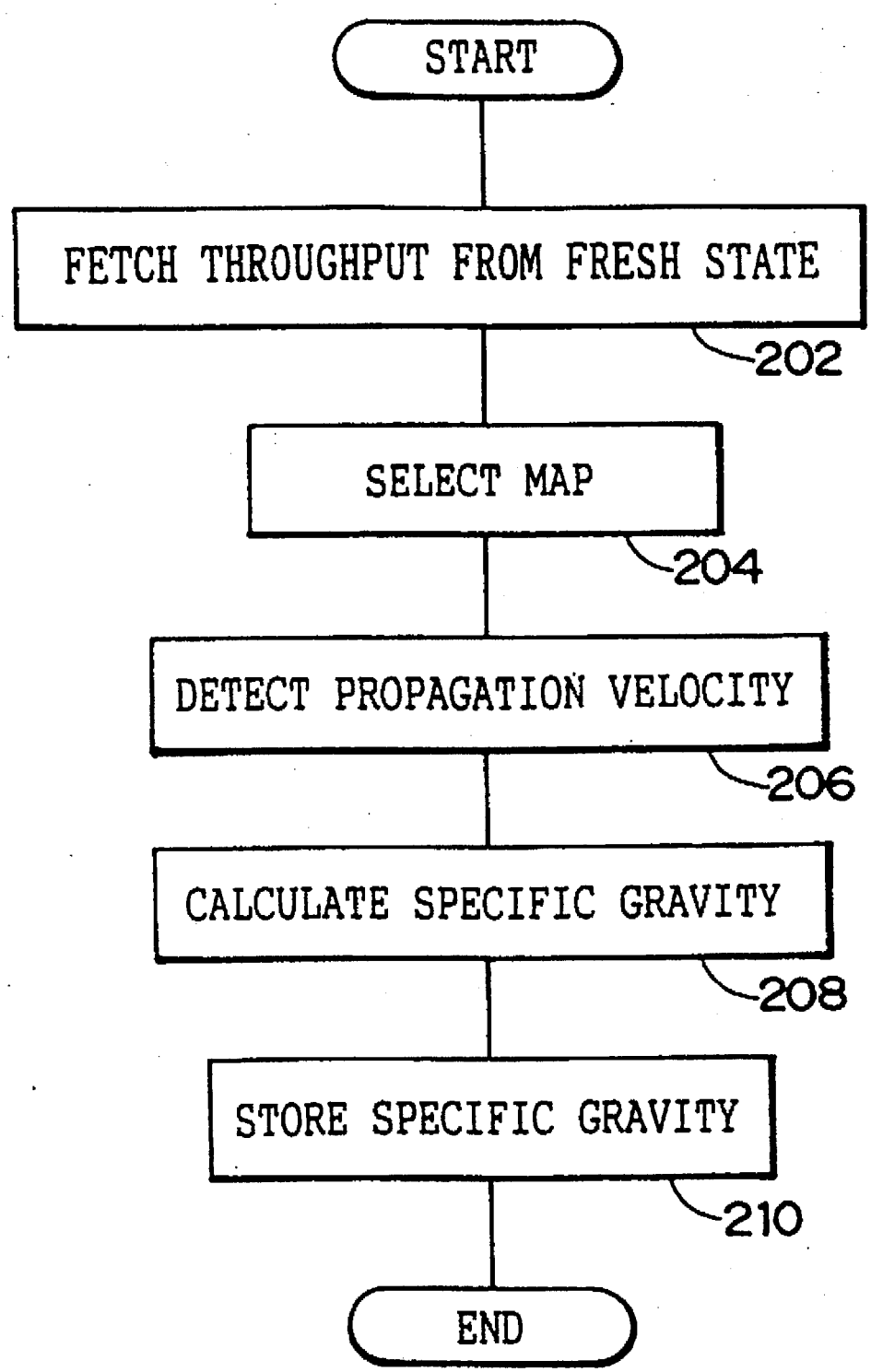
FIG. 16 is a flow chart showing detection of specific gravity.

A specific gravity detection routine for detecting the specific gravity of the developer for use in step 156 will now be described with reference to FIG. 16. Initially, the principle of detecting the specific gravity according to this embodiment will now be described. The density of a solution, for example, caustic soda (NaOH), consisting of one component can be determined if the propagation velocity of supersonic wave in the solution can be detected. That is, assuming that propagation velocity of supersonic waves in the solution is V and volume elasticity of the solution is E, density # of the solution can be obtained from Equation (3):

$$\#=E/V^2 \qquad (3)$$

If the density of the solution is determined as described above, the specific gravity of the solution can be obtained.

However, since the processing solution is composed of a multiplicity of components as described above, the volume elasticity E of the processing solution is changed due to the type of the chemical components and the component ratio. Therefore, even if the propagation velocity of supersonic waves in the processing solution and the type of the processing solution are detected, the specific gravity of the solution cannot accurately be obtained.

Figure 17:
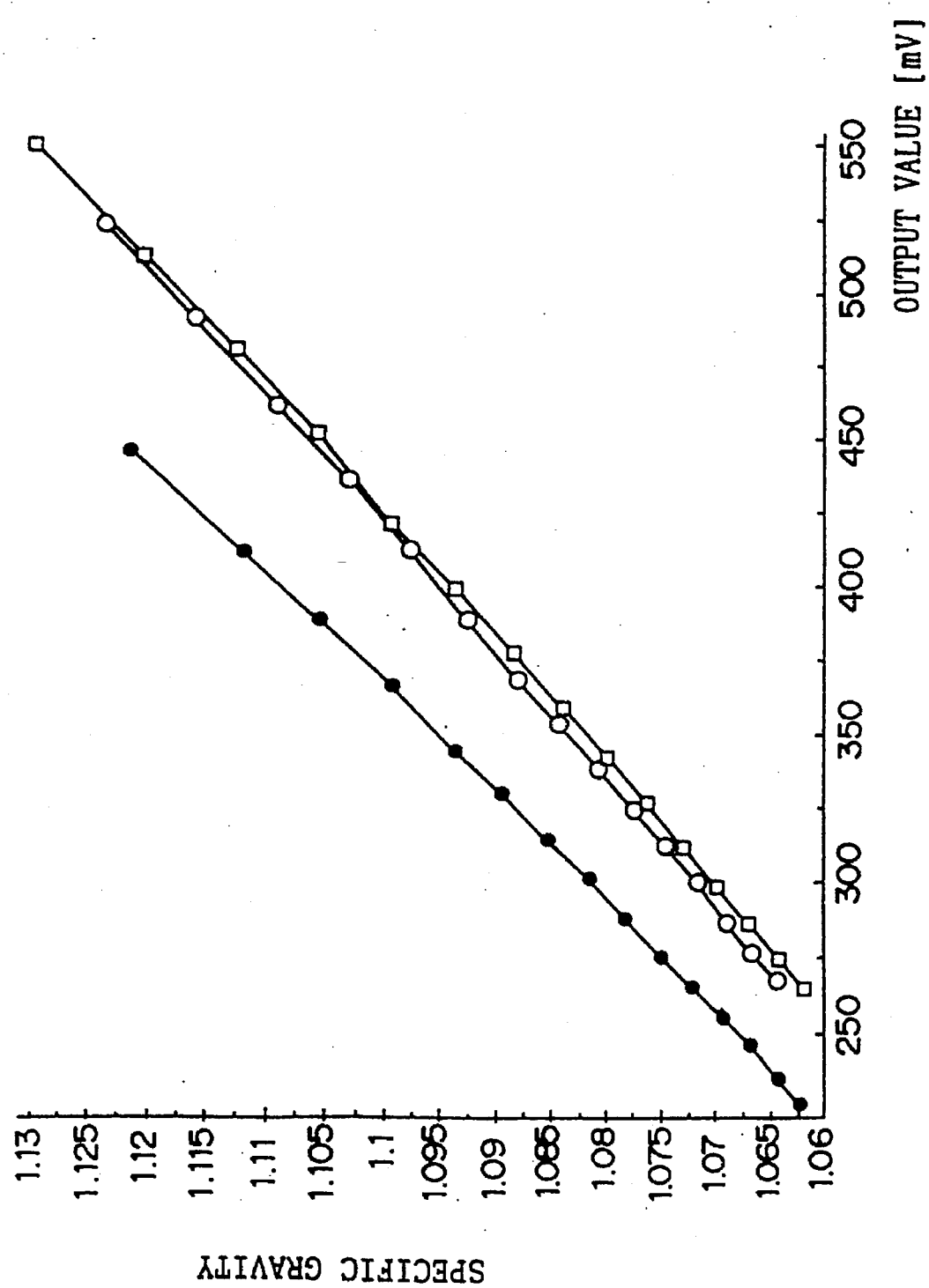
FIG. 17 is a graphs showing the relationship between output values in proportion to the propagation velocity in bleacher in a plurality of processing machines and the specific gravity of the processing solution.
Figure 18:
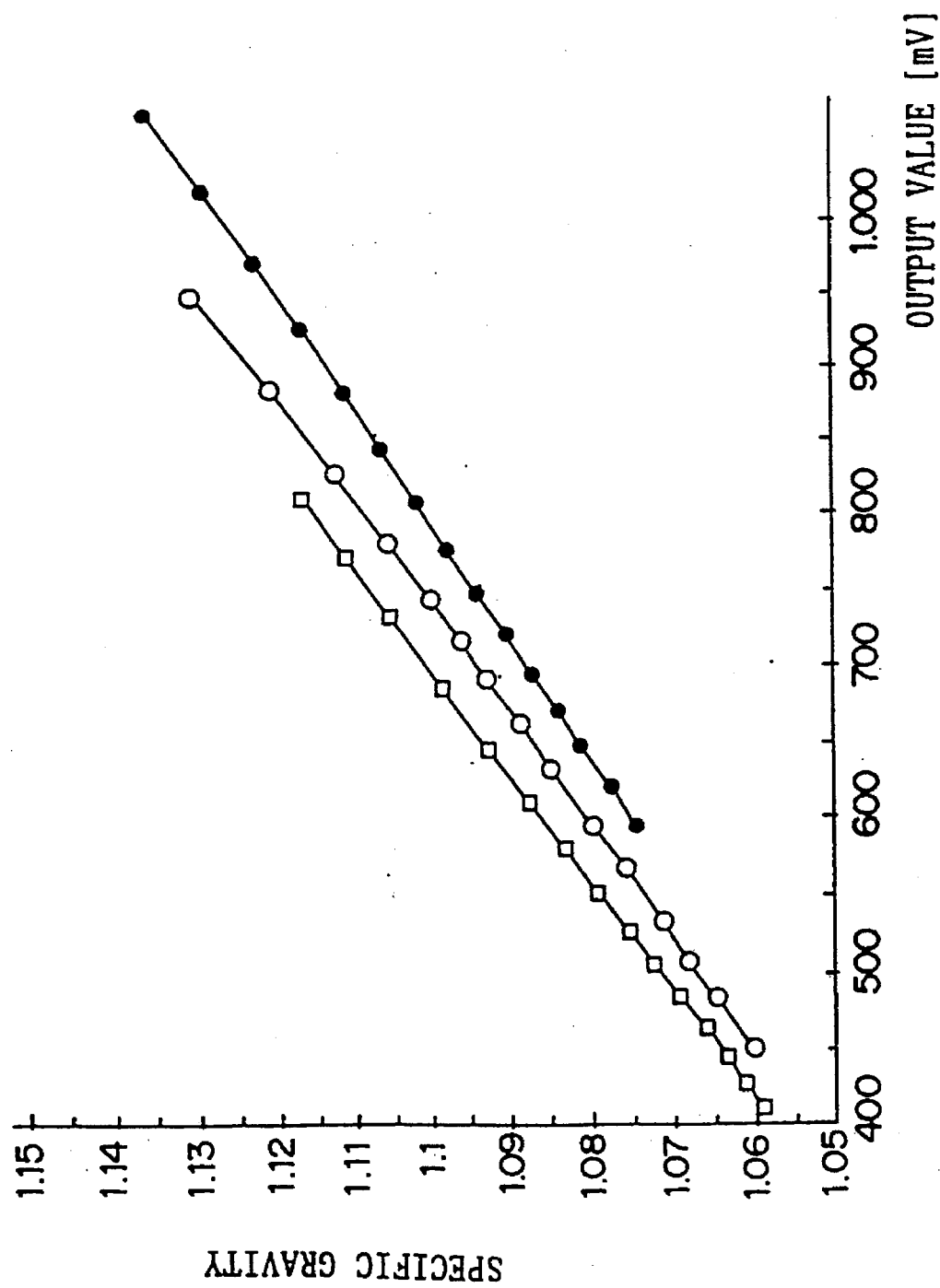
FIG. 18 is a graph showing the relationship between output values in proportion to the propagation velocity in a fixing solution in a plurality of processing machines and the density of the processing solution.

On the other hand, the inventors of the present invention have sampled processing solutions in a plurality of (to simplify the description, the description will be performed of three film processors) film processors of the same type to measure the propagation velocity of supersonic waves propagating in the processing solution while diluting the processing solution with water. Simultaneously, the specific gravity was measured by a gravity meter for use as the reference. Results are shown in FIGS. 17 and 18. FIG. 17 shows the relationship between the output value [mV] in proportion to the propagation velocity of supersonic waves propagating in the bleaching solution in the film processor and the measured specific gravity. FIG. 18 shows the relationship between the output value [mV] in proportion to the propagation velocity of supersonic waves propagating in the fixing solution in the film processor and the measured specific gravity. As can be understood from FIGS. 17 and 18, the specific gravity becomes different in the case where the processing machines are different even if the propagation velocities are the same. The specific gravities were measured by a float type or a pendulum type specific gravity meter.

It can be considered that the reason why the specific gravity becomes different when the processing machine is different even if the propagation velocity is the same is that the throughput of the negative films N processed by the film processor is different. The reason for this is that when the negative film N is processed in a processing solution, predetermined components from the negative film N are eluted into the processing solution. The quantity of elution is enlarged as the throughput is enlarged, thus causing the composition of the processing solution to be changed. That is, the quantity of change in the composition of the processing solution is determined to correspond to the throughput. On the contrary, even if the specific gravity is the same, the difference in the throughput causes the composition of the solution to be made different. Thus, the propagation velocity of supersonic waves are made to be different.

Figure 19A:
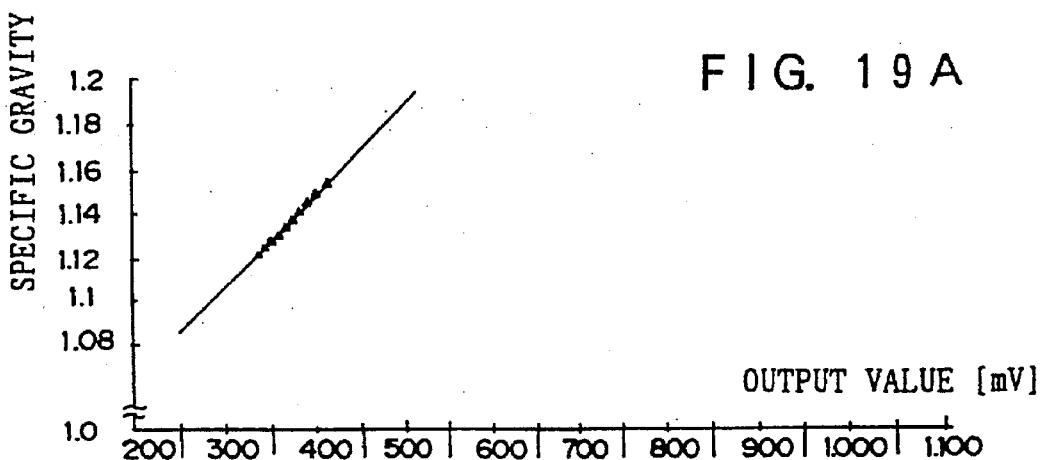
FIGS. 19A to 19D are graphs showing maps for calculating the specific gravity from the detected propagation velocity.
Figure 19B:
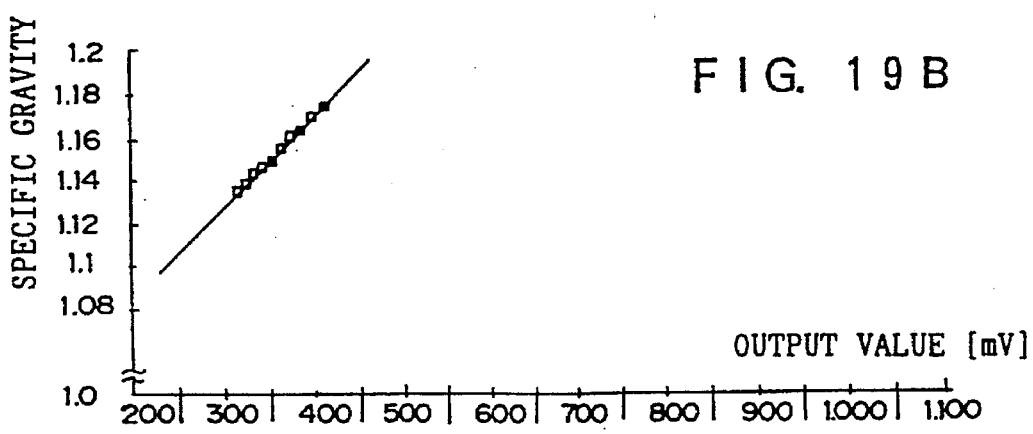
Figure 19C:
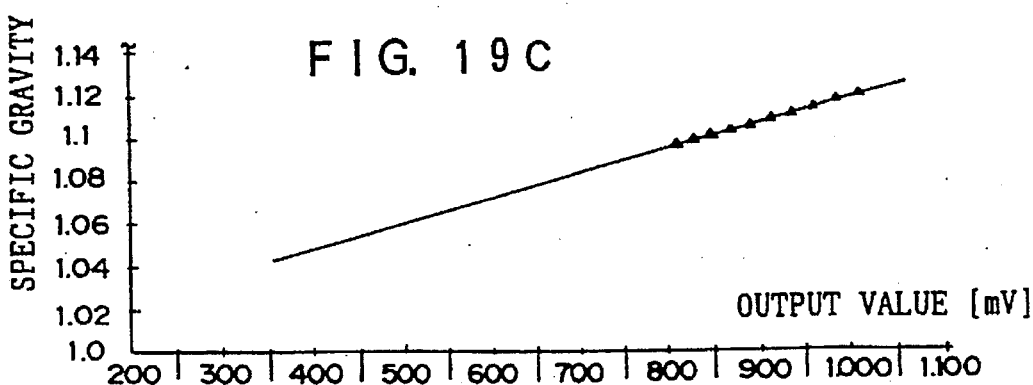
Figure 19D:
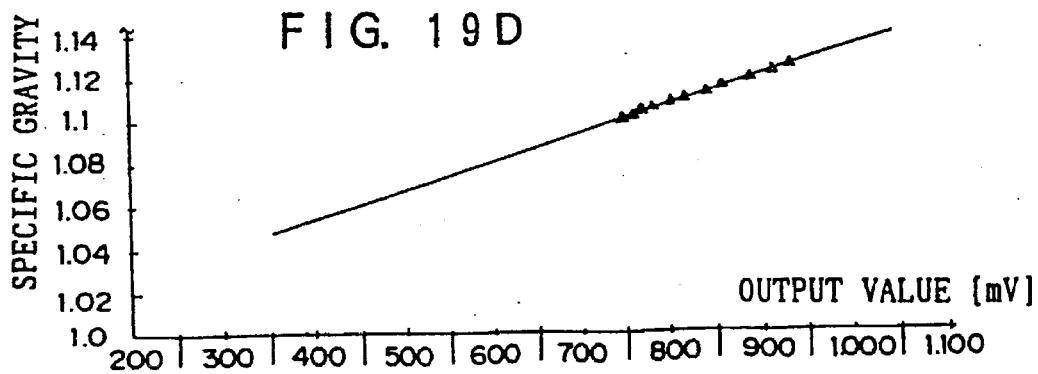

The relationship between the propagation velocity of supersonic waves propagating in processing solutions in a multiplicity of film processors and the measured specific gravities was investigated while changing the throughput and diluting the processing solutions with water. As a result, relationships shown in FIGS. 19A to 19D were obtained. That is, FIG. 19A shows the relationship between the propagation velocity and the measured specific gravity in a state where the bleaching solution is fresh (it has not been used to process the negative film N). FIG. 19B shows the relationship between the propagation velocity of supersonic waves propagating in the bleaching solution and the measured specific gravity when the throughput of the negative films N is certain throughput K. FIG. 19C shows the relationship between the propagation velocity and the measured specific gravity when the fixing solution is fresh. FIG. 19D shows the relationship between the propagation velocity of supersonic waves propagating in the fixing solution and the measured specific gravity when the throughput of the negative films N is certain throughput K. Note that the processing solution was "CN-16X" (trade name of Fuji Photo Film Co., Ltd.) for color negative film.

As described above, the processing solutions in the same type film processors results in difference in the relationship between the propagation velocity and the specific gravity of the processing solution if the throughputs of the negative films N are different. If the throughputs are the same, the relationships between the propagation velocity and the specific gravity are the same.

Although the foregoing description has been made about the film processor, the foregoing face applies to the printer processor.

In this embodiment, the relationship between the propagation velocity of supersonic waves in the processing solution and the specific gravity is stored in a predetermined map (a map similar to those shown in FIGS. 19A to 19D) for each range of the throughput of the processing solution. Note FIGS. 19A to 19D show the relationship when the each processing solution is in a fresh state and a state where the throughput is K. Maps for a plurality of throughputs in a range of the throughputs from O to K are determined. Moreover, the relationship between the propagation velocity and the specific gravity has a trend in which the inclination of a straight line indicating the relationship between the propagation velocity and the specific gravity is enlarged as the throughput is enlarged. Note that a structure may be employed in which instead of the map showing the relationship between the propagation velocity of supersonic waves in the processing solution and the specific gravity, a data table similar thereto is stored. As an alternative to this, calculation equations showing the relationship between the propagation velocity of supersonic waves in the processing solution and the specific gravity corresponding to the throughput may be stored. Moreover, a map or the like corresponding to the temperature may be stored. That is, this embodiment has the foregoing structure such that the temperature of each processing solution is controlled to a set level. In a case where a plurality of set temperature levels are prepared and a set temperature is selected under a predetermined condition to control the temperature of the processing solution to the selected temperature level, a map (a map for each range of a predetermined throughput) showing the relationship between the propagation velocity of supersonic waves in the processing solution corresponding to the foregoing temperature and the specific gravity is stored. As a result, the specific gravity can be corrected to correspond to the temperature.

The routine (see FIG. 16) starts when a process for time sequentially storing the pH of each processing solution has been completed.

In step 202 the overall throughput of the negative films N from the fresh state is fetched. In step 204 a map (see FIGS. 19A to 19D) corresponding to the fetched overall throughput is selected.

In step 206 an output value [mV] in proportion to the propagation velocity at which supersonic waves propagate in the color developer and which has been calculated from the time required for supersonic waves to propagate in the color developer (the distance $D_2$) and the distance $D_2$, and the map selected in step 208 are used to calculate the specific gravity from the output value [mV]. In step 210 the calculated specific gravity is stored together with data about date.

Figure 20:
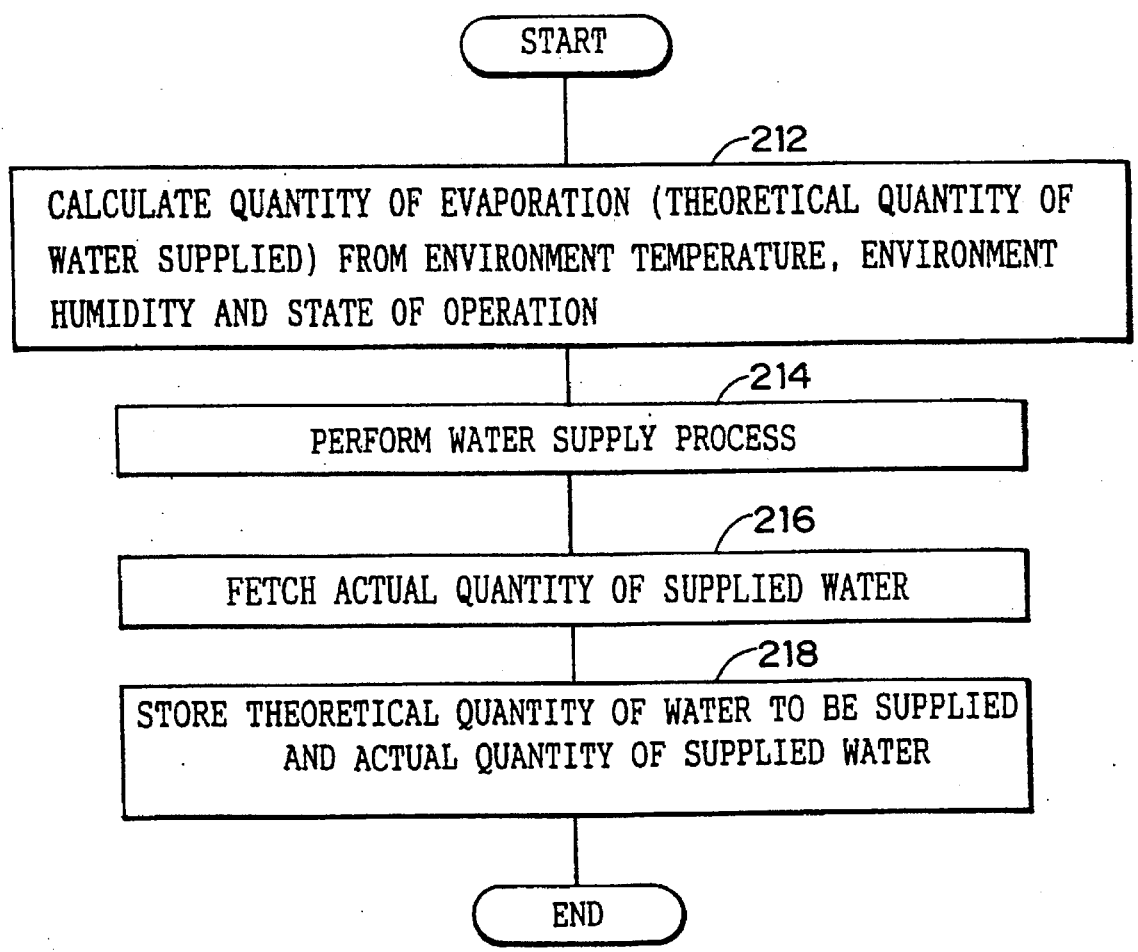
FIG. 20 is a flow chart showing detection of the quantity of supplied water.

A routine for detecting the quantity of supplied water to each processing solution for use in step 158 will now be described with reference to FIG. 20. This routine is performed when the film processor 10 in the pause state has been brought to the standby state.

That is, the film processor 10 fetches the environment temperature from the environmental temperature sensor 54 and the environment humidity from the environmental humidity sensor 56 at predetermined intervals to store the fetched values. Moreover, the film processor 10 stores each period over the duration of which the film processor 10 has been in the pause state, standby state and the drive state.

In step 212 the environment temperature, the environment humidity and each of the time at which the drive state was realized were used to calculate the quantity of evaporation (a theoretical quantity of supplied water) from each processing solution in a period (one day) from the moment at which this routine has been performed previously to the moment the same is performed this time. In step 214 the replenishing pumps 48La to 48Lg are operated to supply water by the theoretical quantity of water to be supplied. In step 216 the quantity of water actually supplied to each processing solution (the actual quantity of supplied water) is fetched from the replenishment flow meters 48Na to 48Ng. In step 218 the theoretical quantity of water to be supplied and the actual quantity of supplied water are stored together with data about date.

Figure 21:
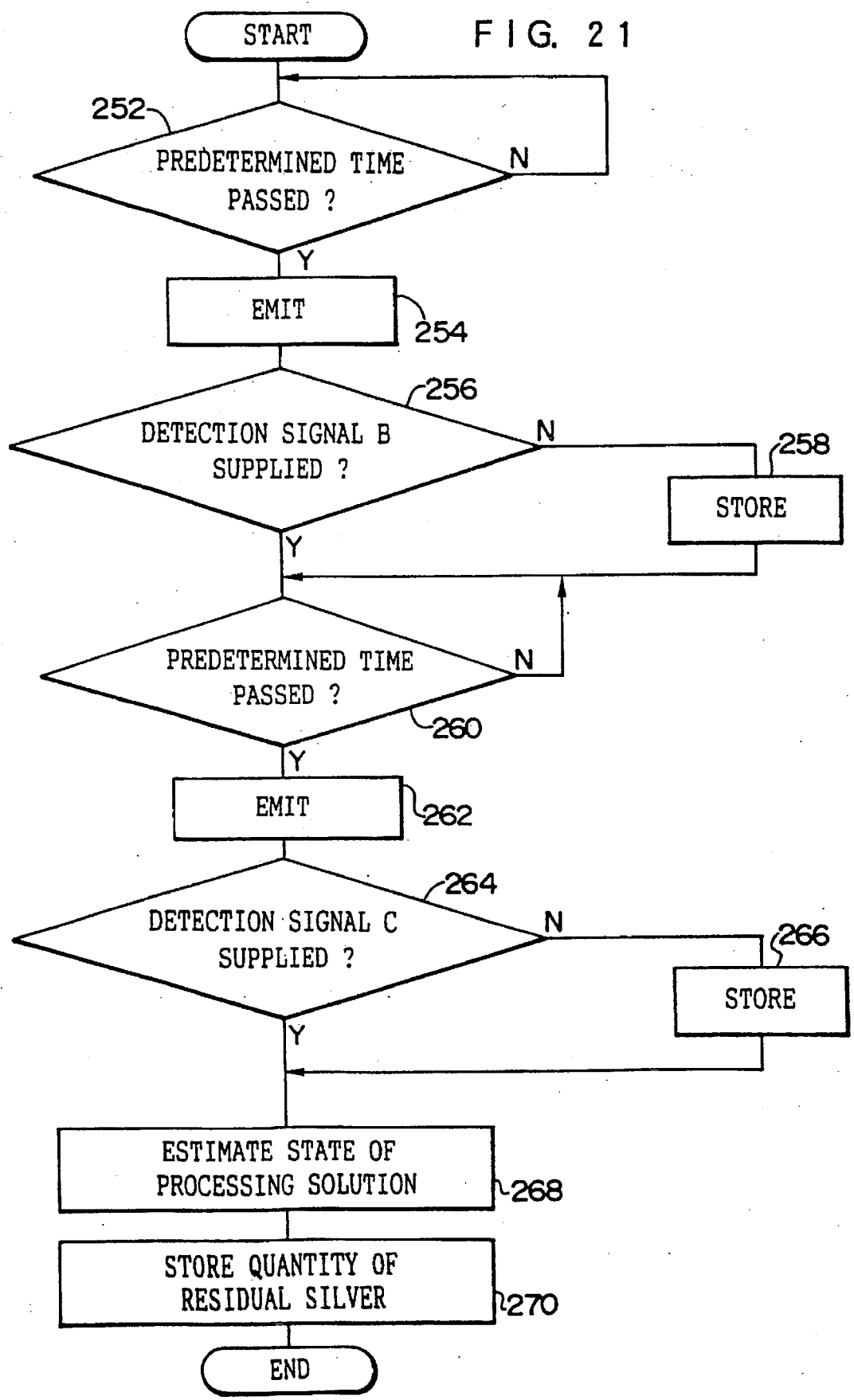
FIG. 21 is a flow chart showing detection of quantity of residual silver.

A routine for determining the residual quantity of silver for use in step 159 shown in FIG. 12 is shown in FIG. 21.

Figure 22:
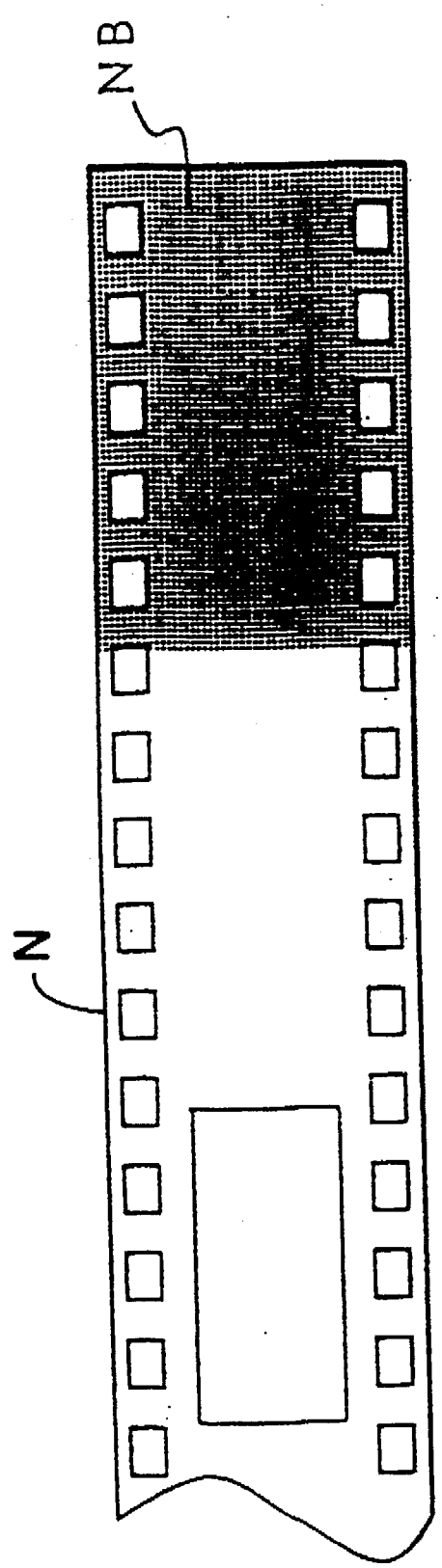
FIG. 22 is a schematic plan view showing an example of the leading portion of a film.

When leading end NB (see FIG. 22) of the negative films N has reached the infrared-ray sensor unit 120V for always emitting infrared rays and the leading end NB of the negative film N has passed between the emitting diode 12A and the photodiode 14A, the quantity of infrared rays detected by the photodiode 14A which receives infrared rays emitted by the emitting diode 12A is changed.

When change in the detected quantity has been detected, the silver quantity detection routine starts. In step 252 whether or not a predetermined time has passed is determined. The predetermined time correspond to the time for the leading end NB of the negative film N reaches a position between the emitting diode 12B and the photodiode 14B. If the predetermined time has passed, the leading end NB has reached a region which can be irradiated with infrared rays emitted from the emitting diode 12B. Therefore, infrared rays are emitted from the emitting diode 12B in step 254.

In step 256 whether or not detection signal B has been supplied is determine. That is, the desilverization performance of the processing solution is somewhat defective or excellent, infrared rays emitted from the emitting diode 12B penetrate the leading end NB of the negative film N so that the infrared rays are detected by the photodiode 14B. In the foregoing case, a signal is transmitted from the photodiode 14B, and then amplified by the amplifier 18B so as to be supplied as the detection signal B. Therefore, the determination in step 256 is affirmed, and then the operation proceeds to step 260.

If the desilverization performance is defective, infrared rays emitted by the emitting diode 12B are substantially completely reflected by silver existing in the negative film N. Thus, infrared rays do not penetrate the negative film N. Therefore, the quantity of detected infrared rays emitted by the emitting diode 12B of the photodiode 14B is reduced considerably. Also the detection signal B is not transmitted.

Therefore, in the foregoing case, the determination in step 256 is negated. A fact that the detection signal B has not been supplied is stored in step 258, and then the operation proceeds to step 260. In step 260 whether or not a predetermined time has passed is determined to determine whether or not the leading end NB of the negative film N has reached the position between the emitting diode 12C and the photodiode 14C. If the predetermined has passed, the leading end NB has reached the region which can be irradiated with infrared rays emitted from the emitting diode 12C. Therefore, infrared rays are emitted from the emitting diode 12C.

If the desilverization performance of the processing solution is excellent, infrared rays emitted by the emitting diode 12C penetrate the negative film N and are detected by the photodiode 14C. Therefore, detection signal C is transmitted from the photodiode 14C so that the determination in step 264 is affirmed, and then the operation proceeds to step 268.

If the desilverization performance of the processing solution is Unsatisfactory, infrared rays emitted from the emitting diode 12C do not penetrate the negative film N and, therefore, the detection signal C is not transmitted from the photodiode 14C. Thus, the determination in step 264 is negated, and in step 266 a fact that the detection signal C has not been supplied is stored. Then, the operation proceeds to step 268.

In step 268, as shown in FIG. 23, the residual quantity of silver is estimated in accordance with the map storing the quantity of residual silver to correspond to combinations of whether or not the detection signal B and detection signal C have been supplied. If the detection signal B and detection signal C have been supplied, an estimation is performed that the quantity of silver left in the negative film N is 5 µg or less per $cm^2$. If the detection signal B has been supplied but the detection signal C has not been supplied, an estimation can be performed that the quantity of silver left in the negative film N is larger than 5 µg but not larger than 10 µg per $cm^2$. If both of the detection signal B and detection signal C are not supplied, an estimation can be performed that the quantity of silver left in the negative film N is larger than 10 mg per $cm^2$.

As described above, whether or not infrared rays having different quantities of emissions have penetrated the negative film N is determined so that the state of the processing solution is determined. Therefore, the quantity of silver left in the negative film N can be detected while necessitating a simple structure.

If a determination of defective desilverization in accordance with the quantity of residual silver, a determination can be performed that wanting of the replenisher to be supplied to the bleaching and fixing bath, excessive quantity of carry over or sulfidization taking place due to a slow process.

In step 270 the estimated residual quantity of silver is stored. Although the peak portion of the spectral distribution of energy radiated from the emitting diode is set to be 0.95 µm in the foregoing process, the present invention is not limited to the foregoing value. The peak may be about 0.75 µm to about 2.5 µm. That is, although the peak portion of infrared rays is usually 0.75 µm to 25 µm, it may be about 0.75 µm to about 2.5 µm excluding a portion of the film base resin of the negative film N which exhibits a high absorption of infrared rays.

Although the foregoing embodiment has the structure such that the sensor 124A consists of the emitting diode and the photodiode, the present invention is not limited to the foregoing elements. A film detection sensor (a structure for detecting the negative film N when brought into contact with the negative film N) which does not employ infrared rays may be employed.

Although the foregoing embodiment has the structure such that the quantity of emission from the emitting diodes emitting diode 12A, 12B and 12C are made to be different values as W1, W2 and W3, the present invention is not limited to the foregoing structure. For example, the emitting diode 12A, 12B and 12C may emit infrared rays having substantially the same quantity (for example, the quantity of emission of W1) and different spectrum distribution.

That is, the peak portions of the spectrum distribution of emitted energy may be made to be, for example, 0.80 μm, 0.95 μm and 1.00 μm as shown in FIG. 24. In the foregoing case, the spectrum sensitivity characteristics of the photodiodes are made to be substantially the same (for example, 0.85 μm). As a result, proper combinations of the emitting diodes and the photodiodes enables the sensor to be set to high sensitivity, intermediate sensitivity and low sensitivity. Thus, the state of the processing solution can be determined in three levels.

Although the state of the processing solution is, in the foregoing embodiment, determined in three levels, the present invention is not limited to this. It may be determined in another plural number of levels.

Data of the thus-stored physical quantities is deleted after a predetermined time has passed (for example, one month) so that data is effectively stored.

After the physical quantity has been determined as described above, the defective items are displayed on the display panel 72 in step 108 (see FIG. 10). For example, if the throughput of the negative films N in one week is out of the allowable range, a fact that the throughput of the negative films N is out of the allowable range is displayed.

In step 110 the cause is estimated in accordance with the defective items. In step 112 the estimated cause is displayed. If the defective item has been specified, also the cause of the defective item can be specified. In this embodiment, patterns of defective items and causes of the patterns corresponding to the pattern of defective items are stored. The following table shows patterns of defective items and causes of the foregoing patterns in the case of the color developer bath 10A, the bleach-fix bath 10C and the stabilizing bath 10G in the color paper process.

TABLE 6

| Defective Items | Causes |
| --- | --- |
| (1) Color Developer Bath | |
| lowering of pH | supply of replenisher is insufficient |
| | intermittent processing (the throughput is too small per unit period |
| | a great quantity of overexposed photosensitive materials are processed |
| | replenisher has been oxidized due to leaving of the floating cover for the replenishment bath or the like |
| rise in pH- | excess replenishment of replenisher |
| | throughput is too large per unit |

TABLE 6-continued

| Defective Items | Causes |
| --- | --- |
| | period |
| | a great quantity of non-exposed photosensitive material is processed |
| (2) Bleach-Fix Bath | |
| rise in pH | supply of replenisher 4Ls insufficient |
| | excessively large carry over |
| lowering in specific gravity | supply of replenisher is insufficient |
| | excessively large carry over |
| lowering in pH | excess supply of replenisher |
| | sulfidization takes place due to intermittent processing |
| | concentration takes place due to intermittent processing |
| rise in specific gravity | excess supply of replenisher |
| | concentration takes place due to intermittent processing |
| (3) Stabilizing Bath | |
| rise in conductivity | supply of replenisher is insufficient |
| | concentration takes place due to intermittent processing |
| | excessively large carry over |
| lowering in conductivity | excess supply of replenisher |
| | sulfidization and precipitation takes place due to intermittent processing |

In step 114, a countermeasure (a countermeasure to bring the fetched densities of three primary colors, R, G and B of the exposed portion and the non-exposed portion into values within an allowable range) is estimated in accordance with the estimated cause of the defect. In step the estimated countermeasure is displayed. In step 118 the estimated countermeasure is performed.

If the cause of the defect has been specified, the countermeasure can be specified. Therefore, this embodiment has a structure such that the causes of defects and countermeasures against the causes of defects are stored.

In the case where the supply of the replenisher is insufficient, for example, in a case where the replenishment accuracy of the replenisher to the stabilizing baths 10F and 10G is lower than an allowable range, that is, in a case where the quantity of replenisher supplied by operating the replenishing pumps 44Nf to 44Ng is smaller than a set value by a predetermined quantity, a countermeasure is performed such that the foregoing set value is enlarged by, for example, 5 ml. If a determination has been made that a failure of the replenishing pumps 44Nf to 44Ng of the stabilizing baths 10F and 10G or a clogging of the circulation filters 30N4f and 30N4g of the stabilizing baths 10F and 10G has taken place (in a case where the defective item cannot be made to be normal, notwithstanding the quantity of replenishment has been corrected), a countermeasure is performed such that instruction information of exchange of the replenishing pumps 44Nf to 44Ng and that of overcoming clogging of the circulation filters 30N4f and 30N4g are displayed on the display panel 72.

In a case where the film processor 10 is connected to a host computer in the headquarters through a communication line, a countermeasure may be taken such that information for instructing exchange of the replenishing pumps 44Nf to 44Ng of the film processor 10 is displayed on a monitor of the headquarters.

In step 120 a requirement of re-confirmation as to whether or not the density of the exposed portion and the non-exposed portion of the negative film N is within the allowable range is displayed after a predetermined time has passed. In step 122 whether or not a predetermined time has passed is determined. In step 124 whether or not the foregoing defect of the negative film N has been solved is again determined, that is, whether or not the density of the image is within an allowable range is determined. If a determination has been performed that it is not within the allowable range, information to instruct the analysis of the cause is displayed on the display panel 72 in step 126. Thus, the process is ended. If the determination in step 124 has been affirmed, that is, if the density of the exposed portion and the non-exposed portion of the negative film N is within the allowable range, a display to determine as to whether or not the density of the exposed portion and the non-exposed portion of the negative film N is within the allowable range is stopped in step 128. Then, the process is ended.

In the printer processor 100, when the negative film N having been subjected to the development has been mounted, the image of each frame recorded on the negative film N is printed on the color paper P. Then, the color paper P, to which the images have been printed, is developed, fixed and washed with water. At this time, the scanner 14N3 of the exposing portion 14 of the printer processor 100 reads the density of the image of each frame recorded on the negative film N, the exposing conditions are set, and the image recorded on the negative film N is printed to the color paper P in accordance with the exposing conditions.

Simultaneously, in the exposing portion 14, if the negative film N has the predetermined DX code and the image size in accordance with the DX code and the print size of the negative film N, the exposure is integrated to calculate a mean exposure. In the printer processor 100, a processing performance control processing routine to be described later is performed such that the exposure of a normal frame of a Bull's eye is read as the reference exposure so as to be subjected to a comparison with the integrated mean exposure. Then, a result of comparison is transmitted to the control portion 60 of the film processor 10.

Figure 26:
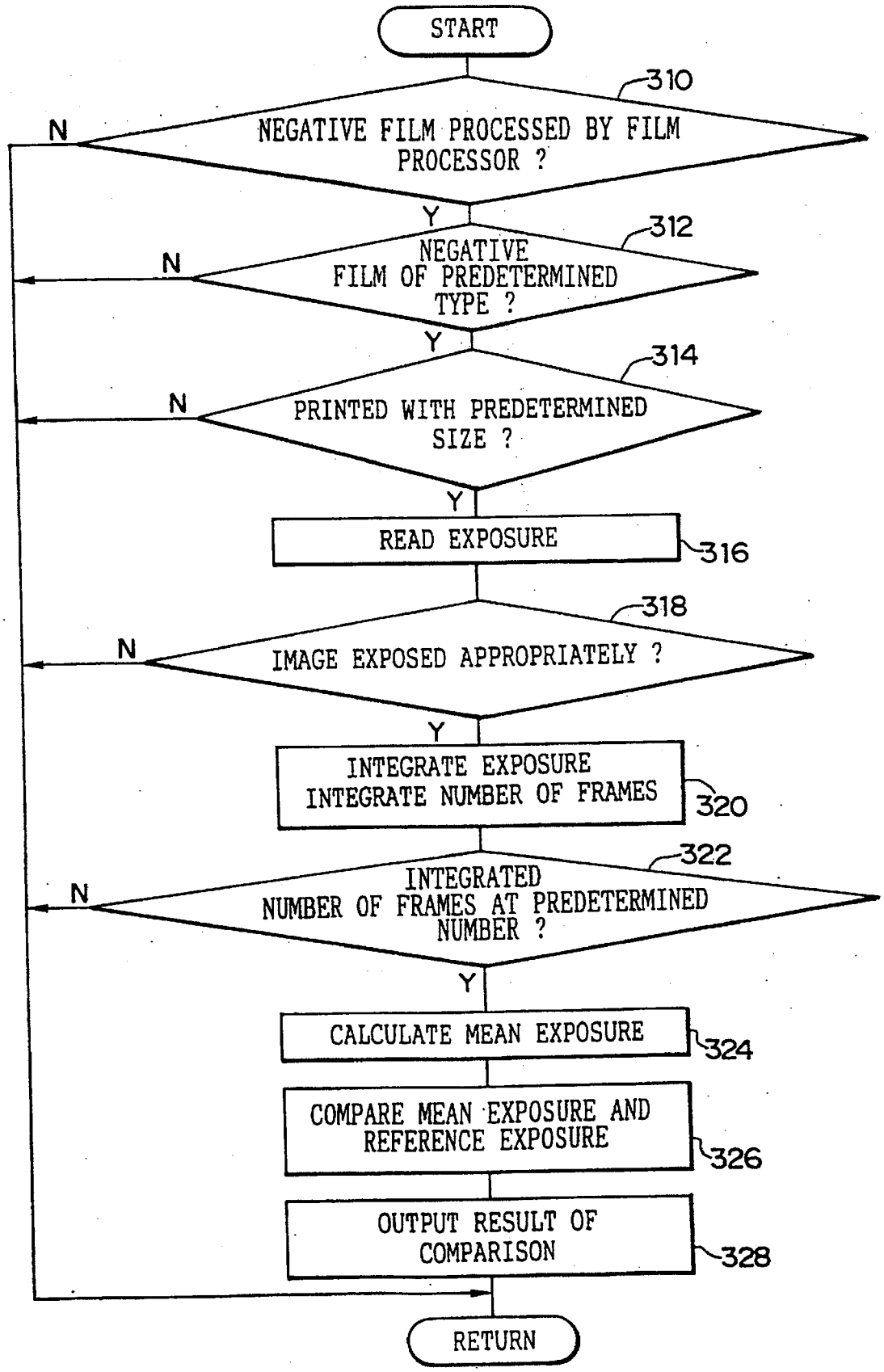
FIG. 26 is a flow chart showing an example of calculation of mean exposure.

FIG. 26 shows an example of a processing routine to be performed in the printer processor 100 such that the mean exposure in the printer processor 100 is calculated and the result of the calculation is subjected to a comparison with a reference exposure. The process is performed whenever the image recorded on the negative film N is exposed to the color paper P.

In step 310 shown in the flow chart above a determination is performed whether or not the negative film N has been processed by the film processor 10. Thus, a so-called copied prints are excluded and only the negative films N processed by the film processor 10 and performed with print process subsequent thereto are made to be the subject to be integrated.

If an affirmative determination has been performed in step 310, then whether or not the negative film N is a predetermined set type negative film N is determined in step 312. In step 312 a determination is performed in accordance with the DX code or the like of the negative film N such that a negative film photographed by a special photographing means, such as the disposal camera is excluded from the subject of the integration. The foregoing determination may be recorded on the negative film N by optical information or magnetic information or the like when the negative film N has been processed in the film processor 10. As an alternative to this, the determination may be performed by the film processor 10 so as to determine this in accordance with the information of the determination.

If a determination has been performed that the subject negative film is a predetermined negative film (if an affirmative determination has been performed in step 312), whether or not printing has been performed with a standard size, for example, an E size or L size, is determined in step 314. The foregoing determination can be performed in accordance with whether or not the change of the color paper and change of the printing magnification have been performed in the exposing portion 14. As an alternative to this, the image size recorded on the negative film may be read by the scanner 14N3 to perform the determination.

In step 316 the exposure set in accordance with the exposing conditions is read. In step 318 whether or not the image has been photographed with an appropriate exposure is determined in accordance with the read exposure. As a result, special images under exposure or over exposure except the image exposed under appropriate conditions are excluded from the subject of integration. As the selection conditions, for example, a case where the current exposure is within ±50% of the exposure integrated previously is made to be the subject of integration. If the value is out of the foregoing range, a determination is performed that the image has been photographed with under exposure or over exposure. In the foregoing case, the images of the foregoing type are excluded from the subject of integration.

By appropriately selecting the subject of integration as described above, an appropriate mean exposure, which enables the state of processing which is being performed by the film processor 10 to be determined appropriately, can be calculated.

When the image, which is the subject of integration, has been selected, the operation proceeds to step 320 so that the exposure of the image is integrated and the integrated number of frames is counted. In step 322 whether or not the count of the integrated number of the frames has reached a predetermined value (for example, a predetermined number of frames between 100 frames and 1000 frames, for example, 500 frames) is determined. If the count has reached the predetermined number of frames, the mean exposure is calculated (step 324).

In step 326 the calculated mean exposure and the predetermined and stored reference exposure are subjected to a comparison. Then, a result of the comparison is transferred to the control portion 60 of the film processor 10 (step 328).

Figure 25:
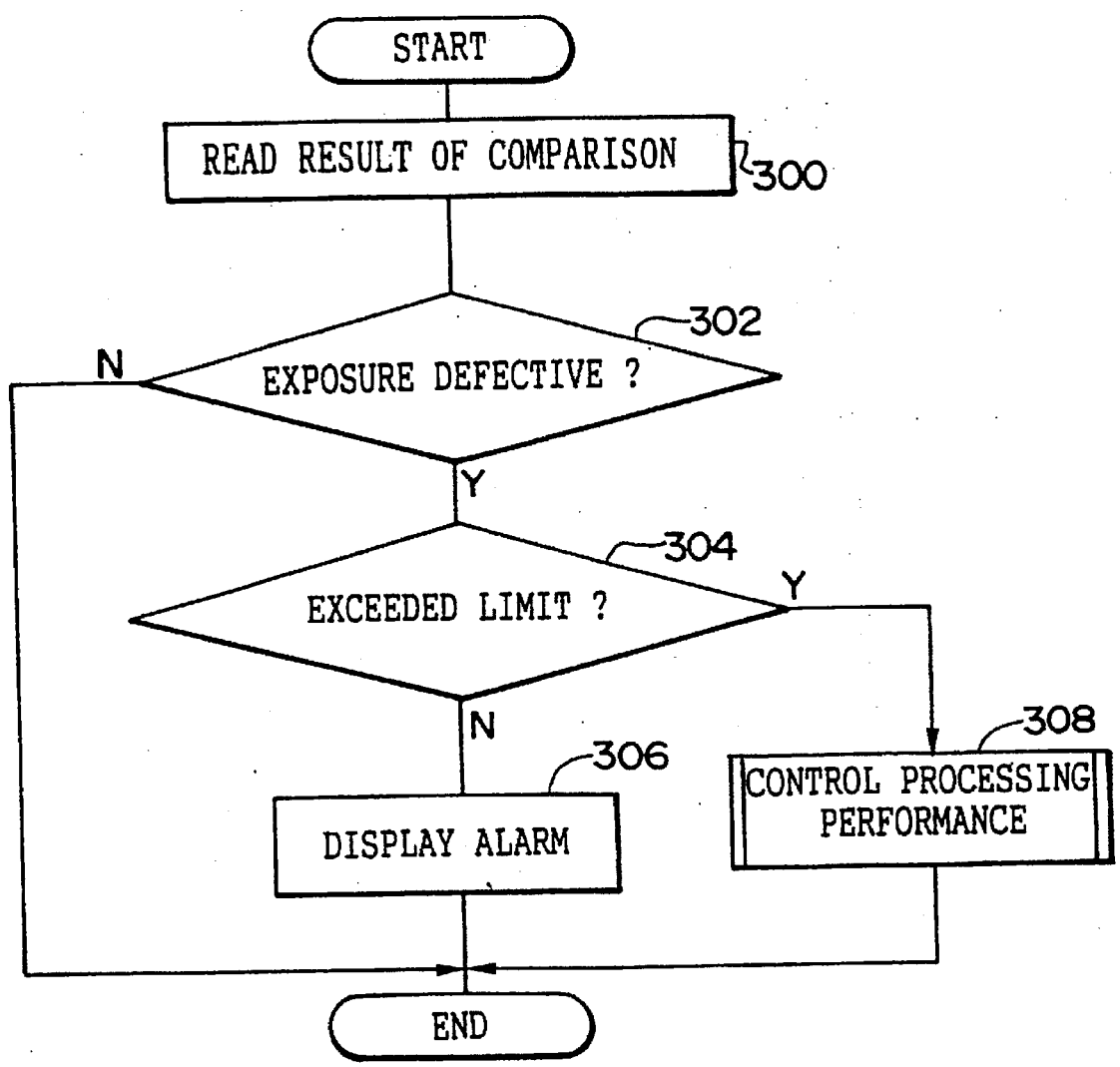
FIG. 25 is a flow chart showing an example of determination corresponding to a result of comparison of exposure.

When the result of comparison between the mean exposure and the reference exposure has been supplied from the printer processor 100 to the film processor 10, the film processor 10 controls the processing performance in accordance with the result of the comparison. FIG. 25 shows a control routine. The control routine is performed whenever a result of the comparison between the reference exposure and the mean exposure is supplied from the printer processor 100.

In step 300 of the flow chart the result of the comparison between the mean exposure and the reference exposure supplied from the printer processor 100 is read. In step 302 whether or not a defect has taken place in the result of the comparison is determined. If no defect has taken place, for example, if the mean exposure is within ±3% with respect to the reference exposure, a determination is performed that no defect has taken place (a negative determination is performed). Then, the routine is ended.

In step 304 whether or not non-acceptable difference takes place in the mean exposure with respect to the reference exposure is determined. If the mean exposure is within ±5% with respect to the reference exposure (a negative determination has been performed), the operation proceeds to step 306 so that a fact that the control of the processing performance of the film processor 10 is required is displayed on the display panel 72.

If the mean exposure is different from the reference exposure by ±5% or more, the operation proceeds to step 308. In step 308 the processing performance control processing routine shown in FIG. 10 is performed at step 106 so that the cause of the defect is analyzed and restoration is performed.

Thus, when the negative film N processed in the film processor 10 is processed in the printer processor 100, the mean exposure is calculated. Then, if a determination has been performed that the process of the film processor 10 has a defect in accordance with the result of the foregoing calculation, the cause can be detected. Moreover, in accordance with the detected cause, a countermeasure to restore the processing performance to an allowable range can be taken. As a result, the film processor 10 is able to appropriately maintain the finish of the negative film N at a predetermined range.

The inventors of the present invention employed a film processor "FP360B" and a printer processor "PP1250V" manufactured by Fuji Photo Film Co., Ltd. for a small laboratory ("MiniLab"). As the processing solution, "CN-16L" (for processing films) and "CP-47L" (for processing paper) manufactured by Fuji Photo Film Co., Ltd. were employed. Note that the film processor "FP360B" consists of a color developer bath 10A, a bleach bath 10B, a fixing bath 10D, a super rinse bath 10E and stabilizing baths 10F and 10G.

When a color negative film, which has been processed by the film processor "FP360B" and the trade name of which is "SUPER G400" manufactured by Fuji Photo Film Co., Ltd. has been mounted on the printer processor "PP1250V", the mean density of the negative film is read by a scanner to set the exposure so as to calculate the mean exposure for each 500 frames. Images of films probable that they have been photographed under special conditions in a disposable camera or with a panorama size were excluded. The reference exposure was the mean exposure of the normal frames of a Bull's eye on which an image having a predetermined density has been recorded and which is used when the exposing conditions are set and corrected. If the difference of the mean exposure from the reference exposure is not more than ±3% the foregoing range is set to be a normal range If the difference is more than 3% to 5% or less, the foregoing range is set to be an unsatisfactory range. If the difference is not less than ±5%, the foregoing range is set to be a defective range.

The film processor "FP360B" had a function of recording the throughput for one previous week and that for one previous month and subjecting the throughput for one previous week and that for one previous month and allowable throughputs to comparisons. Moreover, the film processor "FP360B" had a function of recording the temperature of each processing solution and subjecting the recorded temperature of each processing solution and allowable temperature to a comparison and a function of recording the replenishment accuracy of each processing solution. A replenishment accuracy on the basis of the throughput for one previous week was recorded. Moreover, there were provided a function of measuring the electric conductivity of washing water in the final rinsing bath and subjecting the measured electric conductivity and an allowable range to a comparison and a function of measuring the pH and specific gravity of the developer and the bleaching and fixing solution and subjecting the measured pH and specific gravity and respective allowable range to comparisons, and a function of recording the quantity of water supplied to each processing solution and subjecting the recorded quantity of supplied water and an allowable range to a comparison.

Figure 27A:
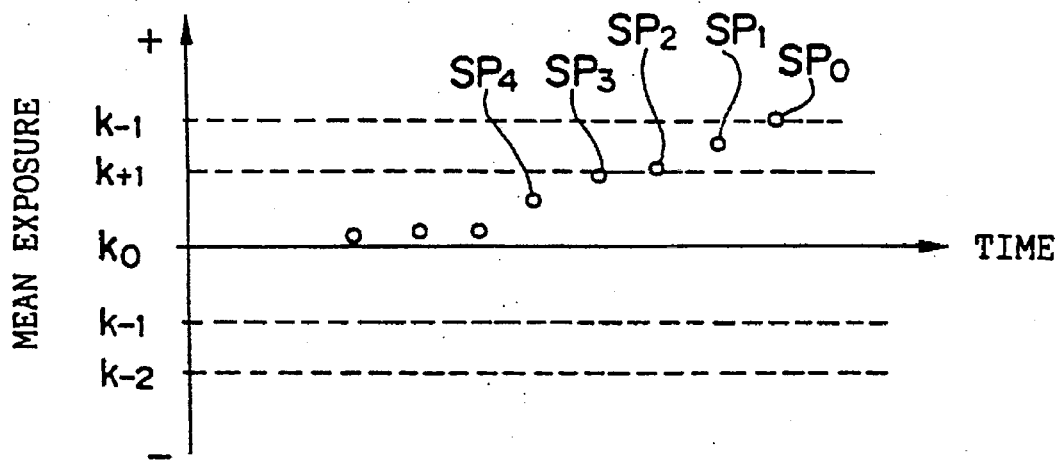
FIG. 27A is a graph showing an example of sampling of mean exposure.

The mean exposures were sampled, which were obtained by integrating the exposures of images formed by printing a color negative film (SUPER G400), developed by the film processor "FP360B" by a printer processor "PP1250V", on a color paper with a standard size, thus resulting in that sampled values of the mean exposure being as shown in FIG. 27A. That is, the mean exposure of the negative films were gradually enlarged from four days before (refer to sampled values $SP_4$ and $SP_3$). The mean exposure was made to be larger than the allowable range of 3% (upper limit $k_{+1}$, lower limit $k_{-1}$) with respect to reference exposure $k_0$ two days before and included in the unsatisfactory region (refer to sampled values $SP_2$ and $SP_1$), and then current sampled value $SP_0$ reached 5% which was set to be the defective region (upper limit $k_{+2}$, lower limit $k_{-2}$).

Figure 27B:
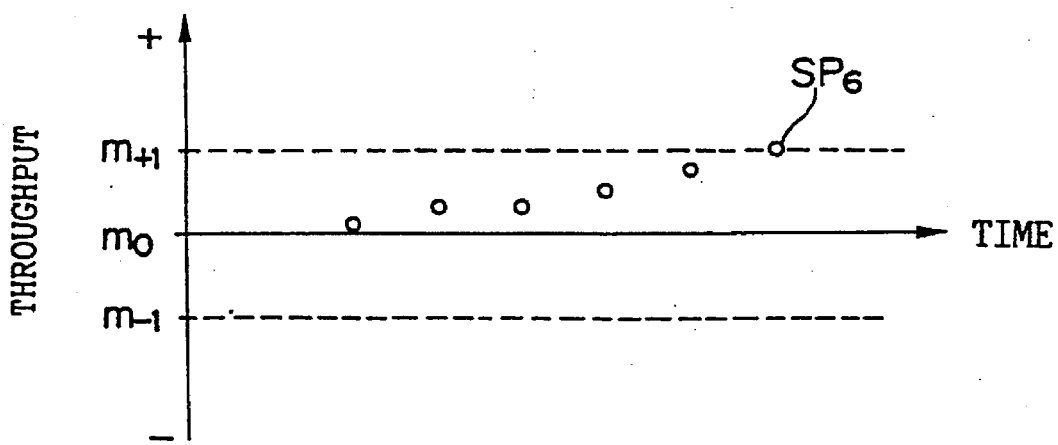
FIG. 27B is a graph showing an example of sampling of throughput.

Since the foregoing sampled value $SP_0$ was obtained, the total throughput of the negative film in the film processor "FP360B" was sampled. As a result, as shown in FIG. 27B, the current sampled value $SP_6$ reached upper limit $m_{+1}$ in the range between the upper limit $m_{+1}$ and lower limit $m_{-1}$ including ideal throughput $m_0$. At this time, the temperature of the processing solution in each of the color developer bath 10A, the bleach bath 10B, the fixing bath 10D, super rinse bath 10E and the stabilizing baths 10F and 10G was within the allowable range.

Figure 27C:
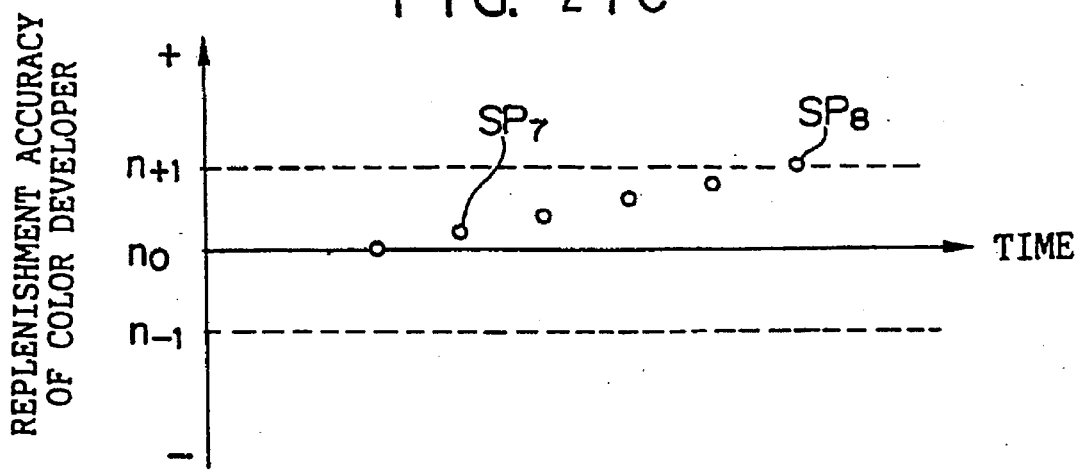
FIG. 27C is a graph showing an example of sampling of replenishment accuracy.

However, the replenishment accuracy for each week on the basis of the throughput of the negative films for each processing bath was sampled by the foregoing method, thus resulting in, as shown in FIG. 27C, thus resulting in that the sample value in the color developer bath 10A was gradually enlarged from sampled value $SP_7$ four days before with respect to ideal replenishment accuracy $n_0$. Thus, current sampled value $SP_8$ reached the upper limit $(n_{+1})$ of the allowable range (note that $n_{-1}$ is a lower limit). The replenishment accuracy in each processing bath except the color developer bath 10A was within the allowable range. A fact was confirmed that the electric conductivity of the stable bath liquid in the stabilizing bath 10F was within an allowable range. The pH and specific gravity of the color developer, bleaching solution and the fixing solution and the quantity of water supplied to each processing bath were within allowable ranges.

Since the throughput reached the upper limit $m_{+1}$ and the replenishment accuracy to the color developer bath 10A reached the upper limit $n_{+1}$, "throughput upper limit" and "replenishment accuracy of color developer deteriorated (error reached the upper limit" were displayed on the display panel 72.

The reason of the foregoing defective articles is considered due to excess supply and the development activity due to a large-quantity process.

Accordingly, a value for restoring the quantity of replenishment of the replenisher to the color developer bath 10A was calculated to cause the replenishment conditions to automatically be changed. The mean exposure was confirmed one week after, thus resulting in the mean exposure with respect to the reference exposure being restored within the allowable range.

The inventors of the present invention employed a film processor "FP560B" and a printer processor "PP1820V" each of which was manufactured by Fuji Photo Film Co., Ltd. Moreover, film processing solution "CN-16L" and paper processing solution "CP-47L" were employed in the foregoing systems. Note that the film processor "FP560B" has an arrangement such that a replenisher is replenished to the fixing bath 10D and fixing solution replenished in the fixing bath 10D is supplied to the bleach-fix bath 10C.

When the foregoing process is performed, the following functions were provided: a function or recording the throughput for one previous week and that for one previous month and subjecting the recorded throughput for one previous week and that for one previous month to comparisons with allowable ranges; a function of recording replenishment accuracy, pH and specific gravity of each processing solution, quantity of supplied water to compensate evaporation of each processing solution and the electric conductivity in the stabilizing bath 10G; and a function of comparison with a predetermined reference value. The mean exposure was a mean exposure of each 1000 frames.

Figure 28A:
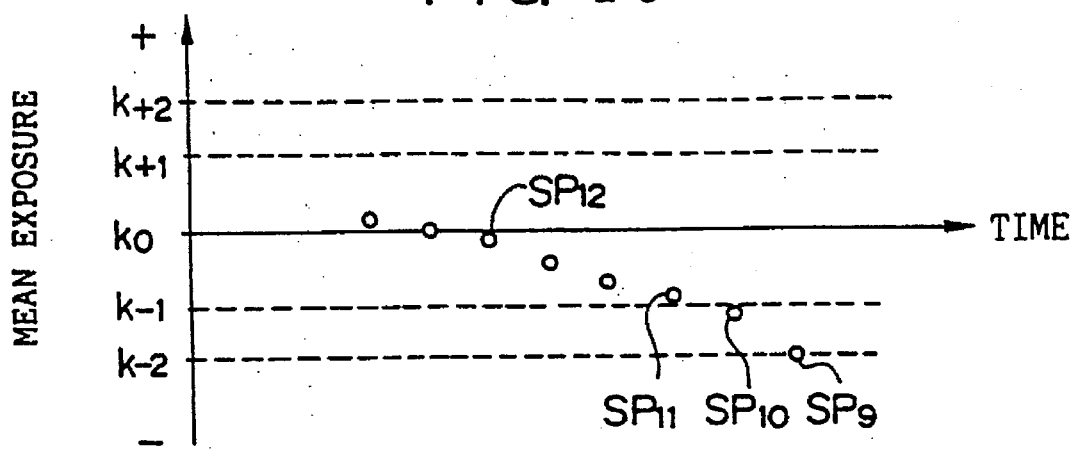
FIG. 28A is a graph showing an example of sampling of mean exposure.

As a result, the sampled value of the mean exposure calculated in the printer processor "PP1820V" was gradually reduced from sampled value $SP_{12}$ five days before, as shown in FIG. 28A. Thus, the difference from the reference exposure was smaller than the allowable range of 3% two days before and included in the unsatisfactory region (refer Go sampled values $SP_{11}$ and $SP_{10}$). As a result, current sampled value $SP_9$ reached −5% which was included in the defective region.

Figure 28B:
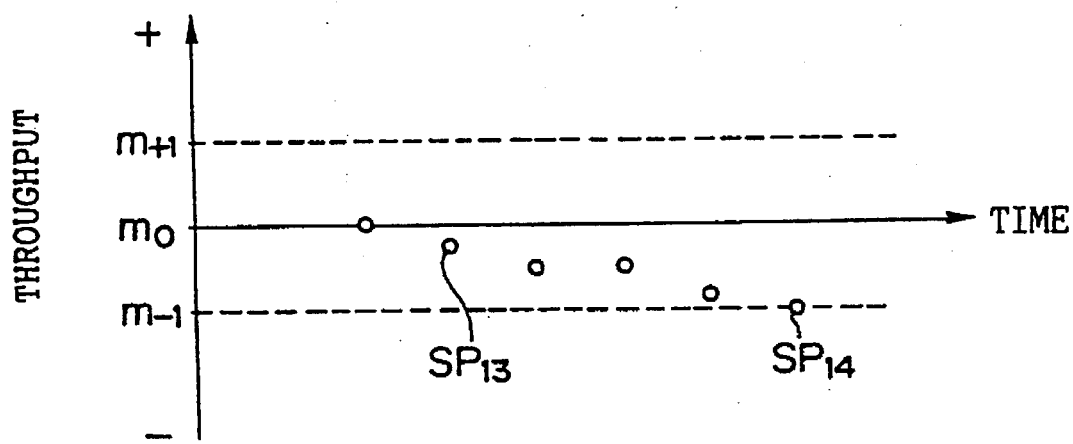
FIG. 28B is a graph showing an example of sampling of the throughput.

Since the foregoing sampled value $SP_9$ was confirmed, the throughput of the negative films in the film processor "FS560B" for one week was sampled. As a result, as shown in FIG. 28B, the reduction took place from sampled value $SP_{13}$ four days before with respect to ideal throughput m0. As a result, current sampled value $SP_{14}$ reached the lower limit $m_{-1}$.

Figure 28C:
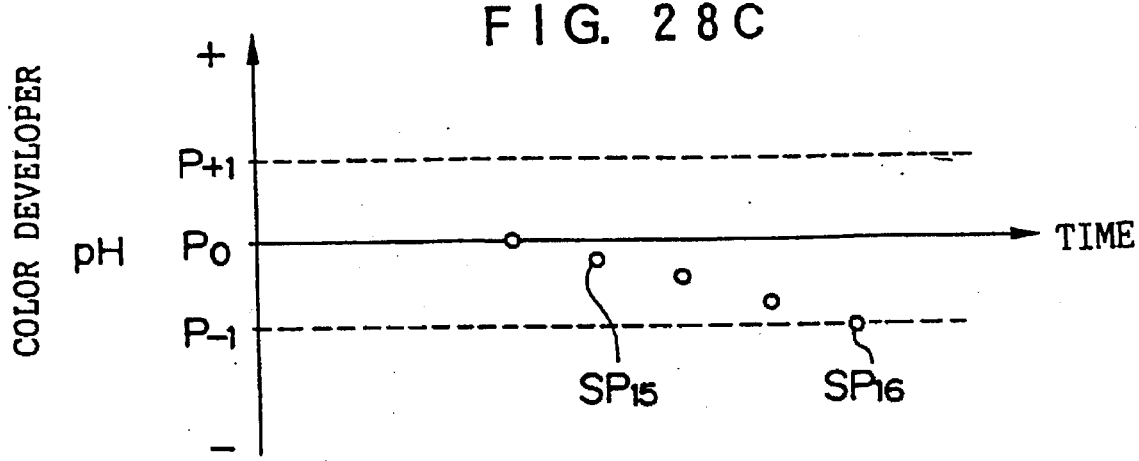
FIG. 28C is a graphs showing an example of sampling of the replenishment accuracy.

The temperature and the replenishment accuracy in each processing bath and the electric conductivity in the stabilizing bath 10G were confirmed, thus resulting in that each value being within the allowable range. Moreover, pH, the specific gravity and quantity of water supplied to compensate evaporation in each processing bath were confirmed. As a result, the specific gravity and the quantity of water supplied to compensate evaporation were within allowable ranges with respect to the reference values. However, the sampled value of pH in the color developer bath 10A was, as shown in FIG. 28C, gradually reduced from sampled value $PS_{15}$ three days before with respect to reference value p0. Thus, current sampled value $SP_{16}$ was lowered to be out of the allowable range (a range from $p_{+1}$ to $p_{-1}$) with respect to reference value p0.

Since the throughput reached the lower limit of the allowable range with respect to the, ideal throughput and pH of the color developer in the color developer bath 10A was lower than the allowable range, "throughput lower limit" and "pH of color developer exceeded lower limit" were displayed on the display panel 72.

The reason for the defects being taken place is considered due to deterioration in the development activity due to the intermittent processing.

As a countermeasure for solving the foregoing fact, it might be considered feasible to employ increase in the quantity of replenishment to the color developer bath 10A. Accordingly, as a countermeasure to prevent intermittent processing, an increase in the replenishment is previously calculated and the quantity of replenishment is automatically changed. The mean exposure was confirmed after a predetermined period (for example, one week), thus resulting in that the mean exposure being restored into the allowable range with respect to the reference exposure.

Moreover, the inventors employed the film processor "FP560B", the printer processor "PP1820V" and the processing solutions "CN-16L" and "CP-47L". At this time the integrated quantities of light in accordance with LATD (Large Area Transmittance Density) to obtain the mean value for each 1000 frames so as to subject the obtained mean value to a comparison with a reference value.

When the mean value of the integrated quantities of light reached the upper limit, that is, since the density of the film reached so that the exposure reached the upper limit, the quantity of replenishment to the color developer bath 10A was reduced. As a result, a desired photographic characteristic was restored.

Although the foregoing embodiment has been described about the film processor or the printer processor, the present invention is not limited to the foregoing units. The present invention may be applied to a photograph processing apparatus shown in FIG. 32 and formed by integrating the film processor and the printer processor. That is, a photograph processing apparatus 10L comprising a casing (not shown) including a film processing portion 16L for drawing a negative film 12L from a patron 14K to develop the negative film 12L; an image exposing portion 22L for drawing a photographic paper 20L wound in the form of a roll and accommodated in a magazine 18L so as to expose the developed negative film 12L to correspond to the recorded images and a photographic-paper processing portion 24L for developing the photographic paper 20L which has been exposed to light.

In the film processing portion 16L, a developing bath 26L for reserving developer, a bleaching bath 28L for reserving bleaching solution and a first fixing bath 30L and a second fixing bath 32L for respectively reserving fixing solution, waster bath 34L for reserving water for washing, and a first stabilizing bath 36L and a second stabilizing bath 38L, which are continuously disposed. At a position downstream from the second stabilizing bath 38L, there are formed a drying chamber 42L and a reservoir portion 44L.

The negative film 12L drawn from the patron 14L is, by a conveyance means (not shown), sequentially conveyed to the developing bath 26L, the bleaching bath 28L, the first fixing bath 30L, the second fixing bath 32L, water-washing bath 34L, the first stabilizing bath 36L and the second stabilizing bath 38L so as to be processed with developer, bleaching solution, fixing solution, water and stabilizer. The negative film 12L, which have been processed as described above, is dried in the drying chamber 42L with drying air generated by a heater and a fan (not shown), followed by being conveyed to the reservoir portion 44L.

In the image exposing portion 22L, the developed negative film 12L is introduced from the reservoir portion 44L. Moreover, the photographic paper 20L is drawn from the magazine 18L so as to sequentially expose, to the photographic paper 20L, images recorded on the negative film 12L. The image exposing portion 22L may be structured variously to be adaptable to slit exposure with which images recorded on the negative film 12L are exposed to the photographic paper 20L while conveying the negative film and photographic paper 20L at respective predetermined speeds, or scanning exposure in which images recorded on the negative film 12L are read by an image reading means, and then the read images are scanning-exposed to the photographic paper 20L by laser beams or the like. The photographic paper 20L, the images of which have been exposed, is conveyed to a position between the image exposing portion 22L and the photographic-paper processing portion 24L.

The photographic-paper processing portion 24L has a developing bath 48L for reserving developer for developing the photographic paper 20L, a bleaching and fixing bath 50L for reserving bleaching and fixing solution, a first rinsing bath 52L, a second rinsing bath 54L and a third rinsing bath 56L for reserving rinsing solutions. At a position downstream from the third rinsing bath 56L in a direction in which the photographic paper 20L is conveyed, there is formed a drying chamber 58L. The photographic paper 20L, which has been conveyed to a reservoir portion 46L and images of which have been exposed, is, by a conveyance means (not shown), introduced into the photographic-paper processing portion 24L. Thus, the photographic paper 20L is sequentially conveyed through the developing bath 48L, the bleaching and fixing bath 50L, the first rinsing bath 52L, the second rinsing bath 54L and the third rinsing bath 56L so as to be processed with the developer, the bleaching and fixing solution and the rinsing solution. The thus-processed 20k is introduced into the drying chamber 58L so as to be blown with drying air generated by a heater and a drying fan (not shown) so that a drying process is performed.

The thus-dried photographic paper 20L is cut into, for example, each image frames so as to be discharged as photographic prints.

Moreover, the processes according to the first embodiment may be performed in the film processing portion 16L and the photographic-paper processing portion 24L.

The photography processing apparatus having the film processing portion 16L and the photographic-paper processing portion 24L is able to obtain information in a large quantity and, therefore, the cause of the defect can accurately be estimated.

As described above, the foregoing embodiment has the structure such that if the mean exposure realized when a photographic sensitive material processed in the film processing apparatus is exposed to a photosensitive material for printing in the print processing apparatus is out of a predetermined range including the reference exposure, the cause can be estimated in accordance with the physical quantities detected by the film processing apparatus. As a result, the processing performance of each processing solution of the film processing apparatus for processing the photographic sensitive material for taking pictures can be included in the allowable range. Thus, an excellent effect can be obtained in that the photographic characteristics of the processing solution and the photographic sensitive material for taking pictures, which is processed in the film processing apparatus, can be controlled with an excellent quality.

A printer processor 100, which is a photographic sensitive material processing apparatus according to a second embodiment of the present invention will now be described while diverting FIG. 2 and ensuing figures. Since the structure of the printer processor 100 may be similar to the foregoing printer processor shown in FIG. 2 and ensuing figures, its description is omitted.

The operation of the second embodiment will now be described.

Initially, a routine for controlling the processing performance of the processing solutions according to this embodiment will now be described with reference to FIG. 33.

When the printer processor 100 in the paused state has been brought to the standby state and a determination has been performed that the temperature of the processing solution has been raised to a set level, a filter included in the printer processor 100 is used to expose, to a standard density, the color paper 16P drawn from the sensitive material magazine 16 and conveyed to the exposing portion 14. The exposed color paper 16P is conveyed by a conveyance rollers so as to be allowed to pass through the processing baths 10N1 to 10N6 in which the color paper 16P is immersed in the respective processing solutions, followed by being allowed to pass through the drying portion 10N7. Then, the color paper 16P passes through the drying port, on 10N7 and conveyed to a position at which the density meter 22 is disposed due to switch of the conveyance passage to the density measuring portion 22N by a switching means (not shown). As a result, a paper detection sensor (not shown) detects the color paper 16P. As a result of the detection, the density is fetched from the density meter 22 in step 1102 in the routine shown in FIG. 33. The density fetching process will now be described with reference to FIG. 34.

In step 1132 an exposed portion of the color paper 16P (a portion exposed to realize the standard density) is irradiated and the light reflected therefrom is measured. In step 1134 signals of three primary colors, R G and B obtained by the measured light are fetched. In step 1136 the fetched signals of three primary colors, R, G and B are converted into densities of the respective colors and stored.

In step 1138 the non-exposed portion (portions except the foregoing portion exposed to realize the standard density) of the color paper 16P is irradiated and the light reflected therefrom is measured. In step 1140 signals of three primary colors, R, G and B obtained by the measured light are fetched. In step 1142 the fetched signals of the three primary colors, R, G and B are converted into densities of the respective colors and the densities are stored. Then, the operation proceeds to step 1104 (see FIG. 33).

As a result of the foregoing process, the densities (the standard density and the lowest density $D_{min}$) of three primary colors, R, G and B of the exposed portion and the non-exposed portion of the color paper 16P are fetched.

In step 1104 a determination similar to that described in step 104 shown in FIG. 10 is performed.

Figure 35:
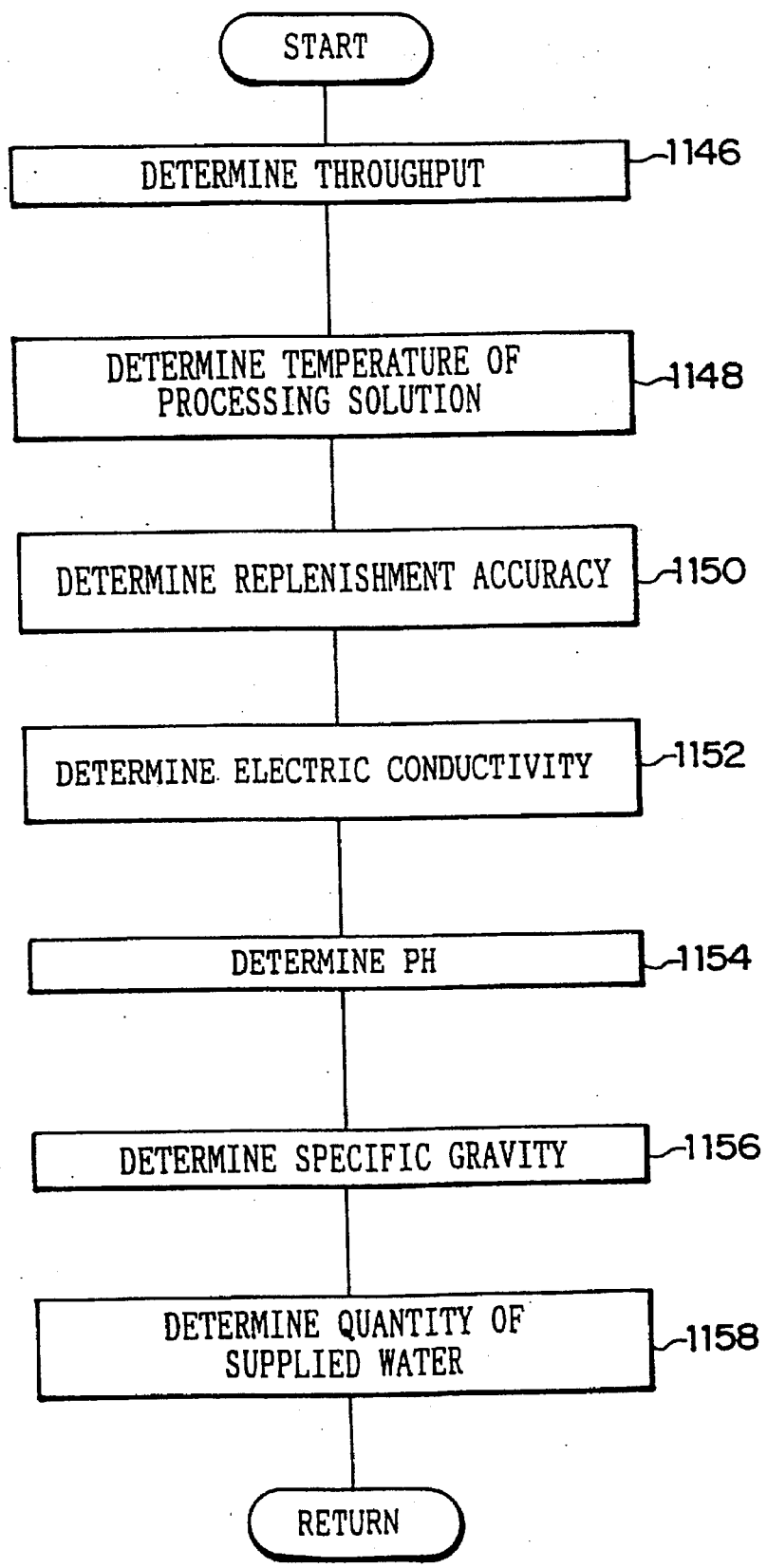
FIG. 35 is a flow chart showing the detailed routine of for determining the physical quantities in step 1106 of FIG. 33.

If the determination in step 1104 is negated, the processing solution has appropriate performance. Therefore, the process is ended. If the determination in step 1104 is affirmed, a determination is performed that the processing performance of the processing solution has a defect. To estimate the cause, in step 1106, the throughput, the temperature of the processing solution, the replenishment accuracy, the electric conductivity, pH, specific gravity and the quantity of supplied water are determined as the physical quantities affecting the photographic characteristics of the color paper 16P. The determining process is shown in FIG. 35. Since steps 1146 to 1150 are steps for processing the color paper 16P similar to steps 146 to 150 shown in FIG. 12, the description thereof is omitted.

In step 1152 the electric conductivity is determined. Since the electric conductivities of the rinsing solution in the final rinsing processing bath 10N6 are time sequentially stored as described later, the time sequentially stored electric conductivities of the rinsing solution are fetched. Whether or not the fetched electric conductivity is within an allowable range (an allowable range set on the basis of an ideal electric conductivity of the rinsing solution in the final rinsing bath 10N6 to maintain the photographic characteristic of the color paper 16P within an allowable range) is determined. If the fetched electric conductivity is out of the allowable range, this fact (a defective item) is stored.

In step 1154 pH is determined. Since the pH of the developer and that of the bleaching and fixing solution have been stored time sequentially as described later, the time sequentially stored pH of the developer and that the bleaching and fixing solution are fetched. Whether or not the fetched pH of the developer and that of the bleaching and fixing solution are within an allowable range (an allowable range set on the basis of an ideal pH of the developer and that of the bleaching and fixing solution to maintain the photographic characteristic of the color paper 16P within an allowable range) is determined. If any one of the fetched pH values of the developer and that the bleaching and fixing solution is out of the allowable range, this fact (a defective item) is stored.

In step 1156 the specific gravity is determined. Since the specific gravities of the developer and bleaching and fixing solution have been stored time sequentially as described later, the time sequentially stored specific gravities of the developer and bleaching and fixing solution are fetched. Whether or not the fetched specific gravities of the developer and bleaching and fixing solution are within an allowable range (an allowable range set on the basis of an ideal specific gravities of the developer and bleaching and fixing solution to maintain the photographic characteristic of the color paper 16P within an allowable range) is determined. If any one of the fetched specific gravities of the developer and bleaching and fixing solution is out of the allowable range, this fact (a defective item) is stored.

In step 1158 the quantity of supplied water is determined. Since this process is similar to that described about the film processor 10 with reference to FIG. 20, the description thereof is omitted.

Since the process for time sequentially storing the electric conductivity of the rinsing solution in the final rinsing bath 10N6 for use in step 1152 is similar to the temperature detection routine, the description thereof is omitted. The process is performed by an interruption process when the temperature detection routine has been completed. The reason why only the electric conductivity of the rinsing solution in the final rinsing bath 10N6 is detected is that the electric conductivity can be detected accurately as the concentration of the processing solution is low. Note that the electric conductivity of rinsing solution except that in the final rinsing bath may be detected.

Since the process for time sequentially storing the pH of the developer and bleaching and fixing solution for use in step 1154 is similar to the temperature detection routine, the description thereof is omitted. The process is performed by an interruption process when the process for detecting the electric conductivity has been completed. The reason why the pH of only the developer and that of the bleaching and fixing solution are detected is that the pH can accurately be detected as the concentration of the processing solution is high. Note that the pH of a processing solution except the developer and the bleaching and fixing solution may be detected.

Since the routine for detecting the specific gravity of the developer for use in step 1156 is similar to the routine described with reference to FIGS. 16, 17, 18 and 19A to 19D, the description thereof is omitted.

Data of the thus-stored physical quantities is deleted after a predetermined time has passed (for example, one month) so that data is effectively stored.

Figure 33:
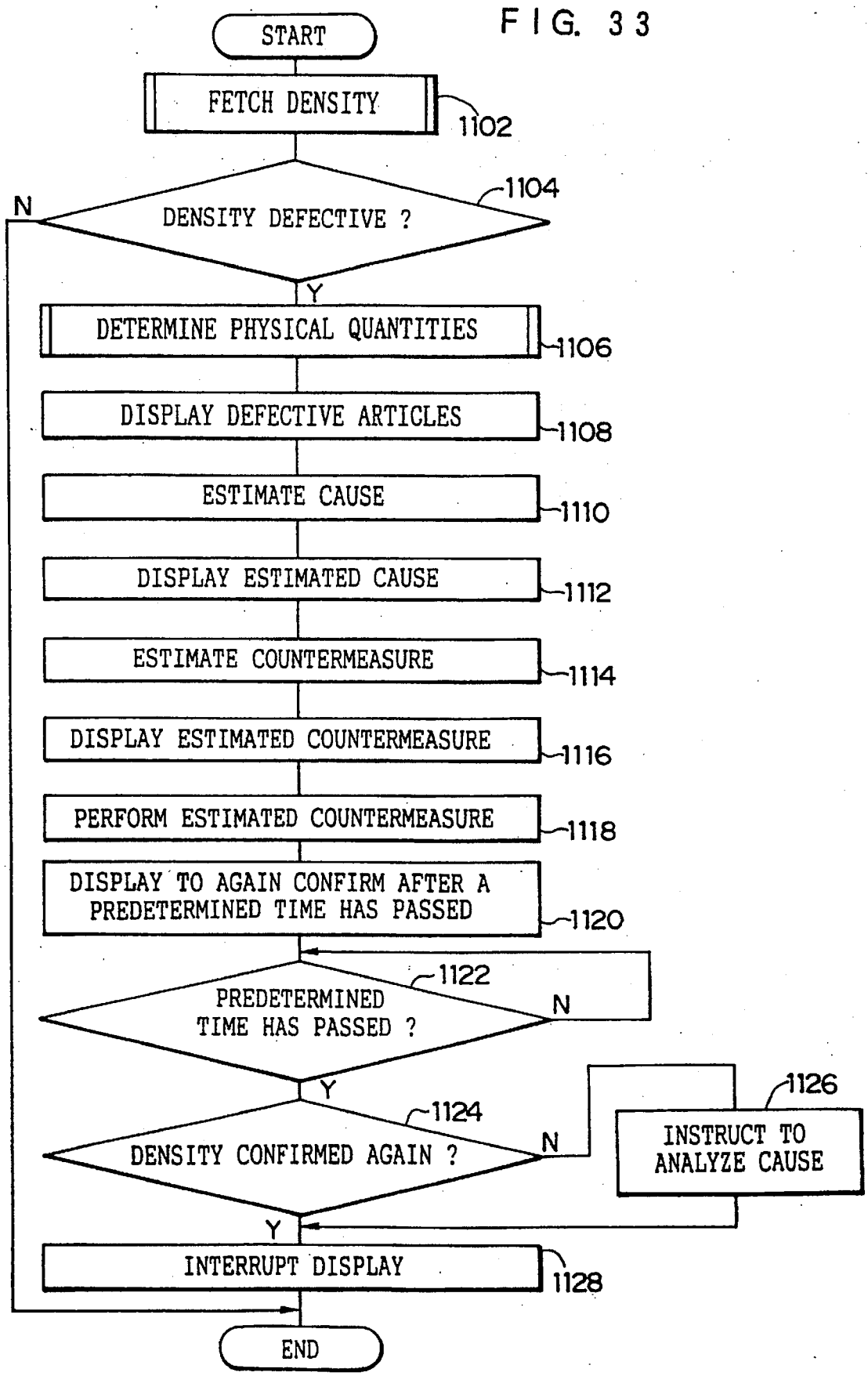
FIG. 33 is a flow chart showing a routine for processing control of the processing performance.
Figure 34:
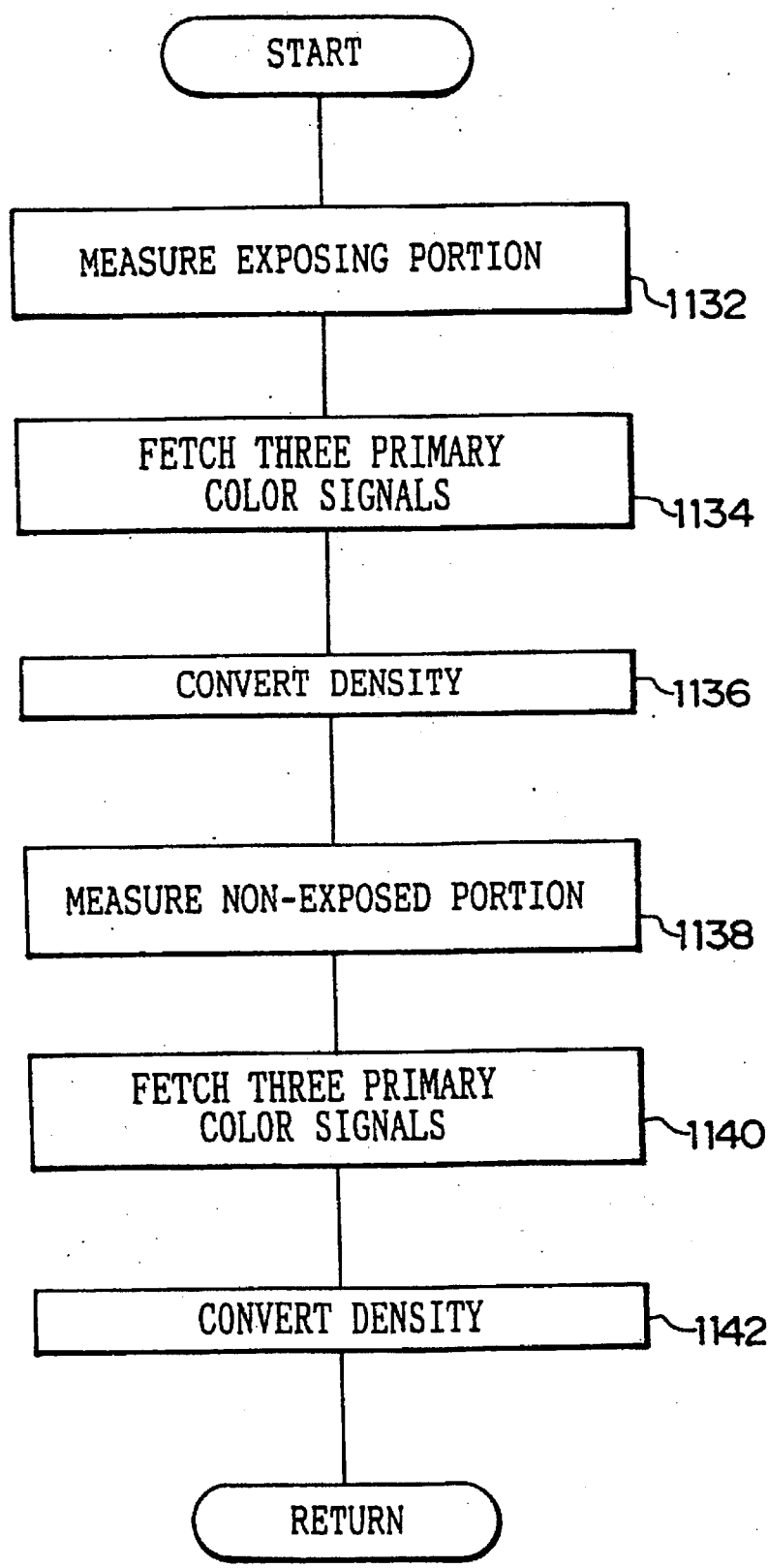
FIG. 34 is a flow chart showing detailed routine of fetching the density in step 1102 of FIG. 33.

After the physical quantity has been determined as described above, the defective items are displayed on the display panel 72 in step 1108 (see FIG. 33). For example, if the throughput of the color paper 16P in one week is out of the allowable range, a fact that the throughput of the color paper 16P in one week is out of the allowable range is displayed.

In step 1110 the cause is estimated in accordance with the defective items. In step 1112 the estimated cause is displayed. If the defective item has been specified, also the cause of the defective item can be specified. In this embodiment, patterns of defective items and causes of the patterns corresponding to the pattern of defective items are stored. The following table shows patterns of defective items and causes of the patterns.

TABLE 7

| Defective Items | Causes |
| --- | --- |
| (1) Color Developer Bath | |
| lowering of pH | supply of replenisher is insufficient |
| | intermittent processing (the throughput is too small-per unit period |
| | a great quantity of overexposed photosensitive materials are processed |
| | replenisher has been oxidized due to leaving of the floating cover for the replenishment bath or the like |
| rise in pH | excess replenishment of replenisher |
| | throughput is too large per unit period |
| | a great quantity of non-exposed photosensitive material is processed |
| (2) Bleach-Fix Bath | |
| rise in pH | supply of replenisher is insufficient |
| | excessively large carry over |
| lowering in specific gravity | supply of replenisher is insufficient |
| | excessively large carry over |
| lowering in pH | excess supply of replenisher |
| | sulfidization takes place due to intermittent processing |
| | concentration takes place due to intermittent processing |
| rise in specific gravity | excess supply of replenisher |
| | concentration takes place due to intermittent process4Lng |
| (3) Rinsing Bath | |
| rise in conductivity | supply of replenisher is insufficient |
| | concentration takes place due to intermittent processing |
| | excessively large carry over |
| lowering in conductivity | excess supply of replenisher |
| | sulfidization and precipitation takes place due to intermittent processing |

In step 1114 a countermeasure (a countermeasure to bring the fetched densities of three primary colors, R, G and B of the exposed portion and the non-exposed portion into values within an allowable range) is estimated in accordance with the estimated cause of the defect. In step 1116 the estimated countermeasure is displayed. In step 1118 the estimated countermeasure is performed.

If the cause of the defect has been specified, the countermeasure can be specified. Therefore, this embodiment has a structure such that the causes of defects and countermeasures against the causes of defects are stored.

In the case where the supply of the replenisher is insufficient, for example, in a case where the replenishment accuracy of the replenisher to the rinsing bath 10N3 to 10N6 is lower than an allowable range, that is, in a case where the quantity of replenisher supplied by operating the replenishing pumps 44N₃ to 44N₆ is smaller than a set value by a predetermined quantity, a countermeasure is performed such that the set value is enlarged by, for example, 5 ml. If a determination has been made that a failure of the replenishing pumps $44N_3$ to $44N_6$ of the rinsing bath $10N3$ to $10N6$ or a clogging of the circulation filters $30N4_3$ and $30N4_6$ of the rinsing bath $10N3$ to $10N6$ has taken place (in a case where the defective item cannot be made to be normal, notwithstanding the quantity of replenishment has been corrected), a countermeasure is performed such that instruction information of exchange of the replenishing pumps $44N_3$ to $44N_6$ and that of overcoming clogging of the circulation filters $30N4_3$ and $30N4_6$ are displayed on the display panel 72. In a case where the printer processor 10 is connected to a host computer in the headquarters through a communication line, a countermeasure may be taken such that information for instructing exchange of the replenishing pumps $44N_3$ to $44N_6$ of the printer processor 10 is displayed on a monitor of the headquarters.

In step 1120 a requirement of re-confirmation as to whether or not the density of the exposed portion and the non-exposed portion of the color paper 16P is within the allowable range is displayed after a predetermined time has passed. In step 1122 whether or not a predetermined time has passed is determined. In step 1124 whether or not the density of the exposed portion and the non-exposed portion of the color paper 16P is within an allowable range is determined. If a determination has been performed that it is not within the allowable range, information to instruct the analysis of the cause is displayed on the display panel 72 in step 1126. Thus, the process is ended. If the determination in step 1124 has been affirmed, that is, if the density of the exposed portion and the non-exposed portion of the color paper 16P is within the allowable range, a display to determine whether or not the density of the exposed portion and the non-exposed portion is within the allowable range is stopped in step 1128. Then, the process is ended.

As described above, if the processing performance of the processing solution is defective, the cause can be specified. Moreover, in accordance with the specified cause, a countermeasure to make the fetched density of the three primary colors, R, G and B in the exposed portion and the non-exposed portion to be within an allowable range can be taken. Therefore, after the countermeasure has been taken, the density of the color paper can be made to be a value within a predetermined range. Thus, the processing performance of the processing solution can be brought into the allowable range.

The inventors of the present invention employed printer processor PP1255V (trade name) for a small laboratory (MiniLab) manufactured by Fuji Photo Film Co., Ltd. as the printer processor in the foregoing embodiment and CP-47L manufactured by the same as the processing solution. Note that printer processor "P1255V" has a process set to perform a development process (45 seconds), a bleaching and fixing process (45 seconds), a rinsing process (90 seconds) and a drying process (60 seconds).

The printer processor PP1255V was caused to include a filter for exposing to make a predetermined portion of the color paper 16P to be a standard density, the density meter for detecting the density (the lowest density of three colors, blue (B), green (G) and red (R)) in the exposed portion and the non-exposed portion of the color paper 16P exposed to realize the standard density by using the foregoing filter and the foregoing various sensors.

Moreover, to apply the present invention to the printer processor "PP1255V", the printer processor "PP1255V" was provided with a function of recording the throughput for one previous week and one previous month and subjecting the recorded throughput for one previous week and the one previous month to comparisons with allowable ranges. Moreover, there were provided with a function of recording the temperature of each processing solution and subjecting the recorded temperature of each processing solution to a comparison with an allowable range and a function of recording the replenishment accuracy of each processing solution. A replenishment accuracy on the basis of the throughput for one previous week was recorded. There were provided a function of measuring the electric conductivity of washing water in the final rinsing bath and subjecting the measured electric conductivity to a comparison with an allowable range, a function of measuring the pH and the specific gravity of the developer and the bleaching and fixing solution and subjecting the measured pH and specific gravity to comparisons with respective allowable ranges and a function of recording the quantity of water added to each processing solution and subjecting the recorded quantity of supplied water to a comparison with an allowable range.

Figure 36:
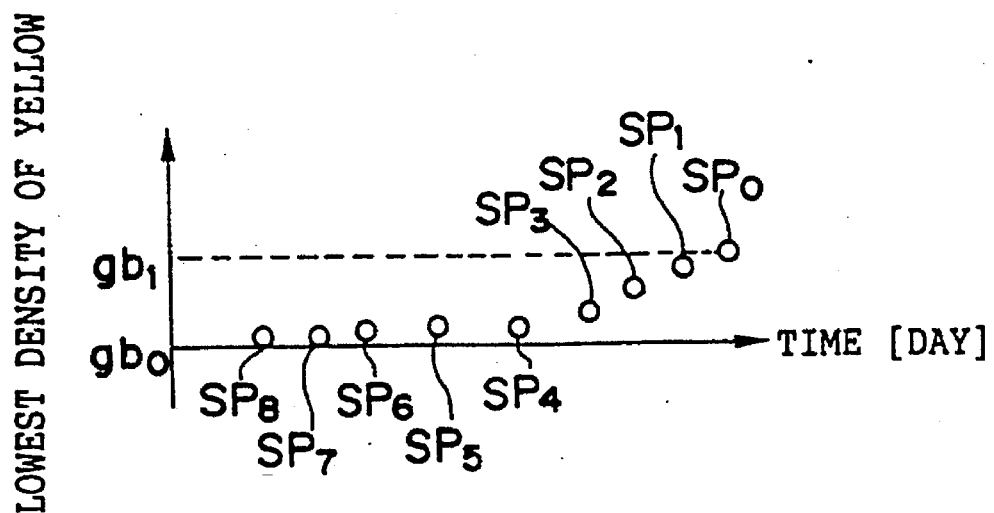
FIG. 36 is a graph showing density data.

When the printer processor "PP1255V" in the paused state has been brought to the standby state and a determination has been performed that the temperature of each processing solution has been raised to a predetermined level, the color paper 16P exposed to have the standard density by using the foregoing filter was processed in the foregoing processes. Then, the foregoing density meter was used to measure the luminous intensity of the exposed portion and the non-exposed portion of the color paper 16P to convert the obtained values into densities of yellow, cyan and magenta, followed by performing sampling. As a result, the sampled values of the density of yellow (BL Dmin) of the non-exposed portion was as shown in FIG. 36. That is, sampled vales $SP_8$ to $SP_4$ of the density of yellow in the non-exposed portion of the color paper 16P processed in the foregoing processes in a period from 8 days before to four days before were near standard density $g_{b0}$. However, the values were gradually enlarged from three days before (refer to sampled values $SP_3$ to $SP_1$). The current sampled value $SP_0$ exceeded the upper limit $g_{b1}$ (+0.03) of the allowable range.

Figure 37:
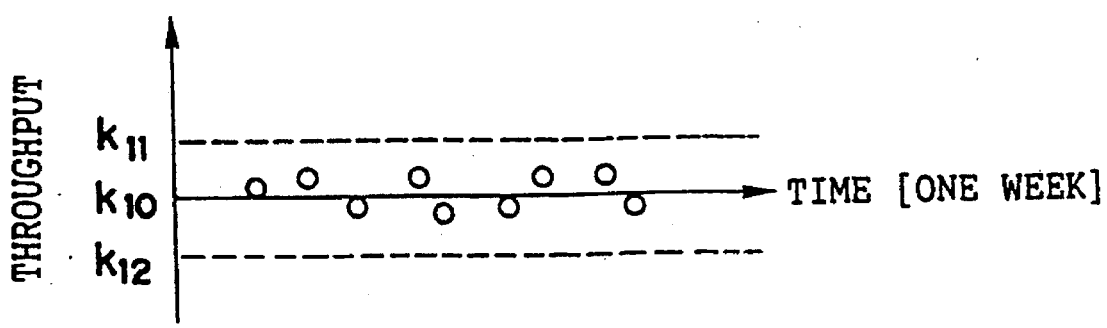
FIG. 37 is a graph showing data of the throughput.

Since the foregoing sampled value $SP_0$ was confirmed, the total throughput of the color paper 16P for one week was detected by the foregoing method and sampled. As a result, as shown in FIG. 37, each sampled value was within a range between upper limit $k_{11}$ and lower limit $k_{12}$ of the allowable range including ideal throughput $k_{10}$. The temperature of each of the color development processing bath 10N1, the bleach-fix bath 10N2 the rinsing baths 10N3 to 10N6 was within the allowable range.

Figure 38:
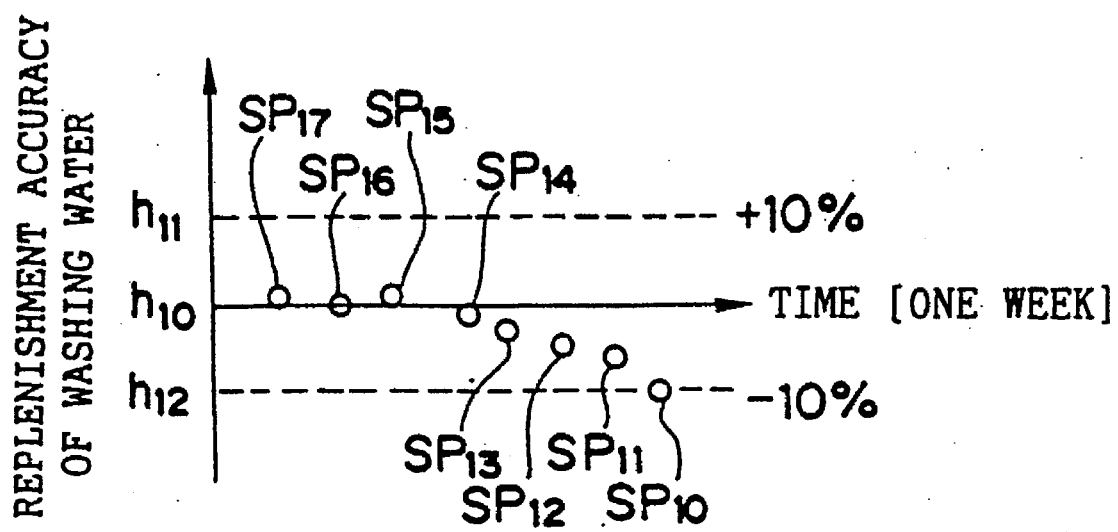
FIG. 38 is a graph showing data of the replenishment accuracy.

The replenishment accuracy of washing water to the rinsing baths 10N3 to 10N6 based on the throughput for one week which was detected and sampled by the foregoing method was resulted in as shown in FIG. 38. As a result, sampled value $SP_{13}$ four weeks before has been made to be lower than ideal replenishment accuracy $h_{10}$. Current sampled value $SP_{10}$ was made to be lower than the lower limit h12 (−10%) of the allowable range. Note that the replenishment accuracy to the color developer and the bleaching and fixing bath was within the allowable range.

Figure 39:
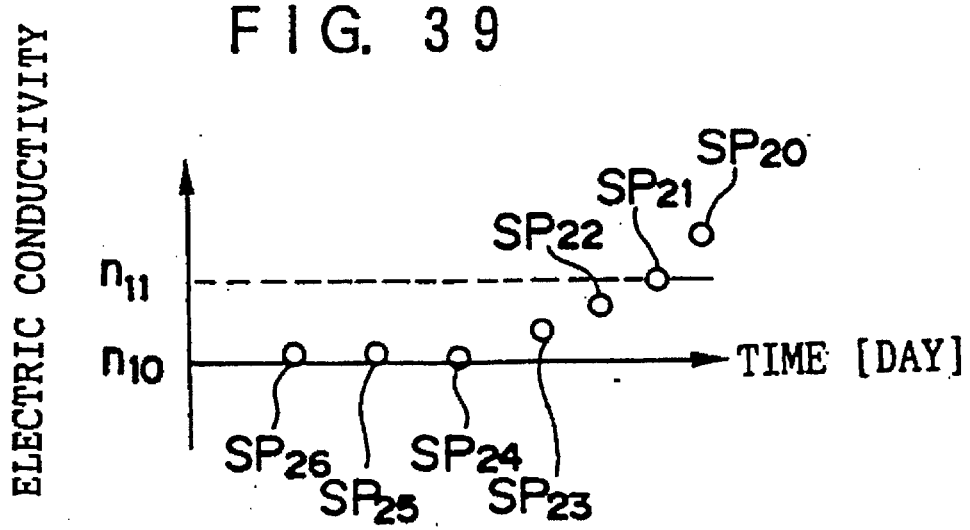
FIG. 39 is a graph showing data of electric conductivity.

The electric conductivity of washing water in the final rinsing bath 10N6 was detected by the foregoing method and sampled. As a result, as shown in FIG. 39, sampled value $SP_{23}$ three days before has been made to be higher than ideal electric conductivity n10. Sampled values $SP_{19}$ a day before and $SP_{20}$ the present measurement were made to be higher than the upper limit $n_{11}$ (×1.5 times) of the allowable range.

The pH, specific gravity of the color developer and bleaching and fixing solution and the quantity of water supplied to each processing solutions were within allowable ranges.

As described above, the replenishment accuracy of washing water in the rinsing baths 10N3 to 10N6 was lower than the lower limit of the allowable range and the electric conductivity of the final rinsing bath 10N6 exceeded the upper limit of the allowable range. Therefore, "deterioration in replenishment accuracy of washing water" and "rise in electric conductivity of washing water in final rinsing bath 10N6" were displayed on display panel 72.

In the case, the cause of the defect can be estimated due to the insufficient quantity of replenishment of washing water to the rinsing baths 10N3 to 10N6.

Therefore, the quantity of replenishment to the rinsing baths 10N3 to 10N6 was enlarged by a predetermined quantity. Then, the density of the non-exposed portion of the color paper 16P exposed to have the standard density was measured one week after, thus resulting in the density being included in the allowable range.

Moreover, the inventors caused the foregoing printer processor "PP1255V" set to perform development (45 seconds), a bleaching and fixing process (45 seconds), a rinsing process (90 seconds) and a drying process (60 seconds) to have a function of recording the throughput for one previous week and one previous month and subjecting the throughput for previous week and one previous month to comparisons with allowable ranges and a function of recording the replenishment accuracy of each processing solution. A replenishment accuracy on the basis of the throughput for three days was recorded.

Figure 40:
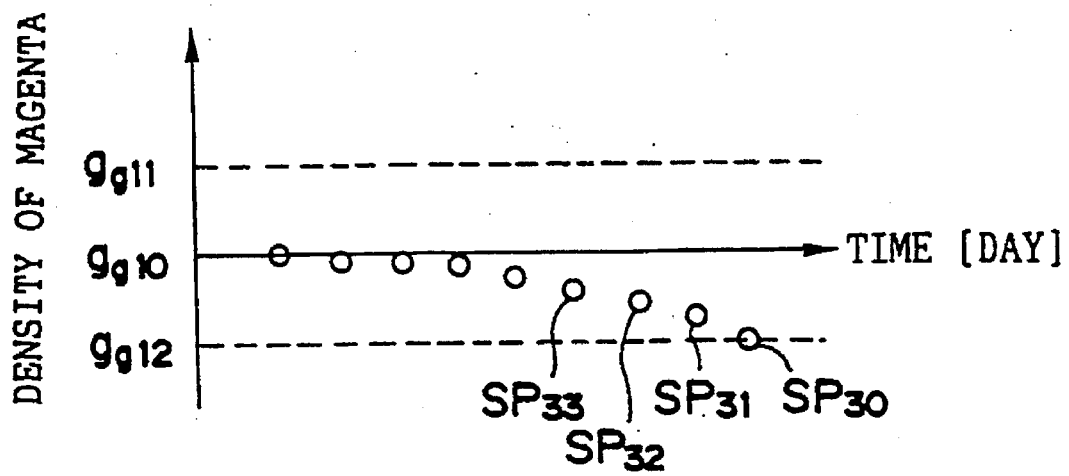
FIG. 40 is a graph showing data of density.
Figure 41:
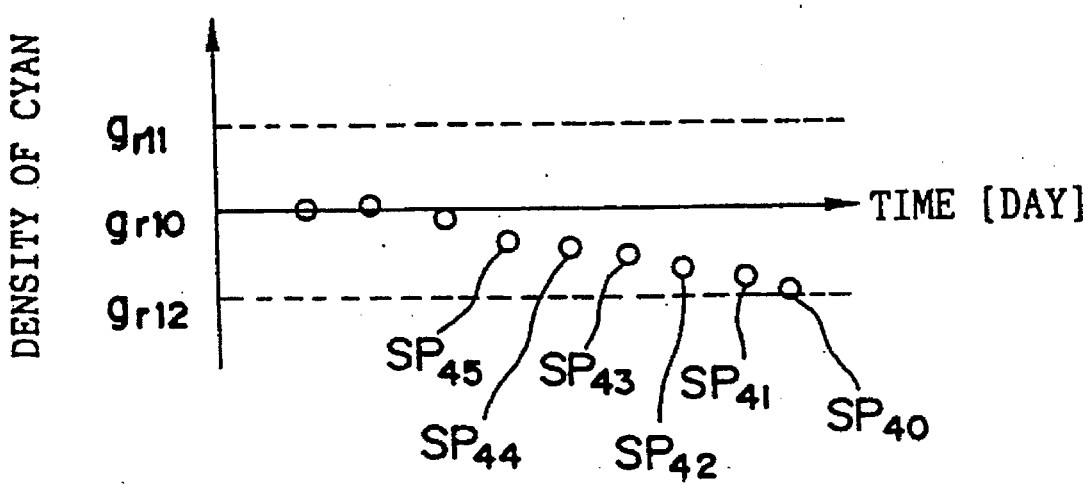
FIG. 41 is a graph showing data of density.

As a result, the color paper 16P exposed to have the standard density by using filter included in the printer and processed in the foregoing processes, followed by measuring and sampling the irradiated and reflected light of the exposed portion and the non-exposed portion by a density meter. As a result, the sampled values of magenta and cyan in the standard exposure portion were as shown in FIGS. 40 and 41.

That is, starting at the sampled value $SP_{34}$ of the density of magenta in the exposed portion of the color paper 16P processed in the foregoing process four days before, the sampled values were gradually lowered. Current sampled value $SP_{30}$ became at lower limit $g_{g12}$ (−0.10) of the allowable range. Starting at sampled value $SP_{45}$ of the density of cyan in the exposed portion of the color paper 16P processed in the foregoing process five days before, the sample values were gradually lowered considerably. Current sampled value $SP_{40}$ became at lower limit $g_{r12}$ (−0.10) of the allowable range.

Figure 43:
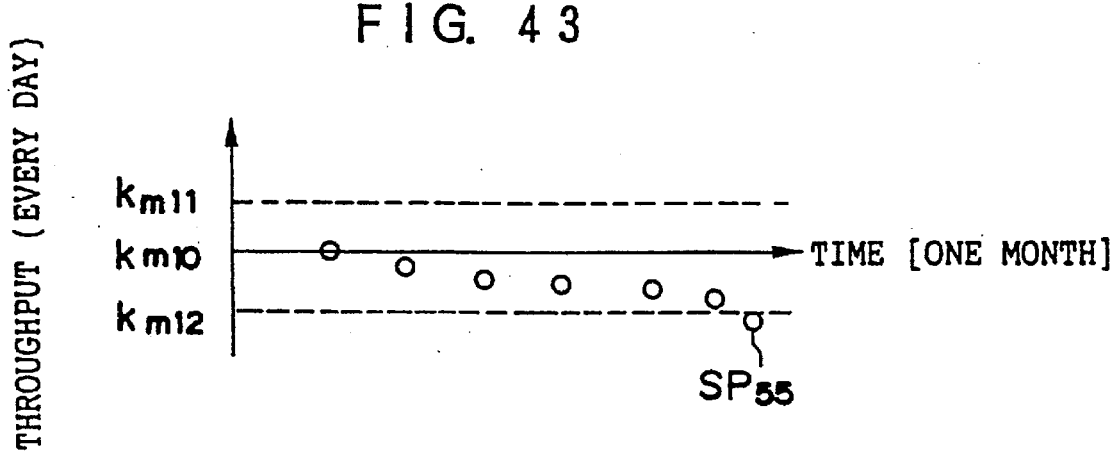
FIG. 43 is a graph showing data of throughput in past one month.
Figure 44:
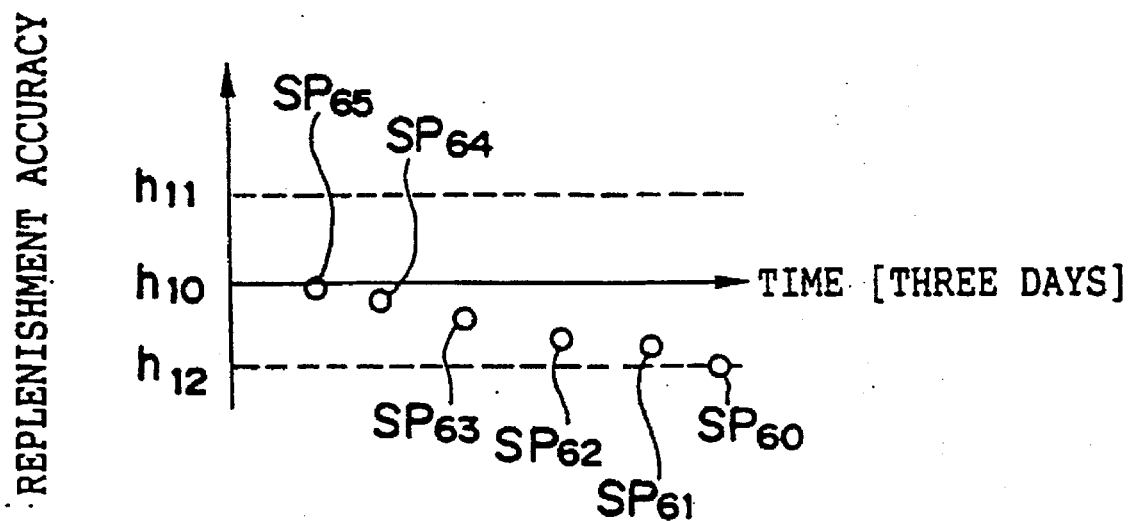
FIG. 44 is a graph showing data of throughput in past three days.

Since the sampled value of magenta and cyan of the exposed portion of the color paper 16P have been at the lower limit, only the throughput of the color paper in unit period and quantity of replenishment of the replenisher to each processing solution were detected and sampled. As a result, values as shown in FIGS. 42, 43 and 44 were obtained.

Figure 42:
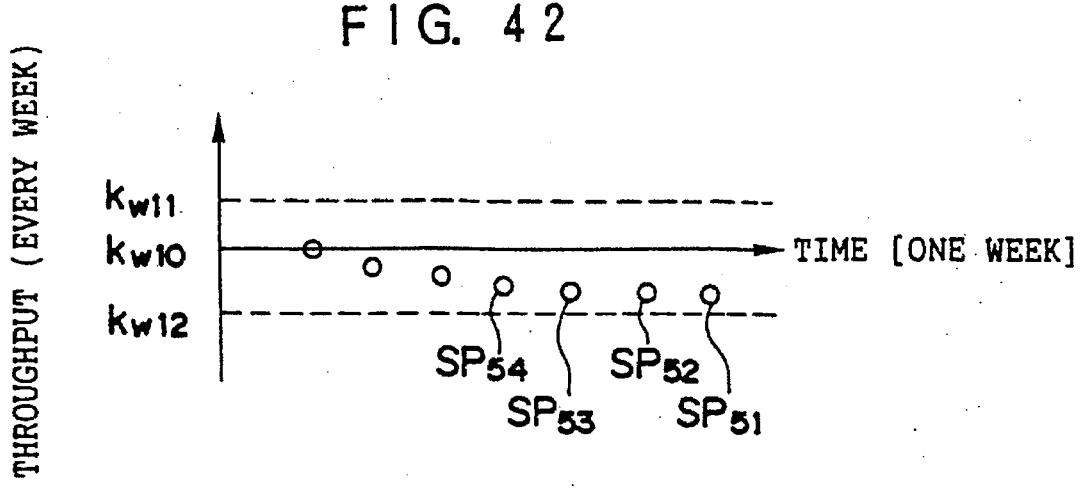
FIG. 42 is a graph showing data of throughput in past one week.

That is, as shown in FIG. 42, sampled values $SP_{51}$, $SP_{52}$, $SP_{53}$ and $SP_{54}$ of the throughputs of the color paper 16P processed for one previous week, in one week from two week ago to one week ago, in one week from three weeks to two weeks ago and one week from four weeks ago to three weeks ago were within the allowable range. However, all of the values approximated lower limit $K_{w12}$ (½) of the allowable range. Since the throughput in each week through four previous week was small, sampled value $SP_{55}$ of the throughput for one previous month was lower than lower limit $K_{m12}$ (½) of the allowable range, as shown in FIG. 43.

The replenishment accuracy on the basis of the throughput of the color developer for three days was detected and sampled by a similar method. As a result, as shown in FIG. 44, starting at sampled value $SP_{63}$ of the replenishment accuracy on the basis of throughput in a period from 12 days before to 3 days before, the value was made to be lower than ideal replenishment accuracy $h_{10}$. Current sampled value $SP_{60}$ was the same as lower limit $h_{12}$ (−10%) of the allowable range. Note that the replenishment accuracy for each processing solution was included in the allowable range.

Since the throughput of the color paper 16P for one month was lower than the lower limit $K_{m12}$ of the allowable range and the replenishment accuracy of the color developer was the same as the lower limit of the allowable range, "throughput is lower limit" and "replenishment accuracy of color developer is lower limit" were displayed.

Since the replenishment accuracy of the color developer has been lowered and the throughput was made to be the lower limit, an estimation can be performed that the development activity has deteriorated. Accordingly, the quantity of replenishment of the color developer was enlarged in a predetermined quantity. Then, the density of the portion of the color paper 16P exposed to have standard density was measured one week after, thus resulting in the density being included in the allowable range.

As a third embodiment of the present invention, the second embodiment may be adapted to a film processor serving as an apparatus for processing a photographic sensitive material.

In the foregoing embodiment, the quantity of silver left in the negative film N is determined in accordance with the quantity of infrared rays which has penetrated the negative film N. The present invention is not limited to this. The quantity of silver left in the negative film N may be determined in accordance with the quantity of infrared rays reflected by the negative film N. Although the quantity of residual silver was detected in the extremely exposed portion at the leading portion of the negative film, the present invention is not limited to this. A film having no extremely exposed portion is permitted to be formed with a portion which has been previously exposed so as to be a portion similar to the extremely exposed portion. As an alternative to this, the quantity of residual silver in a portion except the extremely exposed portion may be detected.

Also in the third embodiment, similar to the first and second embodiments, if the processing performance of the processing solution is defective, the cause can be specified. Moreover, a countermeasure to make the density of the exposed portion of the control strip to be a value included in an allowable range may be taken in accordance with the detected cause. Thus, the foregoing countermeasure enables the density of the exposed portion of the control strip to be a value included in an allowable range. Thus, the processing performance of the processing solution can be made to be included in the allowable range.

As the film processor according to the third embodiment, the inventors employed film processor FP360B (trade name) for a small laboratory (MiniLab) manufactured by Fuji Photo Film Co., Ltd. and CN-16L manufactured by the same as the processing solution. The film processor FP360B had a processing sequence of development, bleaching, fixing-1 fixing-2, rinsing, stabilizing-1, stabilizing-2 and drying.

When the film processor FP360B was used, the control strip was processed in the foregoing process. The control strip was exposed under predetermined reference exposing conditions to have standard density and a density higher than the standard density. As a result, the control strip had a non-exposed portion ($D_{min}$) which has not been exposed, a standard density portion (LD portion) exposed to standard density and high density portion (HD portion).

The film processor FP360B had a density meter at an outlet portion of the drying portion thereof to measure the density of the non-exposed portion ($D_{min}$), the standard density portion (the LD portion) and the high density portion (the HD portion) of the control strip processed in the foregoing process so that the present invention was applied. To apply the present invention, the film processor "FP360B" was provided with the following functions: a function of recording the throughput of the negative film N in one previous week and one previous month and comparing the recorded throughput for one previous week and one previous month with allowable ranges; a function of recording the temperature of each processing solution and subjecting the recorded temperature of each processing solution to a comparison with an allowable range; and a function of recording the replenishment accuracy of each processing solution. A replenishment accuracy based on the throughput for one previous week can be recorded. Moreover, there were provided a function of measuring the electric conductivity of washing water in the final stabilizing bath and subjecting the measured electric conductivity to a comparison with an allowable range; a function of measuring pH and specific gravity of the developer and bleaching solution and the fixing solution and subjecting the measured pH and specific gravity to comparisons with respective allowable ranges; a function of recording the quantity of water supplied to each processing solution and subjecting the recorded quantity of supplied water to a comparison to an allowable range: and an apparatus for emitting infrared rays after drying and detecting the quantity of infrared rays penetrated the standard density portion (the LD portion) of the control strip or reflected from the standard density portion (the LD portion) of the control strip so as to measure the quantity of silver left in the negative film N in accordance with the detected quantity of infrared rays.

Figure 45:
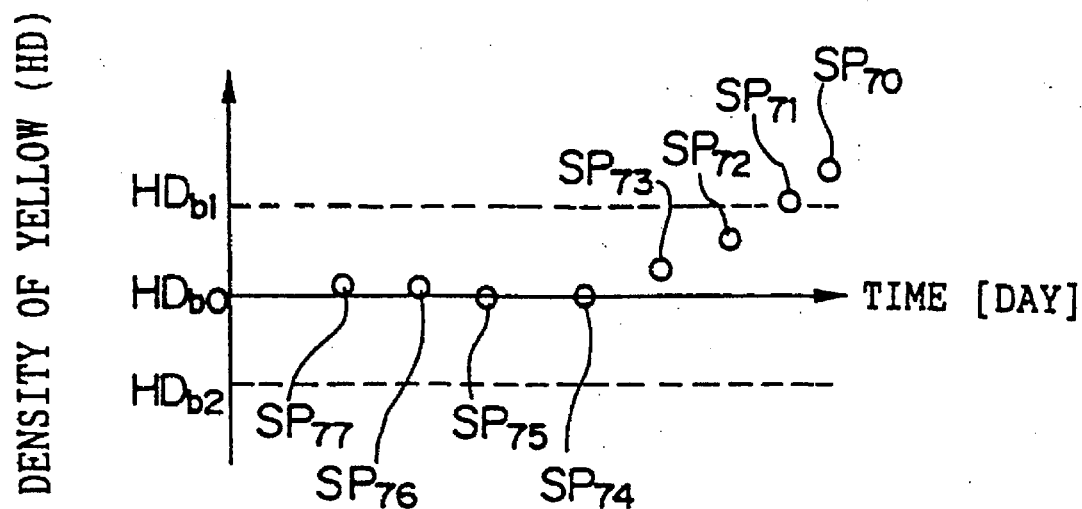
FIG. 45 is a graph showing data of the density.
Figure 46:
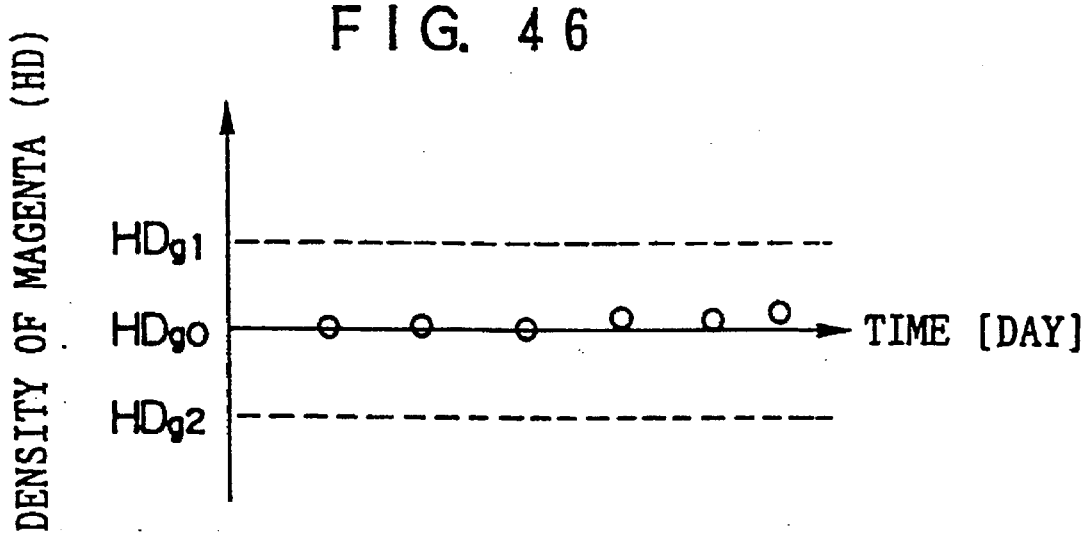
FIG. 46 is a graph showing data of the density.
Figure 47:
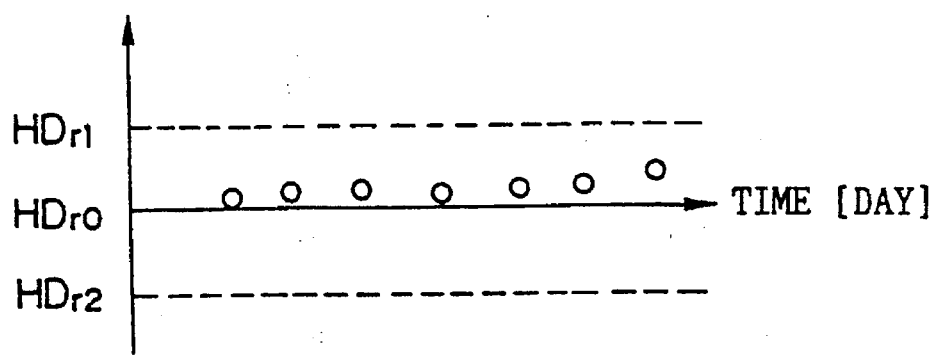
FIG. 47 is a graph showing data of the density.

As a result, the density of yellow (result of sampling) of the high density portion (the HD portion) of the control strip was as shown in FIG. 45 such that starting to sampled value $SP_{73}$ of density of yellow in the high density portion (the HD portion) of the control strip three days before, the sampled values were made to be larger than high density value $HD_{bo}$. Sampled value $SP_{71}$ one day before was made to be upper limit $HD_{b1}$ (+0.08) of the allowable range, and current sampled value $SP_{70}$ exceeded upper limit $HD_{b1}$ of the allowable range. Note that the densities of magenta and cyan (results of sampling) in the high density portion (the HD portion) of the control strip were, as shown in FIGS. 46 and 47, near high density values $HD_{go}$ and $HD_{ro}$, respectively.

Since the density of yellow in the high density portion (the HD portion) of the control strip was higher than the upper limit of the allowable range, the foregoing physical quantities were sampled.

Figure 48:
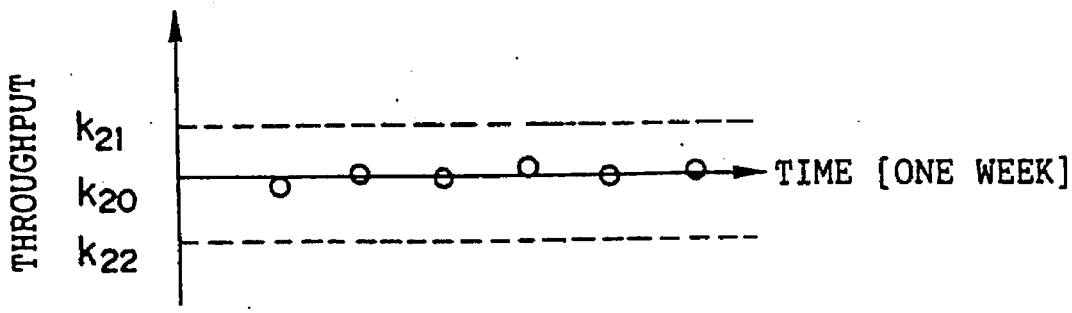
FIG. 48 is a graph showing data of throughput of the negative films in one week.

As a result, a result of sampling of the throughput of the negative films N in one week was near ideal throughput $K_{20}$, as shown in FIG. 48. The temperature of each processing solution was included in the allowable range.

Figure 49:
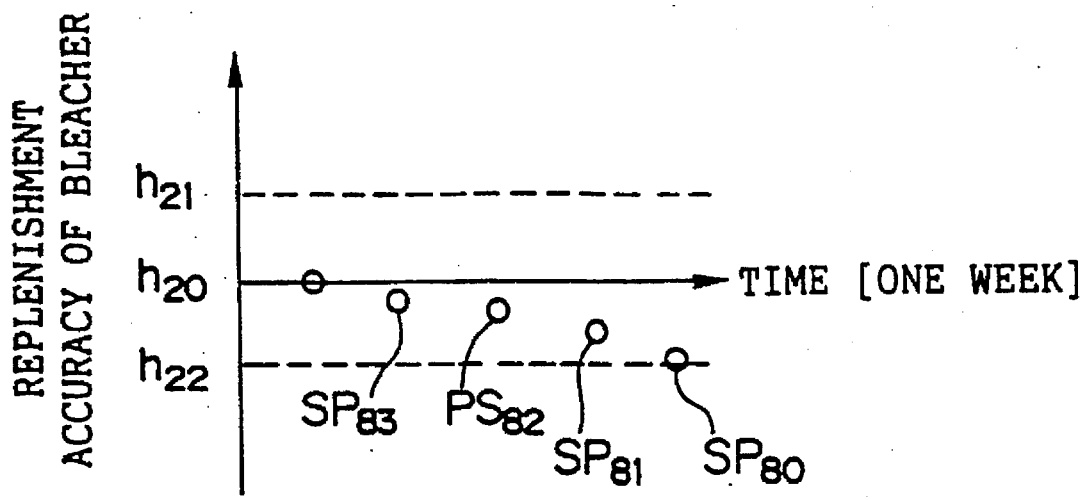
FIG. 49 is a graph showing data of replenishment accuracy in one week.

However, as shown in FIG. 49, starting at sampled value $SP_{82}$ of the replenishment accuracy from three weeks ago on the basis of the throughput of the bleaching solution in one week, the values were made to be lower than ideal replenishment accuracy $h_{20}$. Current sampled value $SP_{80}$ was made to be lower limit $h_{22}$ (−10%) of the allowable range. Note that the replenishment accuracy of other processing solutions except the bleaching solution was included in the allowable range.

The electric conductivity of the stabilizer in the stabilizing bath 10G was included in the allowable range.

Figure 50:
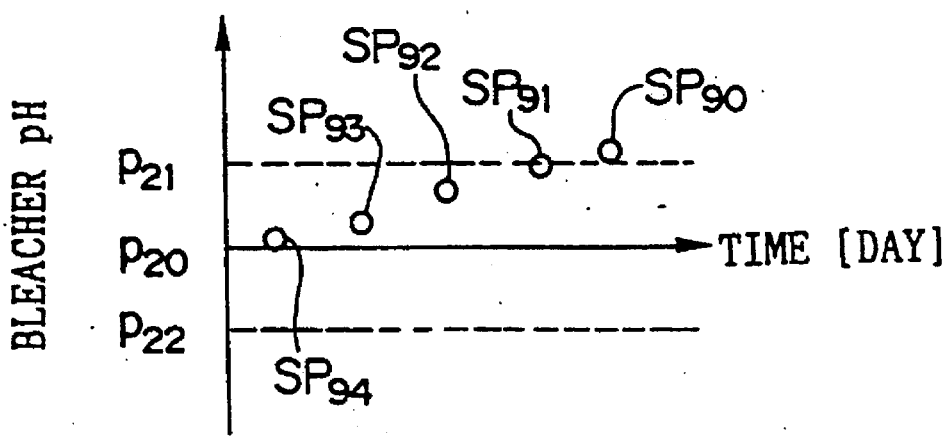
FIG. 50 is a graph showing data of pH in one day.

However, starting at sampled value $SP_{93}$ of pH of the bleaching solution three days before as shown in FIG. 50, the sampled values began to exceed ideal pH. Current sampled value $SP_{90}$ exceeded upper limit $P_{21}$ (+0.30) of the allowable range.

Figure 51:
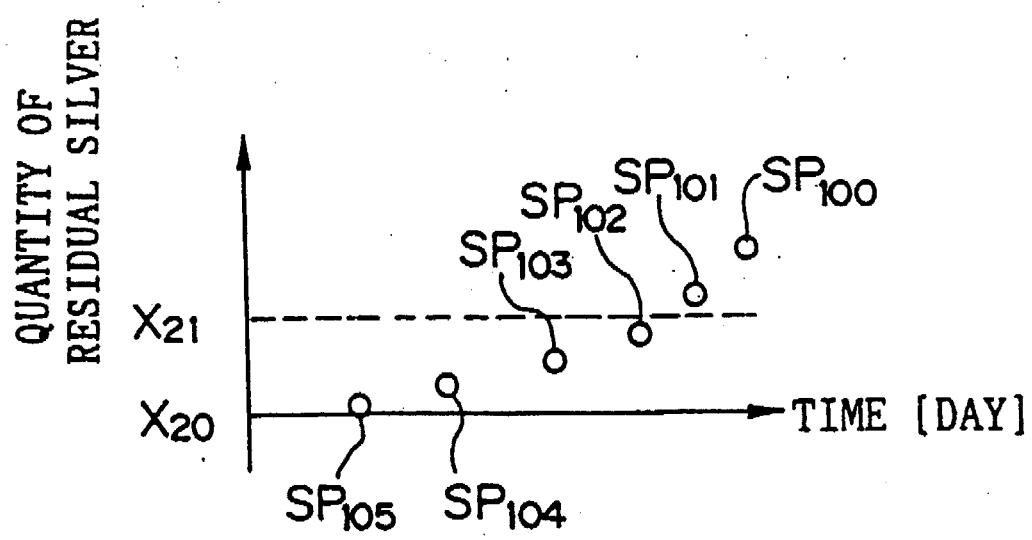
FIG. 51 is a graph showing data of quantity of residual silver in one day.

As shown in FIG. 51, sampled value $SP_{104}$ of the quantity of silver left in the processed negative film N four days before starts increasing, sampled value $SP_{101}$ one day before exceeded upper limit $X_{21}$ (10 µg/cm$^2$) of the allowable range.

Since the replenishment accuracy of the bleaching solution was made to be the lower limit, the pH of the bleaching solution exceeded the upper limit of the allowable range, and the quantity of silver halide left in the processed negative film N was larger than the allowable range, "replenishment accuracy of bleaching solution is lower limit", "pH of bleaching solution is upper limit" and "desilverization defective" were displayed.

Since the cause of these problems can be considered due to reduction in the replenishment to the bleaching solution, rise in pH and defective desilverization, the quantity of replenishment to the bleach bath 10B was enlarged in a predetermined quantity. Then, the density of the control strip was measured one week after. As a result, the density was included in the allowable range.

Figure 32:
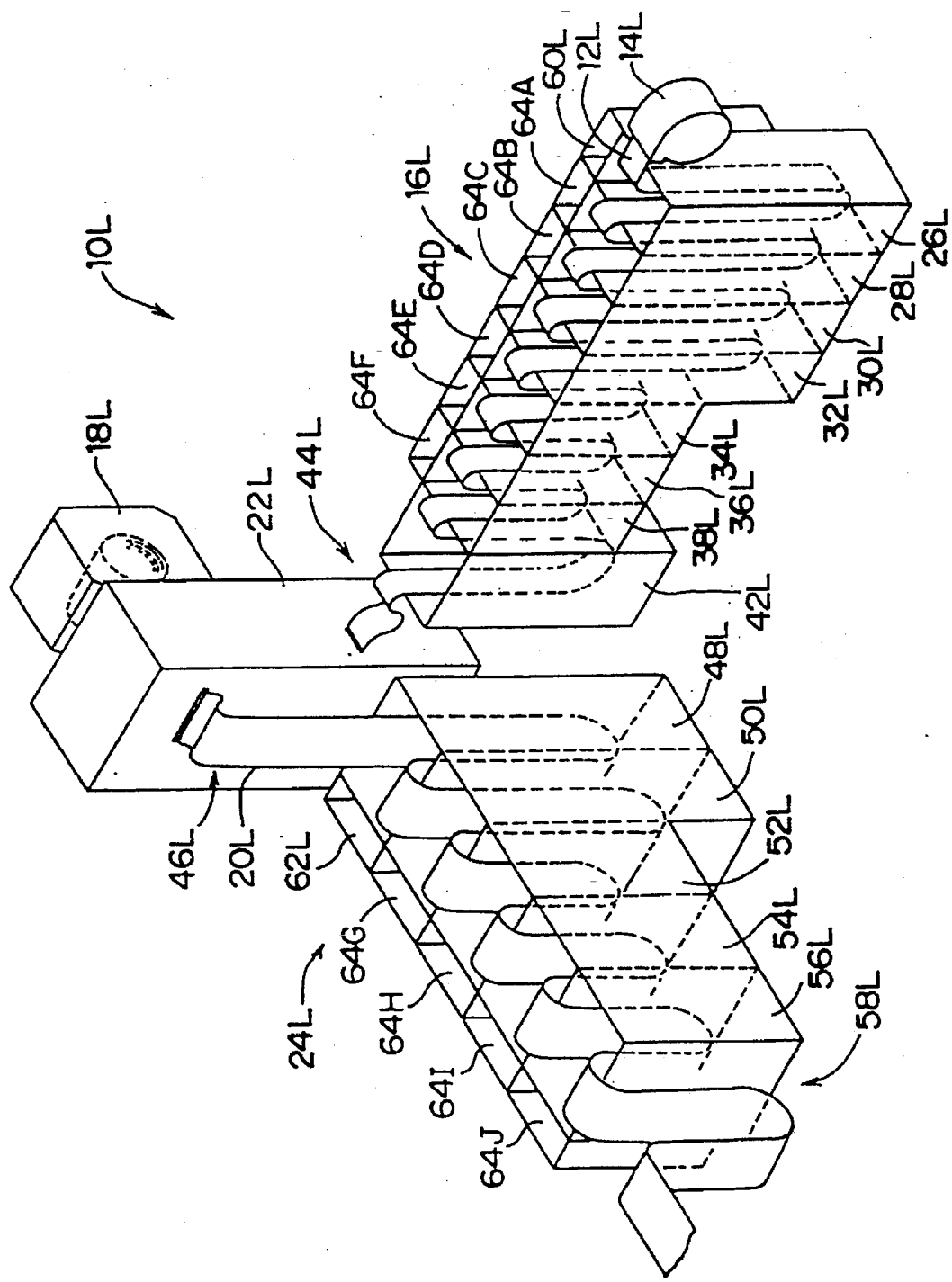
FIG. 32 is a schematic view showing an example of a photograph processing apparatus in which the film processor and the printer processor are integrally formed.

Also the second and third embodiments, similarly to the first embodiment, may be applied to the photography processing apparatus shown in FIG. 32 in which the film processor and the printer processor are formed integrally.

As described above, the second and third embodiments of the present invention have the structure such that in the case where specific density measured by density measuring means is out of a predetermined range including a predetermined density, the cause of the specific density measured by the density measuring means being out of the predetermined range is estimated in accordance with the detected physical quantities. In accordance with the estimated cause, the control conditions are changed such that the specific density is included in the predetermined range. Therefore, the control conditions can be changed to appropriate conditions to maintain the processing solution at an appropriate state. As a result, the processing performance of the processing solution can be included in the allowable range. Therefore, excellent advantages can be realized in that the photographic characteristic and the processing solution can be controlled accurately.

While the embodiments of the present invention, as herein disclosed, constitute a preferred form, it is to be understood that other forms might be adopted.

What is claimed is:

1. An apparatus for processing a photographic sensitive material comprising:

film processing unit for processing a photographic sensitive material, used for taking pictures, with processing solutions;

print processing unit having exposing means for exposing images recorded on the photographic sensitive material processed by said film processing unit to a photosensitive material for forming prints;

calculating means which integrates exposure of the prints performed by said exposing means so as to calculate a mean exposure; and comparison means for subjecting a result of calculation performed by said calculating means to a comparison with a predetermined reference exposure for prints.

2. An apparatus for processing a photographic sensitive material according to claim 1, wherein said film processing unit has detection means for detecting physical quantities of said processing solutions affecting photographic characteristics of said photographic sensitive material for taking pictures.

3. An apparatus for processing a photographic sensitive material according to claim 1, wherein said calculating means selects a specific photographic sensitive material for taking pictures when said calculating means integrates said exposure.

4. An apparatus for processing a photographic sensitive material according to claim 1, wherein said calculating means selects images printed on said photographic sensitive material for forming prints having a predetermined size when the calculating means integrates the exposure.

5. An apparatus for processing a photographic sensitive material according to claim 1, wherein said film processing unit and said print processing unit are integrally provided.

6. An apparatus for processing a photographic sensitive material comprising:

density measuring means for measuring a specific density of a photographic sensitive material processed when said photographic sensitive material passes through a processing solution;

physical-quantity detecting means for detecting a plurality of different physical quantities which affect the photographic characteristics of said processed photographic sensitive material;

maintaining means for maintaining an appropriate state of said processing solution in accordance with control conditions determined in accordance with the magnitude of said physical quantities and used to maintain the appropriate state of said processing solution;

determining means for determining whether or not the specific density measured by said density measuring means is out of a predetermined range including a predetermined density; and cause estimating means for, in accordance with at least one of said plurality of physical quantities detected by said physical-quantity detection means, estimating a cause of said specific density measured by said density measuring means being out of said predetermined range in a case where a result of determination performed by said determining means is affirmative.

7. An apparatus for processing a photographic sensitive material according to claim 6, wherein said physical-quantity detecting means detects a state of said processing solution as one of said physical quantities.

8. An apparatus for processing a photographic sensitive material according to claim 6, wherein said physical-quantity detecting means detects at least a throughput of said photographic sensitive material per unit period and quantity of replenisher to be replenished to said processing solution as one of said physical quantities.

9. An apparatus for processing a photographic sensitive material according to claim 6 further comprising changing means for changing said control conditions in accordance with said cause estimated by said cause estimating means so that the value of said specific density is included in said predetermined range.

10. An apparatus for processing a photographic sensitive material according to claim 7 further comprising changing means for changing said control conditions in accordance with said cause estimated by said cause estimating means so that the value of said specific density is included in said predetermined range.

11. An apparatus for processing a photographic sensitive material according to claim 8 further comprising changing means for changing said control conditions in accordance with said cause estimated by said cause estimating means so that the value of said specific density is included in said predetermined range.

12. An apparatus for processing a photographic sensitive material according to claim 6, wherein said density measuring means measures a density of a non-exposed portion of said processed photographic sensitive material.

13. An apparatus for processing a photographic sensitive material according to claim 7, wherein said density measuring means measures a density of a non-exposed portion of said processed photographic sensitive material.

14. An apparatus for processing a photographic sensitive material according to claim 8, wherein said density measuring means measures a density of a non-exposed portion of said processed photographic sensitive material.

* * * * *